(12) United States Patent
Liebermann

(10) Patent No.: US 8,523,572 B2
(45) Date of Patent: Sep. 3, 2013

(54) TOUCH LANGUAGE

(76) Inventor: Raanan Liebermann, North Haven, CT (US)

( * ) Notice: Subject to any disclaimer, the term of this patent is extended or adjusted under 35 U.S.C. 154(b) by 2316 days.

(21) Appl. No.: 10/718,023

(22) Filed: Nov. 19, 2003

(65) Prior Publication Data

US 2005/0106536 A1    May 19, 2005

(51) Int. Cl.
*G09B 21/00* (2006.01)

(52) U.S. Cl.
USPC ............................................. 434/112

(58) Field of Classification Search
USPC ................ 434/112, 113, 114, 115, 116, 117
See application file for complete search history.

(56) References Cited

U.S. PATENT DOCUMENTS

| | | | | |
|---|---|---|---|---|
| 3,831,296 A * | 8/1974 | Hagle | ........................... | 434/112 |
| 4,519,781 A * | 5/1985 | Boyd | ........................... | 434/156 |
| 5,047,952 A * | 9/1991 | Kramer et al. | ................. | 704/271 |
| 5,177,467 A * | 1/1993 | Chung-Piao | ................... | 340/574 |
| 5,507,649 A * | 4/1996 | Troudet | ......................... | 434/233 |
| 5,583,478 A * | 12/1996 | Renzi | .......................... | 340/407.1 |
| 5,636,038 A * | 6/1997 | Lynt et al. | ..................... | 358/471 |
| 6,167,366 A * | 12/2000 | Johnson | ............................ | 704/2 |
| 6,240,392 B1 * | 5/2001 | Butnaru et al. | ............... | 704/271 |
| 7,039,676 B1 * | 5/2006 | Day et al. | ...................... | 709/204 |
| 2002/0194006 A1 * | 12/2002 | Challapali | ..................... | 704/276 |
| 2004/0001090 A1 * | 1/2004 | Brown et al. | ................. | 345/752 |
| 2004/0098256 A1 * | 5/2004 | Nissen | .......................... | 704/220 |
| 2004/0143430 A1 * | 7/2004 | Said et al. | ......................... | 704/2 |
| 2005/0004801 A1 * | 1/2005 | Liebermann | ................... | 704/271 |
| 2005/0069852 A1 * | 3/2005 | Janakiraman et al. | ......... | 434/236 |
| 2006/0164382 A1 * | 7/2006 | Kulas et al. | ................... | 345/156 |

* cited by examiner

*Primary Examiner* — Pierre E Elisca

(57) ABSTRACT

A touch language to be used by handicapped persons, such as deaf people, blind people, and deafblind people, is provided by the present invention. A method for communicating visual images, such as those of a television program, to a handicapped person comprises the steps of providing at least one device for physically transmitting information about the visual images to the handicapped person and delivering a key word describing a portion of the visual images to the handicapped person using the at least one device.

69 Claims, 8 Drawing Sheets

TOUCH LANGUAGE

BACKGROUND OF THE INVENTION

1. Field of the Invention

The present invention relates to a touch language, which can be used by deaf, blind and deafblind persons for sensory reception of visual images displayed on a device such as a television and for communicating with others.

2. Prior Art

Deaf persons utilize sign language, which enables them to communicate among themselves and with some auxiliaries also with hearing persons. Sign language however does not solve all perceivable audio situations. They cannot hear thunder, the wind, animal sounds and environmental sounds such as cars, trains, or music. There are partial solutions which enable the perception of some sounds by either providing a description of the sound or enabling perception through another sense, such as seeing light signals associated with an alarm.

Deaf people are able to utilize their sense of sight as a compensating auxiliary for perceived connectivity to their environment. Blind people use the opposite for such connectivity. That is, their sense of hearing, which maintains perception of what happens in their environment. Thus, audio description of sights enables a substitution on some level for their lack of sight. The blind can also augment, to a degree, their lack of sight by partially utilizing the sense of touch as is done when reading Braille, and letting their fingertips perceive the combination of raised dots that comprise appropriate letters and numbers.

Thus, a person with a dysfunctional sense can compensate to a degree by enhanced use of another sense. In the case of blind people, it is the sense of touch. Blind people not only use the sense of touch to read Braille, but also use the sense to feel their way around their environment. The blind can also use a combination of an extended sense of touch combined with the sense of hearing when they use a cane to navigate.

People who are both deaf and blind (deafblind) are in a different category of perception. The lack of two senses, hearing and sight, leaves at their disposal only the senses of touch, smell, and taste. However, utilization of these senses does not enable deafblind to perceive the environment at large and is suitable only for very limited auxiliaries. The invention of the eCane, as described in co-pending U.S. patent application Ser. No. 10/612,159, filed Jul. 2, 2003, to Liebermann, enables the deafblind to communicate with others and locate desired places or objects. For example, the security emergency vehicle alert companion (SEVAC) described in the application, can enable a deafblind person to feel confident in their home environment so that they know if a break-in occurred in another room in the house, or a vibrating fire alarm with direction can alert them to fire occurring on another floor in a building. There still remains a need however for an auxiliary device which allows a deafblind person to enjoy other amenities in our society such as listening to a radio or enjoying a television show. There also remains a need for an additional tool for translating touch components of dynamically changing and even static scenes displayed on a television or communicate with others in a more efficient way than fingerspelling.

SUMMARY OF THE INVENTION

Accordingly, it is an object of the present invention to provide a touch language that is useful for the blind, and, in particular, the deafblind, to perceive visual and aural communication programs.

The foregoing object is achieved by the present invention.

In accordance with the present invention, a method for communicating visual images to a handicapped person is provided. The method broadly comprises the steps of providing at least one device for physically transmitting information to the handicapped person, and delivering a key word describing a portion of a visual image to the handicapped person using the at least one device. The method further comprises physically transmitting other information about the visual images to various body parts of the handicapped person.

The present invention also relates to a system for communicating visual images to a handicapped person. The system broadly comprises at least one device for physically transmitting information to the handicapped person. The at least one device is used to deliver a key word describing a portion of a visual image to the handicapped person. The system also includes means for transmitting other information about the visual images to various body parts of the handicapped person.

Other details of the touch language of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention relates to a method and a system for allowing a handicapped person, such as a deaf person, a blind person and a deafblind person, to enjoy a program, such as a television program, which has visual images, aural communications, and sound. The method takes the form of a touch language. The system takes the form of one or more mechanical devices for allowing the handicapped person to use the touch language.

The mechanical devices that make touch language available for reception and communication fall into two categories. There is the first category that embodies only gloves to be worn by the user and the second category that embodies the gloves or a similar functionally equivalent contraption with added elements which enables the reading of Braille and accessing a device that enables functionally equivalent TV reception.

Each of the two gloves is composed of four distinct segments: (a) the sleeves 10 engulfing each of the fingers and thumb; (b) the palm segment 12 including the face of the wrist; (c) the back of the hand segment 14 including the back of the wrist; and (d) the cradles 16 for the thumb and the fifth finger.

Figure 1:
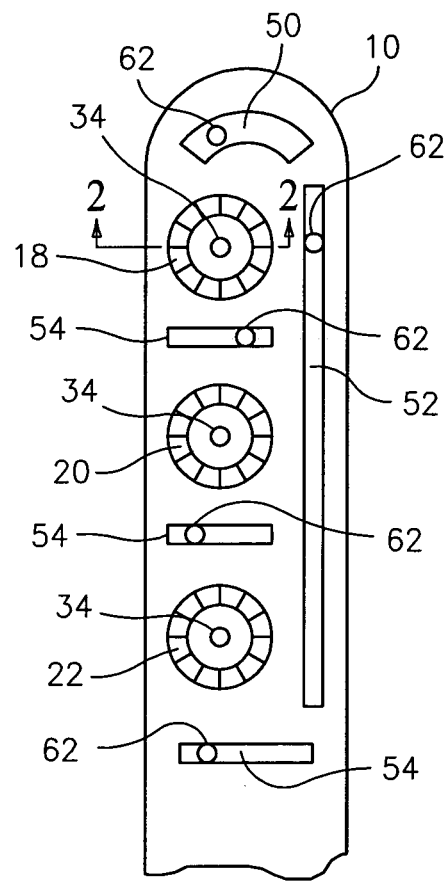
FIG. 1 is a schematic representation of a finger portion of a glove worn by a user.

Referring now to FIG. 1, each finger sleeve 10 contains three distinct parts. First, there is the recipient part for direct activation which has keys 18, 20, and 22. Depressing any of the keys 18, 20, and 22 activates a reciprocal touch language delivery component telling the deafblind person what touch language component was just transmitted to him/her. The keys 18, 20, and 22 are preferably circular in shape and have a relatively large radius to make the keys easy to find and depress.

Figure 2:
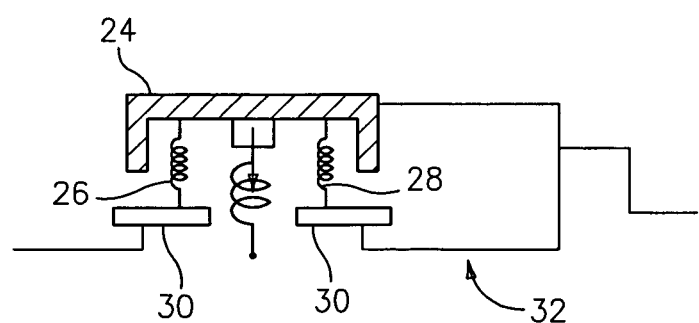
FIG. 2 is a cross sectional view of a key used in the finger portion of FIG. 1.

FIG. 2 illustrates a cross-sectional view of one of the keys and shows how a key can process an activity. Depressing an upper part 24 of the key overcomes the resistance to motion imparted by the springs 26 and 28. As the spring resistance is overcome, the upper part 24 comes into contact with a lower part 30 which closes an electrical circuit and enables a desired activation message to be transmitted via the wiring 32 connected to the parts 24 and 30. In an alternative embodiment, an additional part (not shown) can be connected to part 24 which could exert an impact directly to a finger without need to send an electrical message to activate a component that will in turn provide the impact to the finger. The keys 18, 20, and 22 may be incorporated into the material of the glove in any suitable manner.

Figure 3:
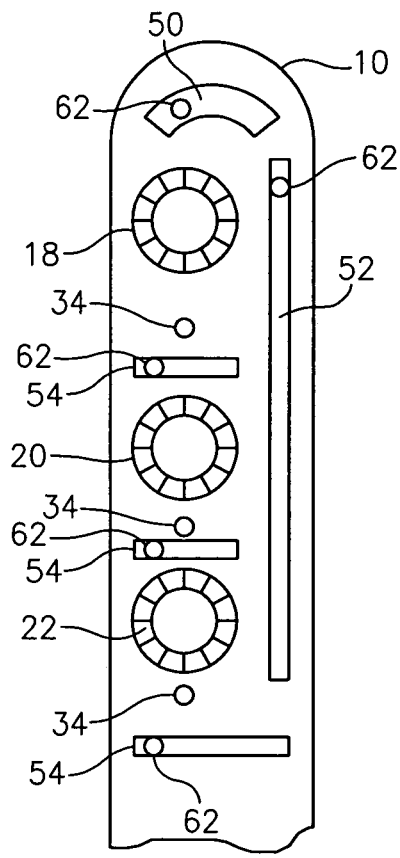
FIG. 3 is an alternative embodiment of finger portion of a glove.

The second distinct part is an impacting part 34 for creating one or more nibbles on a particular portion of a finger. If desired, the impacting part 34 can be located in the center of each key 18, 20, and 22 or, as shown in FIG. 3, beneath each key 18, 20, and 22. Each impacting part 34 may take the form shown in FIG. 4, which will be discussed hereinafter. In its resting position, each impacting part 34 has no contact with a finger. Upon an electrical signal being provided to a respective impacting part 34, the part 34 moves toward the finger and impacts on it. These impacts are known as nibbles.

Figure 4:
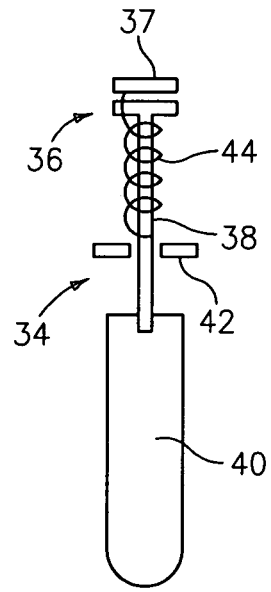
FIG. 4 is a view of an impacting part used in the glove of the present invention.

Referring now to FIG. 4, each impacting part 34 has a base plate 36, a member 38 connected to the base plate 36, and an impacting rod 40 connected to the member 38. The impacting part further includes an electromagnet 42 through which the member 38 passes and a spring 44 surrounding the member 38 between the base plate 36 and the electromagnet 42. The spring 44 may be connected to each of the base plate 36 and the electromagnet 42.

To deliver an impact, an electrical current is applied to the electromagnet 42. This causes the base plate 36 to move toward the electromagnet 42 and the rod 40 to impact the finger. When the electrical current ceases, the spring 44 causes the base plate 36 and the rod 40 to return to their resting position out of contact with the finger. Alternatively, in addition to or in lieu of the spring 44, plate 37 is also an electromagnet that is charged while the member 38 and its connected rod 40 is in resting position without any impact to a finger. The magnet in plate 37 is deactivated simultaneously with the activation of the magnet 42, allowing the rod 40 to move towards a finger and plate 37 is charged again at the completion of the impact simultaneously with the deactivation of magnet 42, causing the member 38 to return back to its resting position held by an activated electromagnet 37.

Each of the impacting parts 34 may be incorporated into the glove in any suitable manner known in the art.

If the rod 40 is at an angle relative to the base plate 36, the connecting member 38 may have a portion which passes over a pulley (not shown). Such a pulley enables a smooth and easy slide of the rod 40.

Each finger sleeve 10 may be provided with a plurality of sliding elements. The sliding elements may take the form of a curved member 50 located at the tip of the sleeve 10, a longitudinally extending member 52 located along a side of the sleeve 10, and one or more members 54 extending transverse to the longitudinal axis of the sleeve. The members 50, 52 and 54 may be used to impart sliding sensations to a finger.

Figure 5:
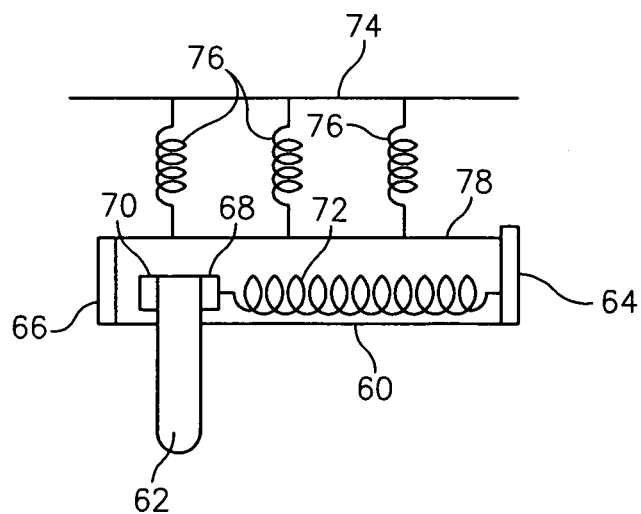
FIG. 5 is a side view of a slide member used in the glove.

Referring now to FIG. 5, a cross sectional view of one of the members 50, 52, and 54 is illustrated. As shown therein, each of the members 50, 52 and 54 has a track 60 and a stylus 62 movable along the track 60. At one end of the track 60, there is a first electromagnet 64. At the opposite end of the track 60, there is a second electromagnet 66. Attached to the stylus 62 are magnets or metal plates 68 and 70. A spring 72 is connected to the magnet or plate 68 and the electromagnet 64.

Each member 50, 52, and 54 further has an upper electromagnetic ceiling bar 74 connected to vertical springs 76 and a bottom bar 78

In operation, the electromagnet 64 may be powered which causes movement of the stylus 62 towards the electromagnet 64 as the magnetic force exceeds the tension of the spring 72. Before power is applied to electromagnet 64, the constant electromagnetic power applied to the electromagnetic ceiling bar 74 is turned off. This causes the springs 76 to extend and allows the stylus 62 to make contact with the finger. As the stylus 62 moves along the finger, the stylus 62 makes a stick motion on the finger. When it is necessary to reverse the stick motion, power to electromagnet 64 is shut off and applied to electromagnet 66. The power generated by the electromagnet 66 and the spring 72 causes the stylus 62 to move toward electromagnet 66. If power is applied to either electromagnet 64 or 66 before the power is turned off to electromagnet 74, the stylus 62 is positioned in a different location along its path as a starting point when the power is turned off to electromagnet 74. The latter allows for a stick movement only to a designated part of a finger rather than its whole length for part 62 or its whole width in part 50.

While the foregoing describes a front portion of a sleeve which contacts a front portion of a finger, it should be recognized that a similar structure is present on the back portion of the sleeve which contacts a back portion of the finger. This allows various parts of the touch language to be imparted to both the front and back portions of a finger in a plurality of locations on each.

Figure 6:
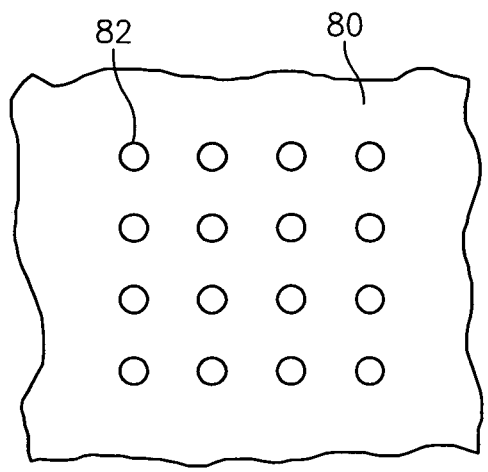
FIG. 6 is a schematic representation of a palm segment.

Referring now to FIG. 6, the palm segment 80 which forms the Palm Screen is preferably composed of a four by four matrix of sixteen styli 82, each of which preferably takes the form of the key 34. The entire sixteen point matrix is electrically connected where each stylus 82 is independently controlled. One or more of these styli 82 may operate in tandem, serially, or a combination thereof. The palm segment 80 may be incorporated into each glove to be worn by a user or may be a separate mechanical device. If the palm segment 80 is a separate mechanical device, the palm portion of each glove may be open so as to allow direct contact between the styli 82 and the user's palm. If desired, each of the styli 82 may be surrounded by a key having the same construction as key 18.

Figure 7:
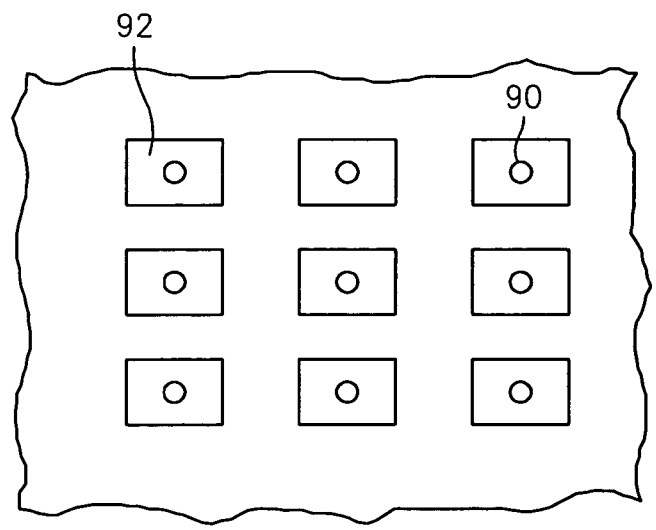
FIG. 7 is a schematic representation showing a portion of a glove covering a back portion of a dominant hand.

Each of the gloves worn by a user has a portion which extends over the back of the hand. There are two different electromechanical arrangements for the back of the hands. There is one for the dominant hand and one for the non-dominant hand. As shown in FIG. 7, the back of the dominant hand has a matrix of three by three styli 90 located along the edges of the back of the hand and the center. Each one of these styli 90 has a construction similar to that of impacting part 34. Each styli 90 is wired to receive the information imparted on it. If desired, a key 92 having the construction of key 18 may surround each styli to enable reception of information from an external communicating person.

Figure 8:
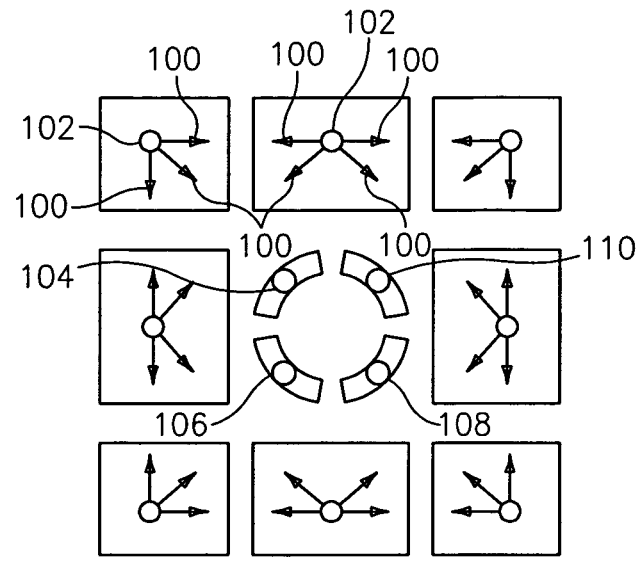
FIG. 8 is a schematic representation showing a portion of a glove covering a back portion of a hand.

Referring now to FIG. 8, the back of the hand may be provided with a combination of twenty eight sticks 100 which have a construction similar to that shown in FIG. 5. Each of the eight focal points around the edges of the hand has either three or four distinct sticks 100 emanating from a central point 102. In the three stick configurations, two of the sticks 100 are at right angles to each other and the third stick 100 is at an angle of 45 degrees from each of the right angle sticks. In the four-stick embodiment, two of the sticks 100 are at 180 degrees with respect to each other and the two remaining sticks 100 are at an angle of 45 with respect to one of the other sticks 100 forming a 90 degrees between themselves.

In the center of the back of the hand, there are four curved sticks 104, 106, 108, and 110. The curved sticks are spaced apart and form the general outline of a circle. The curved sticks 104, 106, 108, and 110 have a construction such as that shown in FIG. 5 where powered electromagnets are exerting appropriate attraction forces and are driving a stylus for reciprocal movement.

If desired, a key such as key 18 may be positioned adjacent each of the eight focal points enabling the production of impacts at those points.

Figure 9:
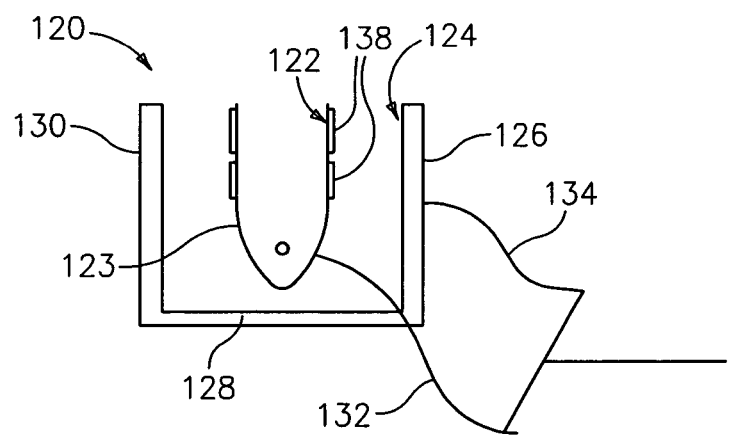
FIG. 9 is a schematic representation of a cradle to be used in the system of the present invention.

Referring now to FIG. 9, a cradle 120 which can be used with the thumb and pinky on each hand is illustrated. The cradle 120 has a conical portion 122 that is cut in its center. The conical portion 122 pivots on an axis located close to the base of the portion 122 that is in the proximity of where the thumb or pinky connects to the hand. The conical portion 122 has four sides 123 of interest—namely, the right and left side and the top and the bottom. Each of the four sides is similar, therefore only one of them will be described. As can be seen from the figure, the conical portion 122 rests in an open box enclosure 124 that provides outer walls 126, 128, and 130 to the walls of the conical portion 122.

As can be seen from the figure, the side 123 has an electrical wire 132 attached to it and the wall 126 has an electrical wire 134 attached to it. When physical contact is made between the side 123 and the wall 126, an electrical circuit is closed and electricity (carrying a signal) can flow. In this way, various control signals can be sent. If desired, the side 123 may have a plurality of contacts 138 formed from an electrically conductive material and connected to the wire 132. The walls of the box enclosure 124 may also be formed from an electrically conductive material so that when the contacts 138 contact the wall 126 the circuit is closed.

All power to the various parts of the glove may be provided by an external source (not shown) such as one or more batteries.

Generally, there are two categories of information to be delivered by the mechanical devices such as the gloves worn by the handicapped person. The first category is the static category, such as a still picture of a house or an object. The second category is the dynamic category pertaining to moving objects, a metamorphosis of a visual item, and the abruptly changing status of an object. As discussed before, the translation of information is through the mechanical delivery of sensation to a body part, such as the various parts of the hand, by the keys 18, 20 and 22, and the impacting part 34, the sliding elements 50, 52 and 54, the styli 82 and 92, the sticks 100 and the keys 104, 106, 108 and 110. If desired, some information transmission could also be achieved by passage of small and safe currents producing a tickling effect or vibration on the body part in line with the specific visual equivalent message delivered. Central to the touch delivery system and language of the present invention is the descriptive elements that form the language which are divided into two segments.

The first segment is a verbal component segment which has a dual function. It provides the verbal components (i.e. verbs) of a show and are called "Key Words" provided in either Morse code or Braille. The second function is a short description provided by the styli, sticks and vibrations that convey the topics in addition to the dynamic descriptions on the palms of the hand, that are known as "Pragmatics". Such "Key Words" may be captured by either the fingertips of the hand not involved in palm reception, by the palm itself, or by fingers that are part of the palm reception. Vibration is a viable mode for delivery as well. While the vibrations can be delivered to the designated fingertip, doubling up on the palm utility may be considered as well. Namely, a device in contact with a palm, such as keys surrounding styli 82, could vibrate as a whole to deliver the Key Words in Morse, while various segments of the mechanical device, i.e. the styli 82, deliver the mechanical sensations of dynamic attributes to the palm. For example, if the visual is that of a car driving in a particular direction and at a particular speed, the key word description is only the word "car" delivered as Morse code by vibrations, where all the rest is relegated to the palm reception described herein, such as a sense of a path articulated on the palm. To distinguish between the two segments, a palm receptor may be used to alert the user to the fact that the word is related to the description provided at the palm by a unique mechanical signal dedicated for that purposes only. Such a signal may not be needed if the whole device vibrates in Morse code, or if such code is delivered by impacts of a stylus to a designated area of the body.

The second segment is the dynamic segment. This segment pertains to the palm reception of the visual parameters not provided by the first segment. This segment is where the impact of the language is executed. Referring to the above example with the car, this segment will inform the user, the direction in which the car moves, its speed, directional and speed changes, halting, involved in accident, rolling over, fire starting, or exploding.

It is imperative that the trap of building a language with a lot of abstract symbols, assigning meaning to such symbols and grouping them under the title of language, be avoided. The philosophy here is to create symbols that imitate functional life situations that will be intuitive to the deafblind. For example, when a deafblind person opens a door he or she does not see the widening angle between the door and the frame. However, the curved motion of the opening door is felt by the deafblind. With the lack of other external excitants, it registers and leaves an impression. As another example, consider the expansion of dough made with yeast and left to rise, or the expansion of concentric rings or circles in the water, as the waves expand when a stone is dropped into the water. The deafblind cannot see such expansions but can experience the mechanical expansion of a ring inside the palm of the hand delivering the functional equivalence of the visual through the element of dynamic motion of touch sensation. Therefore, a symbol for opening a door will imitate its rotational move, done on the palm of the hand using the styli 82. Furthermore, the philosophy of this language calls for minimizing the total amount of symbols utilized in the language, in order to enable both rapid learning of it, and more importantly, enhancing the ability for instant recall and contributing to a fluent sensation interpretation that will become intuitive. The elaborate setting of parameters and their utilization for the attributes should not be mistaken for the final result of the group of mechanical deliveries.

The multitude of parameters needed to accomplish the task may be problematic. The reason lies in the fact that visual descriptive elements are aimed at, which elements do not uniformly conform to alphabetic order by words, sentences, or subjects. Therefore, the group approach is taken, where each group contains common building blocks required to deliver functionally equivalent elements needed to perceive the images such as on a TV screen. The groups are established below and their components are indicated. The needed components are articulated and the specific elements in each are built up.

The groups are as follows:
1. Parameters Group
   (a) Static Parameters
   (b) Dynamic Parameters
   (c) Attribute Parameters
2. Cross Parameters Group
   (a) Relations
   (b) Activities
   (c) Characters
3. Protagonists Group
   (a) Father/Mother/Grandparents
   (b) Brother/sister/cousin
   (c) Boyfriend/Girlfriend
   (d) Enemy/hater
   (e) Lover
   (f) Teacher
   (g) Employer/Boss
   (h) Secretary/Receptionist
   (i) Soldier/commander/Senior Commander
   (j) Cook/Stewardess/Restaurant owner
   (k) Policeman/Policewoman/Chief
   (l) Hardhat employee
4. Process/Operation Group
   (a) Start
   (b) End
   (c) Commercial
   (d) Emergency Broadcasting Interruption
   (e) Reception Problem
5. Lighting Condition Group
   (a) Light
   (b) Dark
   (c) Flashlight
   (d) Car lights (Front/Back)
   (e) Light projectors
   (f) Lightening is electrical storm
   (g) NURIM
6. Descriptive Background and Ambient Group
   (a) Trees
   (b) Traffic on highway
   (c) A TV studio
   (d) Home (Kitchen/bedrooms/living room/backyard/pool)
   (e) People dancing
   (f) Persons dressed
   (g) Group of people standing/sitting
7. Classes
   (a) Gender
   (b) Appearance
   (c) Good/Bad
   (d) Profession(al)
   (e) Age Group
   (f) Height A mechanical device for providing sensory input to deaf-blind people has been described herein. The mechanical device may also have a vibrating palm cradle or palm pecking cradle which may be used as receptors in particular embodiments. Some group components would find their delivery to these receptors rather natural, but the multitude of groups and components require additional receptors. The solution provided for the embodiment discussed utilizes the palm, the back of the hand, the back and face of the fingers, the wrist and back of the wrist, with the topography adhering to the rules provided below.

Static elements are defined based on surface elements of small flat units that can be grouped together producing a larger surface element with either the same or different shape. Shapes do not necessarily need to be constructed from adjacent elements, thus non-contiguous elements can produce different shapes at any given moment. Provided below are the locations of elements, as well as the rules for grouping them into different and larger shapes.

The basic "atomic" mechanical part is the "element". The shape of elements may depend on their embodiment. We will use here an element that is composed of two sub-elements, the square. The square itself can be described as two identical triangles connected at their respective hypotenuses.

Definitions:
Screen Coordinates
Preliminary Definitions

Up: The upper part of the palm that corresponds to the area of the palm that meets the base of the four fingers.
North: Same as "UP"
Down: The lower part of the palm that meets the wrist.
South: Same as "Down"
Right: The right hand side of the palm when it is placed face down, irrespective of whether the person uses the right hand palm or left hand palm. When using the left hand palm, "Right" will be the side of the palm that is next to the thumb because the palm is face down.
East: Same as "Right"
Left: The left hand side of the palm when it is placed face down, irrespective of whether the person uses his right hand palm or left hand palm. When using the right hand palm, "Left" will be the side of the palm that is next to the thumb because the palm is face down.
West: Same as "Left".
Vertical: Straight direction from South to North.
Horizontal: Straight direction from West to East.
South West: The midpoint area between South and West.
South East: The midpoint area between South and East
North West: The midpoint area between North and West
North East: The midpoint area between North and East
Geographic (Screen) Definitions For convenience, an artificial division of the PalmScreen's geographic area into micro cells can be provided. The micro cells are 16 squares forming an 4 by 4 matrix. The geographic matrix may be numbered starting at the North West of the PalmScreen with Micro Cell number one, moving towards the Right, i.e., North-East, then descending below Micro Cell number one, and continue in that fashion to end with Micro Cell number 16. That is, in the traditional matrix nomenclature, the micro cells (represented by the letter C) will appear as we show below.

$C_{1,1}$=First micro cell
$C_{1,2}$=Second micro cell
$C_{1,4}$=The North most East (Right) micro cell
.
.
.

$C_{16}$ = The South most East (Right) micro cell

The micro cell geography is utilized for the definitions of macro cell geography.

Macro cells are not necessarily contiguous, are sometimes overlapping, and are defined in terms of the micro cells. Such a case is provided in the format given bellow, representing a 4 by 4-geographic matrix of macro cells, with 16 quadrants. It should be noted that, the geographic definition of the macro cells provided, define only their location, but not necessarily their complete square area. The macro cells' utility will become apparent when using attributes as related to one geographic area or another on the device. A macro cell may be represented by the letter "M".
That is:

If $M_{i,j} = M(i, j)$ and $C_{i,j} = C(i, j)$

Then $M(1, 1) = [C(1, 1) + C(1, 2)] + [C(2, 1) + C(2, 2)]$
$M(1, 2) = [C(1, 3) + C(1, 4)] + [C(2, 3) + C(2, 4)]$
$M(1, 3) = [C(1, 5) + C(1, 6)] + [C(2, 5) + C(2, 6)]$
$M(1, 4) = [C(1, 7) + C(1, 8)] + [C(2, 7) + C(2, 8)]$
$M(2, 1) = [C(3, 1) + C(3, 2)] + [C(4, 1) + C(4, 2)]$
$M(2, 2) = [C(3, 3) + C(3, 4)] + [C(4, 3) + C(4, 4)]$
$\vdots$
$M(4, 4) = [C(7, 7) + C(7, 8)] + [C(8, 7) + C(8, 8)]$ Operational Impacts Definitions PalmScreen: The palm of a hand used as the functional equivalent of a TV screen for signal (touch) reception.

Nibble: A mechanical instrument, such as impacting part 34, that may be a solid cylindrical rod (needle like or thicker), with a diameter that may be of about ¹⁄₁₆ or ⅛ of an inch, which is used to create impacts on the back of the hand, face of the finger, or back of the fingers, or the palm when appropriate. It can impact once or multiple times, slowly or rapidly with high frequency or increasing/diminishing frequency. The Nibble also doubles up in definition as the impact sensation on the human body. If desired, the cylindrical rod 40 could be a rectangle with a square area or any other geometric form, and the diameter dimension provided above and below could be of different dimensions altogether.

Tactilon: A solid mechanical device such as styli 82 and 90 that may be a cylindrical rod with a diameter that may be of about 1.5 mm or 2.0 mm, and which may be used to create impacts on a sensor utilized as a body screen, such as the PalmScreen. It can impact once or multiple times, slowly or rapidly with low frequency, high frequency or increasing frequency.

Circle: (Reserved)

Horizonton: A line sensed on the PalmScreen going from East to West or West to East. The Horizonton may either be a stick or be sensed, by impacting its two end points defining its path.

Horizontilon: (or Horizontilin): Quarter length Horizonton.

Verticon: A line sensed on the PalmScreen, going from South to North or North to South.

Verticil n (or verticile or verticolin): Quarter length Verticon.

End Point: The last point reached in a single pass of a path description on the palm.

Static Parameters

Provided below are a few examples of Static Parameters.

Element: The basic (atomic) part. A mechanical device that may be a square that can protrude or retreat on timing instructions. The basic part can also vibrate on a timing command.

Shape: Any combination of two or more elements, not necessarily adjacent or contiguous.

Motion Shape: A shape that gives the impression of movement due to its element components creating single or successive impacts at the direction of the evolving shape.

Impact: Contact made with a target, such as the palm, by an element.

Vibrating element: An element induced to cause a sense of vibration at a particular frequency that may be in a particular direction for a given period of time.

It is rather simple to describe verbally a shape, such as a circle, straight line or a curved line. However, in order for Touch Language to be of real utility, rules for definition and formation of shapes are needed so that it can be readily available for translation into automation. The format below has been selected as a basis for such rules. The format addresses shapes as based on a conglomeration of points in a coordinate system.

The shapes of objects sensed by a body part, such as the palm, may be composed of identical building blocks that are combined at a particular time and stay in cohesion for a specified duration. These "atomic" units will be referred to as elements. The elements could take any form as long as they are kept uniform during any definition of a shape. It should be mentioned that the definition of shapes means the definition of perceived shape, i.e., virtual reality of a shape. For example, the shape of a straight diagonal line running from North-West to South-East may not be a real line that creates the impact but rather the two end points, one in the North-West and one in the South-East that may create the sensation of such a line.

Dynamic elements are provided by attributing action to body parts, such as the palm throughout strength of impact, vibration, or perceived (virtual) movement of elements, whether in linear, curvature, rotational or other motion. Thus, dynamic elements provide for direction, size and speed, to name a few situations.

Moving Object: Moving objects are transliterated into a shape made of one or more element that produce the feeling of movement in a particular direction. The perception is provided when successive shapes come into impact with the body part then release the impact whereupon the next shape causes an impact.

Example

An element is perceived to move from left to right, when in reality impacts on the body part are produced by elements that do not otherwise move. Only successive individual elements create through the total sequential impacts, a sensation of motion in the specified direction.

Any person who is versed in the art (mathematics, physics, etc.) can write down the equations representing other static or dynamic representations such as from the sample list provided below.

Various idiosyncrasies related to our watching a TV broadcast do not simply translate to functional equivalent watching on a PalmScreen. We encounter several situations that either relate to the technology utilized in TV or its performance, or relate to cultural elements of utilizing TV broadcasting. Such situations are encountered below and provide the building blocks solutions needed for Touch Language.

Another aspect of the dynamic variable is best discussed in the context of standard TV sets. The continuous changing images on TV occur due to rapid change in still frames that is faster than human eyes can perceive. The standard TV changes frames and runs through 30 frames per second. In Touch Language, one is confronted with the problem of representing continuous situations. An example is a moving car. Due to the rapid change of 30 frames per second, the car appears to our eyes as if it is moving in a particular direction. It presents no problem therefore, if the car continues to move in a particular direction for a while as the scenery and the path of the car continue to change from second to second.

When we describe motion in Touch Language, actual perception of motion is used on the PalmScreen or on any other body part chosen for that purpose. However, the traveling sensation caused by a mechanical means, such as those described herein, has a limit, which is the territorial limit of the PalmScreen and unlike standard TV, one is unable to change the screen from the outset. Therefore, a different solution is provided. Instead of changes in the PalmScreen, changes are mandated in the path of the object creating mechanically the sensation. Thus, the path of the object itself may be changed as many times as needed. For example, let's consider a motion, such as a car traveling from South to North on the PalmScreen. When the mechanical object reaches the North of the PalmScreen, it reverts to it initial South position on the PalmScreen to continue, which practically means repeat its movement toward the North. An indicator is needed for the deafblind person, so that the repeated movement will be considered a continuation. Such an indicator is a dynamic parameter providing the needed signal at the point when the mechanical object reverts to its initial position to create the "illusion" of continuance. There are various possibilities for such a signal. It could be a vibration at the end of the motion before it is repeated. It could be a simultaneous impact at the last and new location of repetition, returning from the end point in the PalmScreen in a straight (but Snake) line to the South of the PalmScreen for repositioning a repetition, multiple short impacts at the end point, just before repositioning, etc. The latter one may be selected as the signal.

There are other dynamic parameters that relate to the functional equivalent TV screen. For example, the rate of 30 frames per second is a fixed rate once the TV unit has been manufactured and shipped out of the factory. If the PalmScreen is considered, the rate of functional equivalence of a PalmScreen rate of change is variable and not fixed as in the case of a standard TV. The reason for being a variable lies in the fact that providing a functional equivalent description of motion on the PalmScreen depends on the speed and duration of the motion. Namely, the longer or faster the motion is, the sooner one will run out of the territory of the PalmScreen, since the territory is constant to a particular user.

That is, if V=Speed,
T=Time (duration of the motion)
L=Length (of the territory length of PalmScreen),
then: there is the familiar formula of V*T=L; where L=is a constant.

Therefore, a Screen Change Variable is defined as an appropriate dynamic variable for such purpose. Note, that the definition is for a "Screen" Change Variable and not for a "PalmScreen" change Variable. The reason is, that other body parts can be used instead of the palm, such as the back of the arm, the thigh, etc., if a disability prevents the usage of the palm.
Thus, if S=Screen Change Variable,
then, S=V*T/L; where S is a dimensionless number.

The S number provides the number of functional equivalent static frames per second, namely, the number of times one needs to activate repositioning of the mechanical signal for repetition. Thus, S=1 means a single repetition, while S=4 means four repetitions.

It is an acceptable, though not always a welcome fact, that there are commercial breaks in most TV broadcasting. The deafblind user of the PalmScreen needs to know when a commercial begins and when it ends. It is needed since vision that immediately tells any other viewer such differential boundaries from the show being watched is not available to the deafblind. Relegating such task to "verbal" information delivered via Morse vibrations is not effective and can cause confusion. Thus, such a signal needs to be produced at the PalmScreen. A large letter "C" (for "commercial"), impacted multiple times in rapid succession on the PalmScreen via styli 82, may be selected to signify the beginning of a commercial. By "large letter C", the impression of the letter C that is almost as large as the size of the PalmScreen is meant. Likewise, the same large letter "C" may be selected for the end of the commercial, except for a Top Right to Bottom Left Oblique Line, created by the styli 82, immediately follows the letter "C". The three impacts turn now to be six rapid impacts of the letter "C" followed by the Top Right to Bottom Left Oblique Line.

TV stations that are dedicated as "News Channels", such as CNN, MSNBC, or Fox News, provide at the bottom of the screen one or two additional segments of information delivered as text. One of the two can appear as a continuous running strip of information. This represents a requirement choice between the upper TV screen and the written material at the bottom of it. The selection process is challenging when one compares it to the hearing and seeing TV viewers. The reason is that seeing and hearing persons scan the TV screen visually while listening to the verbal exposition provided by the TV. The deafblind are deprived of such scanning procedure and if they are to benefit from a functionally equivalent TV watching, the challenge of rapid assessment of both upper and bottom screen is significant. The deafblind are not able to utilize the hearing sense to listen to what happens on the upper side of the screen while utilizing their seeing sense to read the information strip at the bottom of the screen. Furthermore, the rapidity required in the process contraindicates utility for the deafblind. Finally, the running strip of printed news at the bottom of the screen is stopped during TV commercials. The latter is not as challenging since Touch Language provides announcements of the start and finish of commercials. The former can benefit from the fact that running news strips at the bottom of the TV screen, repeat the same content once the strip reaches its end. Such information can be stored in the memory of the contraption used by the deafblind partaking in such a TV broadcast. Since the strip content is finite and limited in its volume, it can be made available to the deafblind who do not need to perceive it simultaneously with the exposition on the rest of the screen. This presents an edge over the hearing and seeing persons. Nonetheless, the deafblind can choose to retrieve such information during commercial periods, if they so desire, since they perceive the signaling for the start and end of commercials, provided independently on their PalmScreen by touch.

It is common in watching a suspense movie on TV, to have no words, dialogue or written material, where all that is presented to the viewer is some screen activity with a background sound or music. The music is composed and utilized for the creation of a sense of suspense in the viewer. Since the deafblind cannot hear the music, a functionally equivalent signal that can achieve a similar effect for the deafblind needs to be found.

The solution provided is through rapid impacts to the PalmScreen by a small mechanical object such as styli 82. Namely, "up and down impacts", that is short and long sets of impacts to the Palm, either in a particular series, random, or "composed" in a particular manner. Such impacts are delivered to a designated area, such as the PalmScreen or another equivalent screen chosen on the body. Finally, the specific location on the PalmScreen to where the series of impacts related to any activity are delivered needs to be considered. Whether it is always constant to the same location on the PalmScreen, or varies according to situations. The variable location is preferred, and developed below is the approach for the functional equivalent sound effects.

A station ID number can appear on an upper side of the screen and enables the viewer to know what station is being watched. The number is either constantly up on the screen or can be activated to be there. The deafblind who utilizes a PalmScreen would benefit from keeping to a minimum the amount of information transmitted to the PalmScreen. It is not of particular difficulty to provide the deafblind "viewer" a station ID number on demand. The more difficult question arises as to how to create within the constraints of minimized output to the PalmScreen, a truly functional equivalent constant listing of a station number on the TV screen. Such permanent information will be too distracting due to the fact that its delivery by touch sense has to be by discrete repetitive motions. Thus, station ID number can be provided only upon request.

Time display is important, for example, in order to judge the time duration to the end of the show. The same reasons discussed regarding a Station ID Number prevail here as well. Thus, time display is provided also only upon demand.

When a hearing person encounters problems in TV reception it is recognized as such even if there are a few seconds of delay due to momentary confusion. Since the hearing person perceives both audio and visual signals, one has the sensory tools for immediate perception of the occurrence. The situation is different in the case of deafblind persons who partake in a TV broadcast. A supplemental signal is required, except that it needs to be preceded by recognizing that a problem exists in reception. The selected signal or code is utilization of the Morse code segment of the PalmScreen, together with coded signaling of the problem as is provided below.

The PalmScreen abruptly stops operating in its standard mode. Instead, the Palm starts a series of long vibrations (5 or more seconds) with short (2 seconds) interruption of a stationary palm without any vibrations.

It is immaterial for the deafblind if the TV screen is dark or shows "snow" effect. Therefore, the same signal serves to indicate either one of the disruptive situations, dark screen or "snow" on the screen.

As much as the disturbing effect on viewing could be aggravating when interrupted by testing the Emergency Broadcasting Service during a show could be a lot more confusing and irksome to a deafblind individual watching a show, and utilizing a PalmScreen. The solution selected relies on the fact that during any such testing a hearing viewer cannot enjoy the show. Therefore, there is no need to provide the deafblind with more than the hearing is provided with. Thus, the solution is limited to recognize that a test is in progress and notify the deafblind when the test starts and when it ends. The recognition part will be relegated to the Emergency Broadcasting Service that will have to issue a special signal recognizable by the device and delivered simultaneously with its signal to the TV station. Thus, the signal selected is cessation of visual impacts on the PalmScreen for the purpose of testing, substituted by multiple impacts of a large letter "T" (for "Test") on the PalmScreen via styli 82 to mark the beginning of the test, while the vibrating/pecking Morse segments provides the text appearing on the screen and that is part of the special signal for the deafblind sent by the testing agency. The end of the test may be marked by the large letter "T" followed immediately by a "Top Right to Bottom Left Oblique line, and the sequence repeats its impact multiple times on the PalmScreen. Such letters as "C" or "T" provided as auxiliary could be any other letters chosen in other countries so that they are commensurate with their language and/or culture.

The TV Guide observable on the TV screen provides at present a commercial at the upper part of the screen, whereas the information related to the shows is provided in a dynamically changing list that scrolls up the TV screen. The problem before us requires first limiting the exposure of the PalmScreen only to the lower half of the TV Guide channel. The commercial information related to other TV presentations, given on the upper part of the screen is designed to capture the hearing and seeing audience. Such audience is capable of multiple simultaneous perceptions, whereas for the deafblind this presents an unrequited overload of information, unrelated to the specific need at hand. The solution is provided below subsequent to the discussion of the second task. The reason for the delay will become apparent momentarily.

The second task requires the ability to capture the information and deliver it to the PalmScreen. The initial problem rests in the rapid change of the information that does not allow realistically to follow it, capture it, and deliver it before a line of information related to a channel disappears from the TV screen. Furthermore, such information on the screen, though visual, depends on our reading ability that goes beyond visual perception. The task to provide the channel information to deafblind "viewers" is simplified due to the fact that any hearing person watching TV, cannot use the TV Guide channel simultaneously with another channel and the same stands for the deafblind. Thus, that portion of the TV Guide channel is relegated to vibrating/pecking Morse delivery segment of the apparatus or more efficiently to the Dialogue portion of Touch Language.

Furthermore, due to the latter fact, the commercial part of the TV Guide channel becomes irrelevant to our solution. The reason lies in the fact that providing functional equivalent information about the channels can be prepared and delivered irrespective of synchronizing it with the visual part of the TV screen.

Utilizing a remote control to maneuver among stations, to increase or decrease volume, or to mute sound is quite useful to the hearing person. However, for the deafblind it would be essential, yet pose a challenge. It is essential because the hearing can go up or down the channels, with a blink of the eye discerning whether the desired station has been located and then rest the search. It would be much more cumbersome for the deafblind. Therefore, a remote control unit having keys with elevated station numbers in Braille would be quite useful. However, it leaves a major challenge to enable the deafblind to perceive without delay the station attained and the material presented on the screen.

Remote control functions for the deafblind can be divided into three groups.

(a) Functional equivalent operations of standard remote controls for the hearing (Group S)

Turning the TV on or off

Time display

Station ID display

Browsing up and down the channels (b) Standard remote control functions that are irrelevant for deafblind users (Group 0)

Increase or decrease sound volume

Mute function (c) Functions relevant only to deafblind users utilizing a functional equivalent remote control (Group R)

Repeat function

Bookmark stations

Switching between bookmarked stations

The operations are handled by various cutaneous stimulations that are discussed below under the appropriate receptor, such as Palm, back of fingers and face of fingers.

Definitions

Dynamic Parameters

Provided below are some examples of Basic Dynamic Parameters.

Basic Dynamic Parameters

End Point: The last point reached in a single pass of a path description on the palm.

Suspense "music": A series of short and long impacts on a body designated area, designed to create a sense of suspense in the viewer of a TV show.

Beginning of a Commercial: The letter "C" almost as large as the size of the PalmScreen impacts three times in rapid succession on the PalmScreen.

Ending of a Commercial: The letter "C" almost as large as the size of the PalmScreen followed by a Top Right to Bottom Left Oblique Line. The process on the PalmScreen repeats three times in succession.

Test of the Emergency Broadcasting Service: The letter "T" almost as large as the size of the PalmScreen impacts three times in rapid succession on the Palm Screen.

Ending Test of the Emergency Broadcasting Service: The letter "T" almost as large as the size of the PalmScreen followed by a Top Right to Bottom Left Oblique Line impact on the PalmScreen. The process on the PalmScreen repeats three times in succession.

Expanding Ring: A small Ring expanding to become a larger Ring.

Contracting Ring: A large Ring collapsing to become a small Ring.

Circling Ring: A Ring that rotates like a wheel around its center.

Combinatory Dynamic Parameters

Provided below are some examples of Combinatory Dynamic Parameters.

Crossed Oblique Lines: A Right Base to Left Top Oblique Line crossed by a Left Base to Right Top Oblique Line. The crossing is either by simultaneous action (i.e., imparting a large "X" sign on the PalmScreen) or impacts in succession to create the cross perception.

With the tools of static elements and dynamic parameters defined, they can be attributed to actual descriptive components of visual scenes.

A cue from sign language may be taken regarding multiple meaning words. That is, some particular signs used in sign language denote more than a single English word. The words are related, but there are some fine-tune differences. For example, the same sign in sign language represents both the words "big" and "large". This economizing in signs is quite prevalent in sign language. We will utilize such sign language word meanings, however, we will extend it for other touch language elements. In touch language, words such as "expansion" and "explosion" will be represented with the same touch language descriptive. As will be seen below, touch language provides tools that are unique to its form. For example, "explosion" carries a stronger impact on the PalmScreen. The reverse is also true. In spoken language we encounter words that have multiple meanings. For example, the word "Right" can represent "Right turn", or "To be right", or "This is my right". While it is intuitive for hearing persons to correlate the word with its correct meaning, this is not the case for persons using sign language. Thus, each of the above meanings has a different sign utilized in sign language. The deafblind are in a double jeopardy situation. Being deaf they cannot hear the multiple meaning word, and being unable to see, sign language (except feeling fingerspelling in their cupped palm) and therefore it is not meaningful for them. However, there is a third situation, which we will discuss below under the Cultural Aspects.

Provided below are a few examples of the Attributes of Touch Language.

Size (of objects): Strength of impact may be used to relate the size. The stronger the impact, the larger is the size. Adding vibration subsequent to the impact before retrieving of the shape means much enhanced size. Alternatively, adding several impact nibbles in rapid succession will produce a similar articulation.

Expansion: A circular shape of small radius that is replaced rapidly with succession of other circular shapes, each of which has a larger radius than its former.

Explosion: "Expansion" procedure with an impact of the last circular shape (with the largest radius) or several such impacts or added vibration provided at that point.

Implosion: A circular shape of large radius that is replaced rapidly with succession of other circular shapes, each of which has a smaller radius than its former describing a contracting situation as reversed to expansion with one or more impacts by the last circular shape or vibration.

Diminishing size with moving away: A dynamic motion shape with an imploding semi-circle behind it. It should be noted however, that such diminishing of size by distance is a visual concept that may not have relevance for the blind person.

Rolling Object (e.g. car): Motion shape in a particular direction repeated a few times at the same location, where each time before repetition a circular Shape Motion appears next to it, and then at growing distance from it.

The PalmScreen and the option of the vibrating Palm as receptors in a particular embodiment have previously been discussed. Some group components would find their delivery to these receptors rather natural, but the multitude of groups and components require additional receptors. The task then, is to facilitate the process of delivery and reception rather than make it more cumbersome. The solution provided for the embodiment discussed utilizes the back of the hand and back of the fingers, with the topography adhering to rules provided below.

Back of Fingers as Receptors

Figure 10:
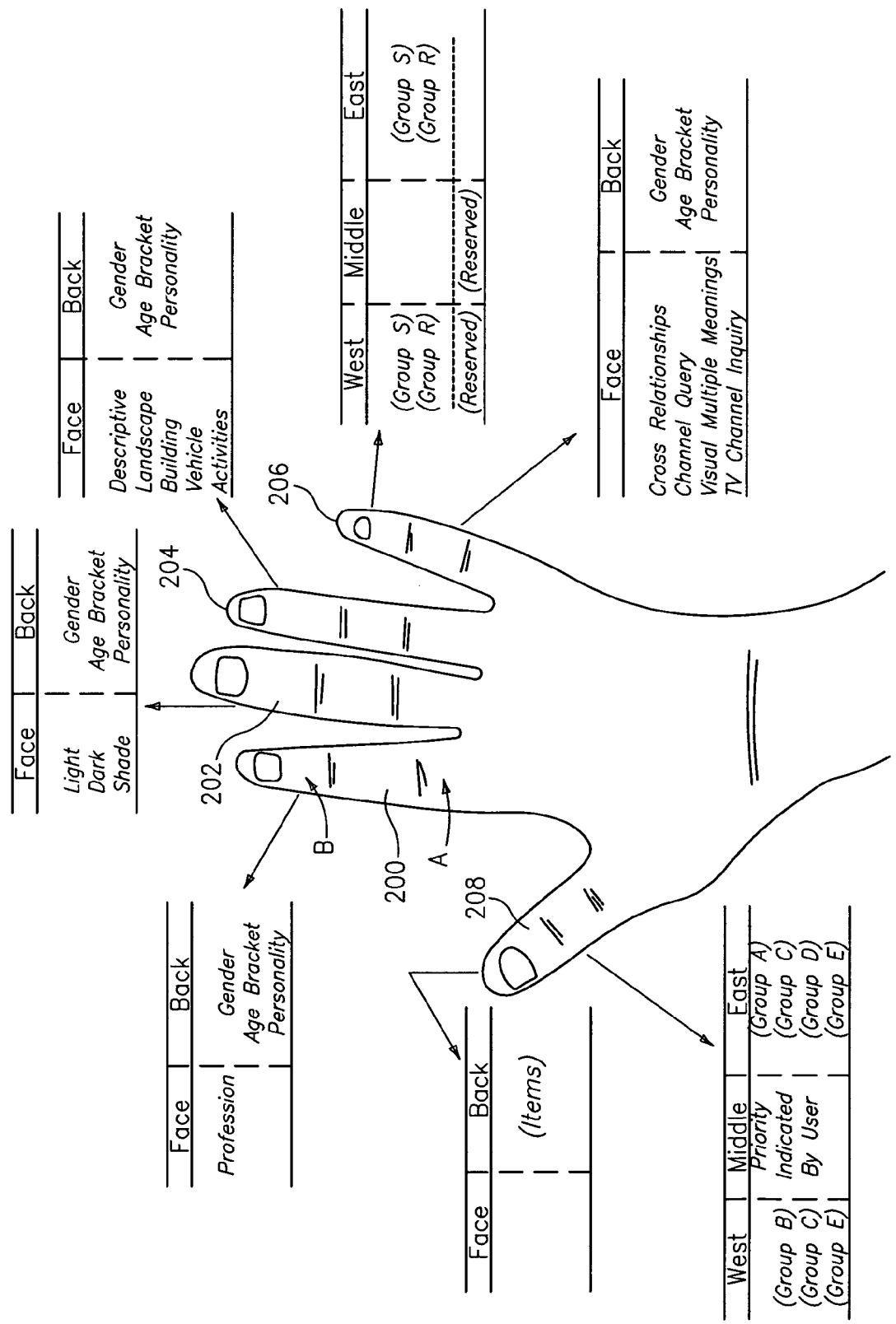
FIG. 10 illustrates the use of the fingers of a dominant hand as receptors.

First the four fingers of the dominant hand are divided into two groups, A and B as shown in FIG. 10.

Groups that Represent Personal Character.

Group-A: The Pointer and Middle fingers 200 and 202.

Group B: The Ring finger 204 and the Pinky finger 206.

Group-A: Represents bad, evil, or negative personalities, deeds, thoughts, etc.

Group-B: Represents good, pure, naïve, or innocent personalities, deeds, thoughts, etc.

Each of the Groups A and B may further be divided into two Sub-groups, where a Sub-group contains a single finger. Thus, Group A, as well as Group B, each has two Sub-groups that represent the Gender subgroups. The even number fingers represent males, while the odd number fingers represent females.

Sub-Groups that Represent Gender.

Sub-group A(1): The Pointer finger 200 represents Male gender

Sub-group A(2): The Middle finger 202 represents Female gender

Sub-group B(1): The Third finger 204 represents Male gender

Sub-group B(2): The Fourth finger 206 (Pinky) represents Female gender

The back-of-the-fingers receive their information by Nibbles from styli 90, and/or Sticks such as sliding elements 50, 52 and 54, where the number of impacts carries specific information.

Nibble Impacts:
The Genderfinger:
Single Impact: Young age
Two Impacts: Adult
Three Impacts: Older age
The Personality (i.e., good or bad) finger:
Single Impact: Slightly or undecided
Two Impacts: Moderate to medium
Three Impacts: Strong to extreme The gender fingers are recipients of information related to both age as well as personality character characterized by nibbles impacting on them. The ability to distinguish clearly which type of information is imparted by the nibbles rests on the location of the impacts on the back of the fingers. Namely, there are two areas for Nibble impacts:

Area (A) that is on the back of the finger and closer to the wrist [Group (A) nibbles] as shown in FIG. 10. [The degree of the personality]

Area (B) that is on the back of the finger and closer to the tip of the finger [Group (B) nibbles] as shown in FIG. 10. [The age bracket]

The form in which the nibbles from each group are utilized appears in the section that discusses the Rules of Association.

Examples of Signal Delivery (1) Let us consider a visual on a TV screen which shows a bad man chasing an innocent young girl. The delivery is as follows:

A Palm device vibrates or impacts the word "Chase".

The PalmScreen senses a path descriptive of the running young girl followed by the bad man.

The back of the Pinky 206 (Group-B finger representing an innocent female) is impacted once (representing young) by a "nibble". The result means an innocent young girl is chased along the path described.

The back of the pointer finger 200 (i.e. male) (Group-A finger representing bad or evil), impacted twice (i.e., an adult) by a nibble. The result means an evil adult man is chasing along the path described.

While the description appears lengthy on paper, for the deafblind who is trained with the Touch Language, the process is quick, and with practice even intuitive.

However, such groups of receptors are still insufficient when one considers their multitude and therefore concludes that additional receptors are needed. Thus, we add the face of the fingers and the back of the hand as additional receptors, with the aim of providing additional information while keeping the complexity of perceived touch sensation to be manageable for a deafblind person.

Face of Fingers as Receptors

The Face of the fingers 200, 202, 204 and 206 does not act as a simple addition to the back of the fingers by extending the number of fingers used. The role of the face of the fingers different and thereby easier to utilize. Each one of the fingers utilized from the face of the fingers group is utilized to represent a group associated with the information provided by the back of the fingers and the nibbles. In effect, each of the fingers utilized in the face of the hand, provides a selection of a group that is further narrowed down to specifics with information from the back of the hand and the back of the fingers.

Utility of the Back of the Hand

The back of the dominant hand is utilized to articulate specific definitions. By itself each of the elements described by the back of the hand has no meaning. The meaning comes into effect only when utilized with the fingers acting as sensors or receptors. Examples are provided below after the introduction of the face of the pointer finger, so that they will carry understandable meanings. The specific utility of the back of the hand is achieved with nibbles produced by impacting parts 34 and/or keys 18, 20 and 22. Thus, the number of impacts produced by the nibbles, provides the definitions below.

| Number of Impacts | Meaning |
| --- | --- |
| 1 | Of |
| 2 | To |
| 3 | From |
| 4 | Profession/job? |
| 5 | Disguise |

Group Representation Utilizing Face of the Fingers of the Dominant hand

The Pointer Finger: The People-persons Group
The Middle Finger: Light Dark and Shade Group
The Ring Finger: The descriptive Group
The Pinky Finger: The Pinky finger has four major utilities:
Female representation
The Cross Relationship Group utility
TV channel query and selection
Multiple Meanings in Visual Human Signs A descriptive representation is needed that will enable the designers of TV shows transliteration to Touch Language, to use a recognized common format. It could also be useful in creating the Touch Language learning modules for the ultimate users, the deafblind. The descriptive representation needs also to reckon with the universality issue by introducing elements that are not associated with any particular language. For example, the letter "P" will not be included to represent the pointer finger, since the word "Pointer", or even its classification as such, is not universal and changes from culture and language to culture and language. However, using "1" for the finger is universal, as long as we also (universally) know that we represent the first finger rather than say the first word in a sequence. It will also depart from cultural names provided each finger and restrict ourselves to counting the five sequentially, starting from the thumb, which will therefore be classified as finger number one. The capital letter "L" may be chosen without any language or cultural meaning. Its selection is based on the fact that it will be easier to classify in our scheme what is the face ("inner") part and what is the back ("outer") part of the finger. The capital letter "G" may be chosen to enable unambiguous determination if the back of the hand is meant or the palm ("inner") part of the hand. With such reasoning we have selected a representation for Touch Language that is provided below.

\>L: Back of Finger
L<: Face of Finger
\>G: The Back of the Hand (or for closure it can also be represented as < >G)
 G<: The Palm (inner part of the Hand), or G< >.
 1>L: Back First Finger (the "thumb" in our representation)
 2>L: Back Second ("Pointer") Finger
 3>L: Back of Third ("Middle") Finger
 L<1: Face of the First ("Thumb") Finger
 L<2: Face of the Second ("Pointer") Finger
 L<3: Face of the Third ("Middle") Finger In all those cases, the signal is completed into a close signal, so that for example, ">L" appears as "< >L" and include inside the brackets the finger number, such as "<3>L" or "L<2>" unless ambiguity becomes an issue. For example, the face of the second finger followed by the back of third finger would appear as L<2><3>L and to avoid confusion it will appear as L<2 3>L.

Next, one needs to include in the representation a proper nibble manifestation, as well as specifying the number of impacts delivered to the selected body part. The Selected designator for the nibble may be for the upper part of the finger and "v" for the lower part of the finger, followed by the number of impacts and closed with a right parenthesis. Thus, for example, "<5>Lv3^3)" means an older female person who is exceptionally good, while "<2>Lv1^2)" represents an adult male who is slightly bad or mischievous. When the number of impacts are added to combine back of a finger with the face of a finger for a particular meaning, the addition symbol, plus, i.e., "+", may be used. The middle part of the finger may show up as two horizontal parallel lines between the "^" and the "v" signs.

It was noticed before, that the back of the fingers could signify good and evil, as well as gender. However, it can also articulate the gender to be a family member, as well as specifically naming the relationship of the particular person in the family, such as brothers, sisters, uncle who is the brother of the mother or father, a maternal or paternal grandmother, etc. To enable such more refined articulation, without overbearing the amount of information, time for perception and enabling it all to be almost instinctive, whereas it becomes functional equivalent to "seeing" that person on the TV screen and knowing by sight who performs the act projected (i.e., felt) on the PalmScreen, the face of the fingers are utilized, and in that particular case, the face of the pointer finger. It should be remarked that the nibble is not only used for the back of the fingers and is prevalent also in its utility to the face of the fingers, as well as on the back of the hand.

The Face of the Pointer Finger with Nibbles (Peoples' Finger):

The face of the pointer finger, as the rest of the face fingers, works in conjunction with the back of the fingers. The face of the pointer finger can symbolize a number of human identities, such as a family member, a banker, a teacher, a criminal and so on. Thus, the face of the pointer finger narrows the perception to the human entity. However, this is not enough, and it is needed to narrow down the multitude of options to a specific articulation. The human entity in question can be painted as good or evil, as male or female and associate an age bracket with it, all based on how the back of the fingers is utilized. In order to specify that human entity into a recognizable identity in the myriad of human possibilities the nibble functions on the face of the pointer finger are utilized. The following nibble impacts identify the specific identities:

| Number of Impacts | Identity |
|---|---|
| 1 | Parents |
| 2 | Spouse |
| 3 | Siblings |
| 4 | Relation Range (stranger to lover) |
| 5 | Step parents . . . |

Let's examine through an example, how the back of the hand together with the face of the fingers enable one to perceive the specific images of family relations that appear as visuals the TV screen. Visuals of relations on TV are quite different from their written appearance in a book. For example, once one sees a maternal grandmother on the TV screen, one retains the visual association from then on. It is sufficient to see that maternal grandmother in whatever activity to know the association to the daughter, the mother of the children. In written description however, one compensates for the lack of visuals by either remembering her in the context of what is written, or referring to her by name so that the association can be made. However, the controls of reading a book depends on the reader who can slow the reading to the pace needed for making the connections, going back and revisit the relative sentence or section, and so on. The situation is quite different in a TV show. The exposure time of the visuals depend on the airing station and the show dynamics and unlike written books, names are not used with the visuals since it is superfluous. Hence, the need for the signals which have been designed, which may look elaborate, but should prove to be simple in reality, let alone helpful and necessary for the deafblind to follow the show. Some examples are:

Father in Law: (father of the wife or husband)—
Paternal Grandfather: (father of the father)—
Maternal Grandfather: (father of the mother)—
Paternal Grandmother: (mother of the father)—
Maternal Grandmother: (mother of the mother)—
Paternal Uncle: (brother of the father)—
Maternal Uncle: (brother of the mother)—
Paternal Aunt: (sister of the father)—
Maternal Aunt: (sister of the mother)—

Thus, "L<2>^2)" means face of the pointer finger with a double impact by the nibble, or in its meaning a spouse, and when combined with "<4>L^3)", that stands for older good male, it represents together a good older husband. On the other hand, when combined with "<2>L^1)" means a bad very young husband, while in combination with "<3>L^1)" represents a bad very young wife and in combination with "<5>L.^3)" represents an older good wife. Therefore, in the complete combinatory representation, an older good wife (spouse+type of person with gender) is represented by "[L<2>^2)+<5>L^3)]" and means the "good older wife".

Furthermore, when utilizing the back of the hand with a single nibble to mean "OF" one can represent for example, a good maternal grandfather as:

"[<4>L^3)+L<1>L^3)]< >G^1)[<2>L^1)+<5>L^1)]", except, however, that we can articulate even to a much finer degree, as we have just demonstrated by representing a good older father of the good young mother. We note that the representations with character attributes are prejudicial, however, this is also the case in visual TV where actors are selected to "look" the part they represent, such as good, bad, educated, etc.

The square brackets have been added in order to signify the relationship between the face and the back finger as a unit in defining the object. Also, the user can forego the face of the finger "fine grain" description and stay just with the back of the fingers to get the general idea of what is happening on the screen. Namely, if the user for example is not interested that it is the husband who is evil and chases the good mother in law, it is sufficient to follow just the back of the fingers to know that an evil male is chasing a good woman.

There are several more in the human descriptive than what has been provided so far. To this end, the use of the face of the pointer finger is expanded, or in our new representation, L<2> to numerous other human appearances. Namely, one needs to account for plumbers, policemen, judges, attorneys, teachers, drivers, etc. To enable that, nibbles are directed to impact at the upper (third) part of the face of the pointer finger. Such nibble impacts are named "Upper Nibbles" or "Upper Impacts". The number of such upper impacts determines the group of professionals, and the list of regular impacts (lower impacts) determines the particular profession in that group. It should be noted that the professional description is always preceded by impacts on the back of the hand (four in our current representation), announcing that the next set of impacts will be related to the profession of the entity.

We designated the mark "^" for the upper nibble impact, and the number following, the specific group. The "^" 0 has already been encountered, where the upper nibble has not been used at all.

| No. of Upper Nibble Impacts | Profession Type |
| --- | --- |
| 1 | Law & Order/Criminal |
| 2 | Blue Collar |
| 3 | Education |
| 4 | Medical |
| 5 | Miscl./white collar |

The first group of upper nibble impacts, "^1") with its related (lower) level nibble impacts "v1)" to "^5)" is given below.

Lower Nibble Impacts Related to a Single Upper Nibble

| No. of Lower Nibble Impacts | Profession Type |
| --- | --- |
| 1 | Detective |
| 2 | Policeman |
| 3 | Criminal (Robber, thief, etc.) |
| 4 | Defense attorney |
| 5 | Prosecutor |
| 6 | Judge |
| 7 | Bailiff |

Examples

As an example, consider a criminal "[^1)+v3)]" or, consider and adult policeman "[^1)+v2)]".

The personality and gender fingers are totally dissociated from the elements provided by the face of the fingers. That is, the face of the pointer finger articulates both males and females, both good and bad. The distinction is made by the back of the fingers that provide the personality, gender and age of the professional described by the face of the pointer finger.

The Face of the Middle Finger with Nibbles (Lighting Finger):

The face of the lighting finger provides information regarding lighting conditions in the ambient environment of the scenes as seen on the TV screen. A question that may arise in the minds of those who are not blind is the relevancy of lighting condition for a person that cannot see. While blind persons cannot see, they are aware at the very minimum of changes in strong lights. However, that is only incidental to their perception of a daylight scene versus a scene in a dark environment. They deserve to know the details of the scene on TV as it may be integral to the state imparted on the viewer, such as a person walking in the dark and being worried because of one reason or another. Thus, the following lighting states are presented.

| No. of Nibble Impacts | Meaning |
| --- | --- |
| 1 | Bright Daylight |
| 2 | Dull Daylight |
| 3 | Darkness |
| 4 | Flashlight |
| 5 | Spot Light (e.g., from a chopper) |
| 6 | Lightning |

The source of the lighting condition might have certain importance. Namely, artificial lighting of a designated area at night, turning a place dark by shutting off the lights, or other induced light conditions. A touch language parameter for such situation may be determined later.

The Face of the Fourth Finger with Nibbles (Description Finger):

The face of the fourth finger is a rather busy finger, receiving both upper and lower nibble impacts. Since we are already familiar with the notions and functions of upper and lower nibble impacts some essentials are presented below.

| No. of Upper Nibble Impacts | Description Type |
| --- | --- |
| 1 | Landscape |
| 2 | City |
| 3 | Buildings [hospitals, offices] |
| 4 | Transportation [airplanes, cars, trains, choppers] |
| 5 | Activities [dancing, walking, running, jumping] |
| 6 | Fighting [boxing, karate] |

Lower Nibble Impacts Related to a Single Upper Nibble

| No. of Lower Nibble Impacts | Description |
| --- | --- |
| 1 | Trees |
| 2 | Bushes |
| 3 | Desert |
| 4 | Mountains |
| 5 | Cliff |
| 6 | (Reserved) |
| 7 | (Reserved) |
| 8 | (Reserved) |

The Thumb

Figure 11:
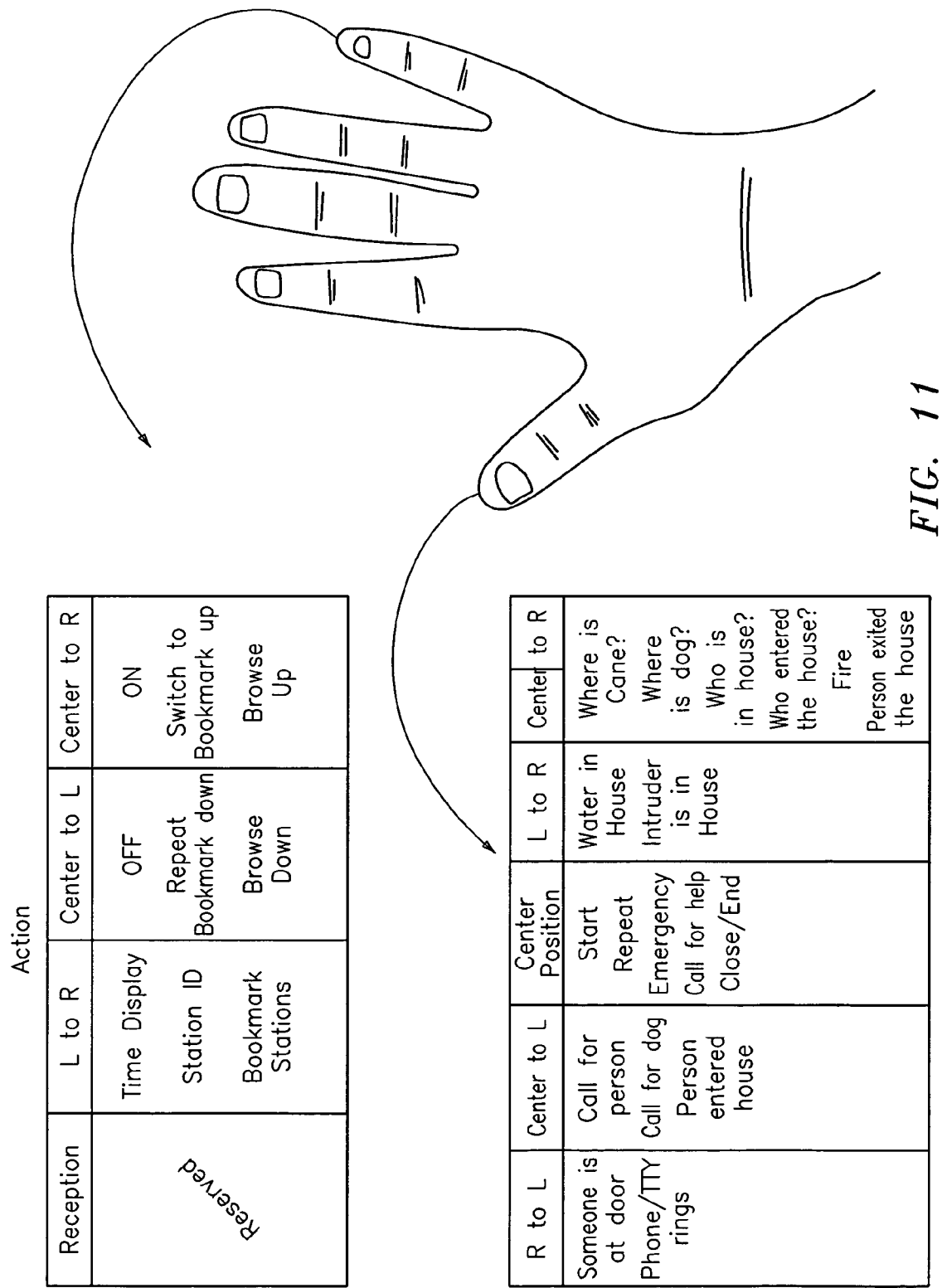
FIG. 11 illustrates how control functions are provided.

The first finger of the dominant hand, the thumb 208, has different functions than the other four discussed above. The thumb is reserved for control and alerts functions such as that shown in FIG. 11. The control functions are such that any remote control may have, except that for a deafblind person one substitutes functions that are not needed, such as increase or decrease volume, or mute the sound altogether. They are "substituted" for other important functions that are important for the deafblind. The most important of them all in perceiving a TV broadcast is the repeat function. It enables the deafblind to have an immediate repeat of the set of articulations so that the essence of the functional equivalent visual makes sense and enables to continue and perceive the TV show. Thus, the thumb operates in a reversed nibble impact. Namely, the impacts delivered by the thumb via the cradle 120 control the operation of the device. The thumb can also be utilized in conjunction with an eCane, or other special devices of utility for the deafblind.

The control and alert functions are respectively, activity generated by the thumb and information delivered to the thumb. It is assumed that the deafblind person cannot speak at all. If the person can speak, then certain amenities provided by the list below are not required. Likewise, is the situation with a blind person who can hear.

Thumb Control and Alert Function
  Activity Generated by the Thumb
    Call for help Function (Group A)
      Calling an emergency help number ("911" in the US)
      "Help please" [to whoever is in the vicinity]
      Calling the (hearing/seeing) dog for immediate help
    Specific Questions Function (Group B)
      Where is the eCane?
      Where is the (seeing/hearing) dog?
      Who is in the house (now)?
      Who entered or exited the house just now?
    Summoning Functions (Group C)
      Asking a person in the house to approach
      Calling for the seeing/hearing dog to approach
  Information Delivered to the Thumb
    Safety Alerts (Priority Group)
      Fire
      Water rising in the house
      There is an intruder in the house
    General Alerts (Group D)
      Someone is at the door
      The phone/TTY is "ringing"
    General Information (Group E)
      Persons entering the house
      Persons exiting the house The Thumb of the Dominant Hand as a Passive Receptor The thumb is also a receptor for nibble impacts via a finger such as that shown in FIG. 1 much as the back of the fingers. However, whereas the back of the other fingers pertain to gender and character, the back of the thumb in the passive mode pertains to items rather than person, while the nibbles give the measures as in the rest of the back of the fingers.

The control and alert functions need to avail themselves in a simple, unambiguous way and be easy for perception by the deafblind. Thus, the information is provided through the thumb and the cradle 120 in which it rests or alternatively the sleeve into which the thumb is inserted. Either the cradle or sleeve is referred to as the Thumb Cradle 120.

The thumb cradle 120 can move in at least two directions, East or West and South or North. Whether one chooses one of these sets, or add complexity and plurality of information transmitted by including the other additional set of directions, the principle stays the same. For the purpose of presentation, let's assume the East-West set.

The cradle 102 can move to one direction, East or West, and stay there, or return back to its initial "middle" position. The cradle 120 can also move to one direction and then on return pass the middle position and end up at the opposite direction. Finally, in the case of the latter movement, the cradle 120 can oscillate in a slow or fast frequency, all that while the thumb rests in the cradle 120. Each of the situations described above carry a specific and definite message. The control functions exercised by the thumb, resting in the cradle 120, can be exercised from the middle position or be exercised while the thumb rests on the cradle that is moved to one direction or another. The tables below summarize those situations.

Thumb on Cradle in Middle Position (Priority Group)

| No. of Impacts Delivered | FUNCTION |
|---|---|
| 1 | Start |
| 2 | Repeat |
| 3 | Calling Emergency Help ("911" in the US) |
| 4 | (Reserved) |
| 5 | Calling for help on the premise |
| 6 | Calling for the helping dog |
| 7 | Close or End (any number [7 or more] of impacts) |

Thumb of Cradle in Lateral Positions

The bed or cradle area of the thumb can move laterally sideways to one side or the other, can vibrate sidewise to one side or another, and the vibrations can be low or high frequency. All these elements carry functional information in addition to the impact information delivered to the thumb, as is provided below.

| Move To Left | Move To Right | No. of Times Left | No. of Times Right | Frequency Slow | Frequency High | No. of Thumb Impacts | Information or FUNCTION | Group |
|---|---|---|---|---|---|---|---|---|
| 0 | 0 | 0 | 0 | 0 | 0 | 0 | (Reserved) | |
| 0 | 1 | 0 | 1 | 0 | 0 | 1 | Where is the eCane? | (A) |
| 0 | 1 | 0 | 1 | 0 | 0 | 2 | Where is the dog? | (A) |
| 0 | 1 | 0 | 1 | 0 | 0 | 3 | Who is in the house? | (A) |
| 0 | 1 | 0 | 1 | 0 | 0 | 4 | Who entered the house? | (A) |
| 1 | 0 | 1 | 0 | 0 | 0 | 1 | Calling for a person | (B) |
| 1 | 0 | 1 | 0 | 0 | 0 | 2 | Calling for a dog | (B) |
| 0 | 1 | 0 | 3 | 0 | 1 | 0 | Fire | (C) |
| 1 | 1 | 2 | 2 | 1 | 0 | 0 | water rising in house | (C) |
| 1 | 0 | 4 | 0 | 0 | 1 | 0 | Intruder in the house | (C) |

-continued

| Move To | | No. of Times | | Frequency | | No. of Thumb | Information or | Group |
|---|---|---|---|---|---|---|---|---|
| Left | Right | Left | Right | Slow | High | Impacts | FUNCTION | |
| 0 | 1 | 2 | 0 | 1 | 0 | 0 | Someone is at the door | (D) |
| 0 | 1 | 4 | 0 | 1 | 0 | 0 | Phone/TTY Rings | (D) |
| 1 | 0 | 3 | 0 | 0 | 1 | 0 | Persons entering house | (E) |
| 0 | 1 | 0 | 2 | 1 | 0 | 0 | Persons exiting house | (E) |

1 = Yes;
0 = No

The Face of the Fifth (Pinky) Finger on the Dominant Hand with Nibbles (Cross Relationship Finger):
The fifth (Pinky) finger has three major utilities:
Female representation
The Cross Relationship Group utility
TV channel query and selection Female Representation
We have already encountered before gender representation when utilizing the middle and the fifth (pinky) fingers. The reason for the dual representation is anchored in attributing positive or negative characteristics to each of the fingers. The fifth (pinky) finger has other functions as well and is utilized for the functional equivalent Remote Control.

The Cross Relationship Group Utility
A private example of cross relationships was encountered when we examined the definitions of family members, utilizing the face of the pointer finger. There are of course many other combinations that could provide articulations for many more cases.

TV Channel Query and Selection
The fifth finger 206 utilizes its own cradle or sleeve 120, much the same way that the thumb issues action and receives alerts by utilizing its own cradle.

Functional Equivalent Sentence Information
The combination of keywords and nibble impacts on the back of fingers provide us with functional equivalence of sentence information. Though the description below is given for the English language, it is pertinent universally and is not language specific or language dependent.

Thus, the keywords give the verb or adjective (e.g., speed, go, etc.) whereas the nibbles give the measure (slow, fast, very fast).

For example, consider the two successive words, "car" and "speed". When the keyword "car" is simultaneously conjoined with a single nibble on the back of the thumb, it means a sedan, while three such nibbles would mean a heavy trailer. Likewise, the keyword "speed" would mean slow with a single nibble, fast with two nibbles, and very fast with three nibbles. Note that the word "vehicle" was not used. The reason lies in two factors. First, it is longer to spell and the second is that is always preferable to use simpler words in sign language and therefore in touch language as well.

Touch Language Utility for eCane Usage
Various commands and reception of the eCane can be utilized by using Touch Language. The essentials of Touch Language and their utility for eCane usage are provided below. It can be used for Target-Map, for communications

| Move To | | No. of Times | | Frequency | | No. of Pinky | Information or | Group |
|---|---|---|---|---|---|---|---|---|
| Left | Right | Left | Right | Slow | High | Impacts | FUNCTION | |
| | | | | ACTION | | | | |
| 0 | 0 | 0 | 0 | 0 | 0 | 0 | (Reserved) | (S) |
| 0 | 1 | 0 | 2 | 0 | 1 | 0 | "ON" Activation | (S) |
| 1 | 0 | 2 | 0 | 0 | 1 | 0 | "Off" Activation | (S) |
| 1 | 1 | 1 | 1 | 0 | 1 | 0 | Time display Request | (S) |
| 1 | 1 | 2 | 2 | 1 | 0 | 0 | Station ID | (S) |
| 0 | 1 | 0 | 3 | 1 | 0 | 0 | Browse Stations - Up | (S) |
| 1 | 0 | 3 | 0 | 1 | 0 | 0 | Browse Stations - Down | (S) |
| 1 | 0 | 3 | 0 | 0 | 1 | 0 | Repeat Function | (R) |
| 1 | 0 | 1 | 0 | 0 | 0 | 0 | BM Station | (R) |
| 1 | 0 | 5 | 0 | 1 | 0 | 0 | Switch to lower BM | (R) |
| 0 | 1 | 0 | 5 | 1 | 0 | 0 | Switch to upper BM | (R) |
| | | | | RECEIVE | | | | |
| 0 | 0 | 0 | 0 | 0 | 0 | 0 | (Reserved) | (Z) |
| 0 | 0 | 0 | 0 | 0 | 0 | 0 | (Reserved) | (Z) |
| 0 | 0 | 0 | 0 | 0 | 0 | 0 | (Reserved) | (Z) |
| 0 | 0 | 0 | 0 | 0 | 0 | 0 | (Reserved) | (Z) |
| 0 | 0 | 0 | 0 | 0 | 0 | 0 | (Reserved) | (Z) |
| 0 | 0 | 0 | 0 | 0 | 0 | 0 | (Reserved) | (Z) |
| 0 | 0 | 0 | 0 | 0 | 0 | 0 | (Reserved) | (Z) |

1 = Yes;
0 = No;
2 = Twice in that direction (slow or fast), but no oscillation.
BM = Bookmark with other parties, whether deafblind or hearing, as well as seek functions that enable the deafblind to navigate his/her immediate environment. The Touch Language usage for the eCane can be divided as follows.

Touch Language Modes for the eCane
   Communication Mode (Group T)
     Activate Text to Speech
     Connect to a Telephone Relay Service (TRS)
   Reception Mode (Group K)
     Emergency Vehicle Alert (EVA)
     Directions
     Identification of Objects
   Seek Mode (Group H)
     Target—map
     Indoors
       The home
       Other than home
     Outdoors

| Move To | | No. of Times | | Frequency | | No. of Middle Finger Impacts | Information or Mode | Group |
|---|---|---|---|---|---|---|---|---|
| Left | Right | Left | Right | Slow | High | | | |
| 0 | 0 | 0 | 0 | 0 | 0 | 0 | (Reserved) | |
| 0 | 0 | 0 | 0 | 0 | 0 | 0 | Activate TTS | (T) |
| 0 | 0 | 0 | 0 | 0 | 0 | 0 | Connect to TRS | (T) |
| 0 | 0 | 0 | 0 | 0 | 0 | 0 | EVA | (K) |
| 0 | 0 | 0 | 0 | 0 | 0 | 0 | Directions | (K) |
| 0 | 0 | 0 | 0 | 0 | 0 | 0 | Object Identification | (K) |
| 0 | 0 | 0 | 0 | 0 | 0 | 0 | Target-map | (H) |
| 0 | 0 | 0 | 0 | 0 | 0 | 0 | (Reserved) | (H) |
| 0 | 0 | 0 | 0 | 0 | 0 | 0 | (Reserved) | (H) |
| 0 | 0 | 0 | 0 | 0 | 0 | 0 | (Reserved) | (H) |
| 0 | 0 | 0 | 0 | 0 | 0 | 0 | (Reserved) | (H) |

1 = Yes;
0 = No;
2 = Twice in that direction (slow or fast), but no oscillation.

The specifics for the eCane in the above table are anticipated to be determined with input from the deafblind community Summary of Fingers with Cradle Movement

| Finger | Cradle | Subject Group |
|---|---|---|
| First (Thumb) | 1 | Control Functions |
| Second (index) | 0 | N/A |
| Third (Middle) | 0 | N/A |
| Fourth (Ring) | 0 | N/A |
| Fifth (Pinky) | 1 | TV Remote Control (functionally equivalent) |

1 = Yes; 0 = No; N/A = Not Applicable

Group Characteristics Summary of Fingers

| Finger | Cradle | Subject Group |
|---|---|---|
| First (Thumb) | 1 | Control Functions |
| Second (index) | 0 | Male (Bad) |
| Third (Middle) | 0 | Female(Bad) |
| Fourth (Ring) | 0 | Male (Good) |
| Fifth (Pinky) | 1 | Female (Good) |

1 = Yes; 0 = No

Nibble Characteristics

| Finger | Back of Finger | Face of Finger | Subject Group |
|---|---|---|---|
| First (Thumb) | 1 | 0 | Control Functions |
| Second (index) | 1 | 0 | Degree of being bad |
| Third (Middle) | 1 | 0 | Age Group |
| Fourth (Ring) | 1 | 0 | Degree of being good |
| Fifth (Pinky) | 1 | 0 | Age Group |

1 = Yes; 0 = No

The tools provided herein present universality and the building blocks of its construct lend to its ability to become universally used irrespective of the language practiced at any given place. Therefore, let's first list and examine the relevant components enabling visual dynamically changing scenes begetting the functional equivalent perception of touch.

The components are:

Symbols. The symbols utilized in the Touch language have no cultural, linguistic or other seeming elements of connection to any particular society and as such are universal in their usage.

Visuals. The visuals, namely the dynamically changing scenes, such as on TV, are the same for any culture and irrespective of any language describing in words and sentences the images and their progression.

Attributes. The attributes are based on logical and perceptual assumptions that any human being who perceives them, once trained in their meanings, would sense similar impression. Arguably, various individuals may claim a better or more effective attribute. Thus, the attributes, though presented in written form that is language and culture dependent, by themselves are not linked to it and are therefore independent of any language or culture.

Rules of Association. The rules of association are likewise presented in a particular language that is irrespective and unrelated to the attributes themselves and thus are independent of any language or culture.

Touch Language has the ingredients for a universal language, but more is needed in order to qualify the complete assembly of the ingredients as a language. The ingredients were chosen and each articulated to be language and culture independent, allowing for any culture and language to utilize them with its local linguistic tools. Therefore, Touch Language adopts such syntax and grammar as used by the particular language utilized by the individual user. Hence, the syntax and grammar may differ among users but the ingredients will stay the same. Thus, we propose that, by incorporating syntax and grammar as variables into Touch language, it wins the latter language status. The variables will assume the "value" of a particular language at any time. Making syntax and grammar variables, positions them to become functional equivalent language components and contribute to the notion that Touch Language is not only a language but a Universal language as well.

The Cultural Aspect

The Touch Language, is more than a language, it is also a culture as we discuss next. Touch Language is aimed for use by the deafblind who would be able to enjoy a TV show when utilizing the language. However, the TV broadcast results in visuals of dynamic scenes, which also rely on the culture portrayed. Some of those cultural meanings may be unknown to the deafblind for obvious reason. For example, a wink with the eye carries a meaning both to the person who delivers it as well as the targeted recipient. While Touch Language has the attribute for "wink" as it is part of the TV scene and is needed for completion, it may not carry any significance, or meaning to the deafblind being part of the TV audience. Other examples relate to meaningful looks, such as "don't talk!", "watch what you say!", "did you notice that?", etc. There are also elements of body language, such as moving of the hand to mean "nonsense", Come!", "let's go!", the hand perpendicular to the forehead and facing the ground with a slight moving of the head in a search sign to mean "Where!?", etc. Cultural elements that could be meaningless to a deafblind person are excluded, such as a scene of a parade, though they are not uniquely associated with any particular culture and have an element of universality to them. It is insufficient for such attributes to be simply taught the deafblind. Education that relates to the cultural meanings provided by Touch Language seems an appropriate necessity that will also elevate the deafblind level of participation and integration in their relevant culture and society.

There are various visual signs given by persons, sometimes also culturally based, but that are mostly universal. We have encountered before the example of a "wink" with the eye, which is meaningless for the deafblind who cannot see it and even if they could see it, they would not perceive it for its cultural meaning. The unique aspect of these cultural aspects is that some of them carry multiple cultural meanings as well. Not surprisingly, these multiple cultural signs are people based. Moreover, hearing and seeing persons are the ones utilizing these signs for communicating messages to other such counterpart persons. The challenge demands a transliteration of such multiple meanings in visual human signs into a touch language form that will both render a sense to the occurrence, as well as transcend the meaning of the human gesture, that is culturally unknown to the deafblind, albeit its universality for the seeing population. To this end, a touch language signal is proposed that means a cultural gesture with meaning and that will be delivered to the deafblind simultaneously with the meaning, where the meaning could be delivered either by touch or by keyword. The signal is of a nibble form and appears under the proper nibble category [under the fifth (Pinky) finger]. These culturally visual multiple meanings are listed below.

Face of the fingers or Palm behind the Ear.
Description: Putting the palm or the face of the fingers behind the ear while possibly also tilting the ear forward.
Meanings:
Cannot hear what you say, speak louder
I am waiting for you to say something Moving the eyes to one side or another.
Description: Moving the eyes to one side of the eye socket, without moving the head.
Meanings:
A hint saying "look over there"
Crossed eye look to the side without being notice Another type of expressive linguistic element that deserves attention relates to the sense of touch being responsible to both getting acquainted with the element, as well as identifying it later again and will be discussed next.

We turn our attention to words that are spelled the same, have the same meaning to hearing and even deaf persons, yet when describing such words, human perception by touch or visual sense is quite different. Proceeding to discuss by way of an example, we center on the word "bubble". The discussion does not relate to a bubbly personality, but rather to the word "bubble" that can appear in more than one way:

(a) Bubbles of air in and on the surface of boiling water;
(b) Bubble of soap appearing for example when washing hands; or
(c) Bubble coming to a surface of a lake due to heat generated underneath, such as during a stage of lava eruption.

One can distinguish among the above cases by visual element and by size description, none of which is helpful to the deafblind who cannot first see and later form a perception related to a prior visual. Considering the experience of washing a hand with soap by a congenital deafblind person, bubbles do not make a conjecture. The sense of soap laminate on hands, evolving into bubbles, is perceived as starting from smooth friction and evolving into light airy foam, while bubbles of air in boiling water have never been seen and certainly not expected to be experienced by touch. Touch language takes it all into account when providing appropriate elements for such elements as soap.

In the case of Multiple Perceptions, the sensual descriptions rendered in touch language are different for each perceived element. However, the onus to discern them for different sensual perception is on the translation medium, be it human or artificial, such as an automated process.

It should be stressed that the discerning decision process is not trivial and calls for intelligent analysis that takes into consideration both the hearing or seeing perceptions of people as contrasted with the sensual perceptions of a deafblind person vis-à-vis the environmental "appearance" in his/her mind based on all the sensory human tools available to him/her.

Another aspect that is unique to the deafblind and deserves attention is the sensual perception formed based on visuals whereas there are no sensual counterparts expressions to build on. Examples are a rainbow with multiple colors, dawn, fireworks, or smoke rings coming from a cigar to name a few. People with proper visual ability who may be color-blind cannot see colors of a rainbow as well, however, the notion of a rainbow is known and they have seen a single color of black and white bow shadow in the sky. The blind person has no such observational perception to what is a rainbow. Thus, the question posed is whether such elements are relevant for translation purposes to touch language. We propose that such elements should not be translated to touch language. The reasons for it go beyond the limited usefulness and take into consideration the importance of limiting the cues provided to the palm. Such considerations ascertain that one does not overburden the touch language user and minimize the touch sense vocabulary so that even unsophisticated and uneducated deafblind persons may be able to master the essentials needed for them to enjoy its utility, such as in watching TV.

Another subgroup is that of fine differentiation. For example consider the following group: [pitch black; dark; twilight; fog]. All four elements in the example set interfere to one degree or another with clear sight. However, for the blind all represent "dark" and the fine differentiation has no meaning. Thus, we realize that there are groups of descriptive elements where single description covers all of them irrespective of the fine differentiations among them. The single description is provided by the interpreter who does not need to exercise a lot of finesse in describing members of such sets.

Touch language enables blind and deafblind persons to "watch" TV. The language utilizes up to 4 major segments as follows:
  (1) Optional Braille delivery for fingertips for Dialogue in the show unless nibbles are substituted for it in conveying Pragmatics of the sentence.
  (2) Key Word, that is a Laconic description related to the scene on the TV screen delivered in Morse code to a designated area in the body, either by pecking motions or vibrations
  (3) Description of motions on the TV screen, felt in the palm of the deafblind
  (4) Utilization of back of hand, back of fingers and face of fingers to convey by code provided by pecking on them, such information as gender, age, personalities, profession, etc. Each finger, together with the location and number of pecking delivers a uniquely identifiable code conveying meaning to the user. Control functions are also provided via similar articulation employing also movement of various fingers like the thumb and pinky finger.

The Rules of Association provide a set of tools for combining attributes into a dynamic sequence of occurrences and their synchronization with Key Words on one hand and vocal communication and music on the other hand.

Synchronization is required for beneficial usage of touch language. Synchronization is required on a number of levels as follows:

Synchronizing a group of dynamic scenes with the elements of touch language. They encompass:
  Determination of the scope of the dynamic scene
    Is it measured exactly, such as by the number of frames aired in the particular span of determined elapsed seconds; or
    Is it provided in fashion of, or in actual utilization of, Fuzzy Logic, where the group of Frames varies according to a "fuzzy" group of dynamic visuals that are not determined by an exact measure.
  The KeyWords
  The PalmScreen
  The Nibbles
  The Dialogue Segments
  User Control Functions Synchronizing KeyWords with their counterparts is rather imperative and requires a level of exactness. Those counterparts are:
  The Nibbles
  The PalmScreen
The Rules
  1. [Scene Group]~[KeyWord]+[Dialogue]+[User Controls]
  2. [KeyWord]~[Nibbles]+[PalmScreen]
  3. [User Controls]~[Cradle]+[Frequency]+[Impacts]
  4. [PalmScreen]~[M]/[S]+[I]/[V]
  5. [M]=M(i,j), that is the Macro cell on the PalmScreen
  [M] Stands for geographic location on the PalmScreen
  6. [S] The dynamic parameters (based on the static parameters), forming the attributes
  [S] Stands for shape description
  7. [I]=[Strength Level: Time Length: Repeat: Vibration]
    (a) Strength Level=[1, 2, 3]
    (b) Time Length=[in half seconds]
    (c) Repeat=[0 to 6 times]
    (d) Vibration=[1=included; 0=not included]. When induced, vibrations are taken from the permutated group [A], . . . , [E]
  [I] Stands for Impact
  8. [V]=[Strength Level: Time Length: Repeat: Trigger]
    (a) Strength Level=[1, 2, 3]
    (b) Time Length=[in half seconds]
    (c) Repeat=[0 to 6 times]
    (d) Trigger=[x seconds after [I] or other measure]
  [V] Stands for Vibrations
  9. Whenever Group (A) and (B) nibbles are utilized for the back of fingers, the following rules apply:
    (a) nibbles of Group (A) always precede impacts from Group (B) nibbles.
    (b) nibbles from Group (B) start only after impacts of nibbles from Group (A) have ended.
    (c) If impacts from any nibble group are missing, the message is that no information is available (regarding either age or personality type of the person). Undetermined articulations are also so signified by utilizing the "Fuzzy" designation discussed in the mathematical section of touch language.

Scenes on the screen are "narrated" and a sequence of related essential KeyWords and attributes are extracted from the sentences of the narration. The attributes are further reduced to their building blocks of dynamic parameters that are based on the static parameters. This results in the touch sensations, Nibbles in action and Morse vibrations/pecking representing KeyWords.

The Touch Language Principle
Algorithm Summary
  A small number of mechanoreceptors excited
  Pecking on body parts
  Vibrations
  Pressure
  Shear
  Motion
  A small number of geometric patterns sensed
  Lines formed by sticks or specifying end points
  Curvatures and circles specified either by end points or other means
  Circles formed by specifying short connectivity points
  Combination of geometric patterns in dynamic successions
  Where they are
  To where they move
  Duration of stay in each location
  Dynamic description of TV screen on the PalmScreen
  Touch language accessories
  Key Words supplements
  Division of hand and fingers to meanings portrayed
  Nibbles on fingers articulate messages and meanings
  Cradle structure
    For control usage
    For Alarms
    For information delivery
  Thumb as control mechanism
  Functional equivalent of a remote control
  Usages for eCane Key Words are an important segment in Touch Language. The motions and other impact information felt on the PalmScreen mostly do not carry the information regarding the subject "observed" through sense. Namely, one can sense the motion of a car on the PalmScreen and perceive its direction of movements, halting, change of course, etc., but we do not know if that describes a car, truck, a bicycle, a person, etc. The KeyWord provides that information. Key Words have been discussed before and concluded that such information may be provided by vibration or pecking delivered for example to either the palm not involved in sensing or the PalmScreen itself. Such vibrations/pecking can be delivered in the pattern of a Morse code, whereby the recipient could know from the Morse code spelling which word, or rather Key Word it is.

From a practical point of view, such arrangement taxes the attention span of the user who also needs simultaneously with the interpretation of the sensations on the PalmScreen also to engage in Morse code deciphering. It is especially taxing if the KeyWord needs to be repeated several times in the course of a certain scene on the TV, or if more than one KeyWord is required in any particular TV scene. In order to ascertain that in the latter situations the enjoyment of functional equivalent TV does not turn into a laborious Morse code deciphering preoccupying the user, a program is proposed for utilizing KeyWords symbols that are basically "functional equivalent acronyms".

It is quite common to encounter acronyms in Government, military or legal material where in the latter, at the end of a group of words we find in parentheses an abbreviated word or the first letters of these words, that later on are used instead of the complete set of related words. As an example, note the following made up sentence with the use of an acronym: "Touch Language ("TL") utility is a certainty, therefore TL is used in TV broadcasting". The same principle for functional equivalent acronyms describing KeyWords is advanced below.

Once a functional equivalent acronym has been defined and established, it is used repeatedly during the sensation provided on the PalmScreen, so that the sensation can be attributed to and correlated with a particular object. For example, if the scene involves an exploding car, then while the PalmScreen provides the proper sensation for explosion, the KeyWord "car" is provided simultaneously. However, when the car is involved in a high-speed chase, the KeyWord "car" needs to be repeated several times. In that situation, the KeyWord is vibrated/nibbled in Morse code once (assuming Morse code to be the selected form for that communication), but after a particular symbol appears at the end of the KeyWord "car", from that point on, it will be the symbol that will be repeated rather than the vibrations/pecking delivering a Morse code. That defined symbol is the functional equivalent acronym used in the scene.

The locality of a scene is defined differently for blind and seeing persons. It is defined in geographic and action terms for the seeing person. Namely, a moving car, for example, has an attributed locality that changes with the changes of the geographic terrain or environment. For example driven through an inner city versus outside in the country. However, it also has an action scene, where in the same locality a change in the actions attributed to the car is observed. For example, driving slowly versus speeding up, or driven peacefully versus being highjacked. The scene locality has different definition when utilized for blind participant observers and in that regard becomes a functionally equivalent locality. Namely, the scene does not relate to a geographic area, nor is it related to action observed on the TV screen. Scene locality for blind persons rests on PalmScreen utility in temporal period of sensed time.

Three Principles Govern the Process

Variables

The group of symbols used for the functional equivalent acronyms are in essence variables that can describe any KeyWord available. Being variables, means that they can describe one KeyWord at one occasion and the same variable can describe another Keyword at another occasion. Namely, such variables are defined at their initial use by immediately following a KeyWord delivered (for example by vibrations/pecking in Morse code).

Group of symbols

The group of symbols chosen is made of a relatively small group of symbols and is given below There are various options for the symbols, however one possibility is chosen that will not cause confusion with other Touch sensation on the PalmScreen. Namely, a symbol method is chosen that cannot be confused with or distract attention from either descriptive sensation on the PalmScreen or KeyWords transmitted through Morse code vibrations/pecking. Namely, low (pitch) level frequency is chosen that can be equated with the low audio vibrations of a cello or contrabass, or the slow drill of a dentist that is usually much less painful than the high frequency (pitch) drill. Having chosen such vibration as the acronym type, its usage in symbols is defined

[A]: Single Long Low Frequency Vibration (i.e., significantly longer than any Morse code "dash" vibration) will be denoted by ")". There is a significant delay before it is repeated again, if at all.

[B]: ").("—A Long low frequency vibration with a single short delay before it is repeated

[C]: "%"—A short repeated low frequency vibration

[D]: "%.%"—Two short low frequency vibrations with a significantly much shorter pause between the first and the second

[E]: tbd (to be determined)

Cyclic Permutations.

Permutations occur in the group of symbol variables [A], [B], [C], [D], [E]. The reason for the permutations is memory erasure for repositioning of a symbol variable. Namely, once used for a certain description, one needs the brain to enjoy a respite from it, so that its meaning will no longer be associated with the KeyWord it used before. Thus, once [A] was used in a particular scene, as we move to the next scene and [B] becomes the symbol variable, [A] moves to the end of the line and will be used again only after the other symbol variables were used. That is, after the usage of the symbol variable [B], the group of symbols become [B], [C], [D], [E], [A], and after [B] is used too, the permutated group takes the form of [C], [D], [E], [A], [B].

It is important to know when a symbol variable ceases its local functioning and is deposed for a new (next in the permutated line) symbol variable. The easiest and most sensible such delimiter that will not add to the amount of material needed to be kept in memory of the user is simply an empty group member or "No Symbol". Namely, ceasing to use a symbol variable and a new one replacing it can retire it as local variable until its next resurrection with a new attribute. However, there are situations where the current symbol variable is not retired, but rather needs to be used shortly after the introduction of the next in line symbol variable. Having a delimiter is useful in such cases, relegating the symbol variable to a temporary abstinence until being called back to utility without the need to redefine another symbol variable for the continued function of the attribute utilized under such a symbol variable in the scene locality.

Therefore, we define such a delimiter as follows:

Negative (Reversed) Delimiter Definition: A symbol variable pertaining to a scene locality, with a negative (reversed) delimiter appearing immediately after the symbol variable pronouncement means that it is held in abeyance for reuse in a short time, without losing its meaning or being obscured by the introduction of the next in line symbol variable. It is defined as:

"$": A series (between 3 to 5) of short successive low frequency vibrations.

Invariably, any TV show contains segments of dialogue between or among participants in scenes. Such dialogues are different from communications that can be "compressed" into a minimal number of Keywords. Therefore, in order to complete the Touch Language capability to render a comprehensive functional equivalent TV perception, one needs to provide the mechanism for such dialogue delivery. There are various ways for such delivery, from Braille to Morse code and usage of vibrations or other sensing modes.

The dialogue segment can have various embodiments. One such embodiment that enables rapid reading in Braille of dialogue segments appearing during the show is discussed below. The mechanical apparatus is either a single bar that has its two end points tilted at an angle, or disjoint parts providing same effect. Namely, the tips of the eight fingers (i.e., both hands without the thumbs) may rest on a specialized Braille keyboard that enables to read the captioned dialogue text in Braille. The tilted edges are at an angle in order to accommodate the respective pinky of each hand. The dominant hand that serves as a PalmScreen has other contraptions added to the construct, while the other non-dominant hand may have only a device such as a glove that enables its thumb to receive nibble information required for notification of start and end of process as is given below.

| Number of Nibbles | Meaning |
| --- | --- |
| 1 | Start of KeyWord |
| 2 | End of KeyWord |
| 3 | Start of dialogue |
| 4 | Dialogue starts with some other activity in the background or other location on the PalmScreen |
| 5 | End of dialogue |

The single or two nibbles may be done in rapid manner, while the 3, 4 or 5 nibbles may be provided at a slow manner, thereby signaling to the viewer, right from the outset whether they describe a KeyWord or dialogue.

In comparison to a standard language, and as example we use here the English language, touch language can be succinctly summarized as follows:

Articles (i.e., a, an, the) are omitted, as is done in sign language.

Adverbs (e.g., slowly, heavily, etc.) are not needed, as in sign language

Verbs (e.g., go, jump, drive, etc.) appear as KeyWords

Nouns (e.g., birds, snow, explosion, etc.) are relegated to touch sensation

Adjectives (e.g., slow, heavy, young, old) are transmitted by Nibbles

Hearing persons enjoy sound effects while watching TV shows, even if such sound effects are only tones that normally would not be categorized as melodic or music, or are subtle in nature. For example, in the now classic movie and TV airing of "Jaws", there is a growing crescendo of tones whenever the shark is approaching, creating a sense of foreboding and heightened "anxiety" level among the viewers. Deaf viewers do not share in such effects leading to a significant reduction in their enjoyment as compared with their hearing counterparts. Deafblind persons who would elect to use touch language in order to partake in an audio-visual presentation, such as a TV show, could enhance their level of enjoyment if a functional equivalent form of sound effect could also be provided. So would also deaf persons who watch such shows with close captioning, but where obviously no sound effects can currently be translated into captioning. Touch language contains the needed ingredients to enable deafblind viewers to partake in the perception of sound effects. The apparatus utilized to deliver such functional equivalency is described in co-pending U.S. patent application Ser. No. 10/612,159, which is incorporated by reference herein. The functional equivalent sound effects utilized are produced by vibrations (and to some extent also by nibbles), with breaks in a particular frequency pertinent to the scene, as well as nibbles in a particular quantity and frequency pertinent to the scene.

The frequency provided is divided into two distinct forms, and each form is divided again into multiple possibilities, each of which carries additional information based on the situation at hand. Namely:

Non-Suspenseful Situations

Low frequency vibrations aimed at providing a soothing and tranquil form of functionally equivalent sound effect. Within that scope there is a frequency of providing that low frequency, Namely:

Continuous and uninterrupted low vibration

Evenly spaced low vibrations with a constant time space between the end of one low vibration and the restart of the same low vibration.

Uneven time duration spacing of the low frequency vibrations, whereas the time elapsing as a break between two successive low frequency vibrations is variable and controlled to be long, short, mixture of long and short duration, where no short needs be similar to another short time spacing and no long time duration spacing needs to be similar to any other similar to another long time spacing.

Suspenseful and Tense Situations

High pitch frequency level aimed at providing a general sense of tension

Nibbles and Frequency

Nibbles can be provided to the designated area in two forms. Strong or gentle impact nibbles, and slow, fast or variable time breaks between nibbles.

Non-Suspenseful Nibbles

These nibbles are either of soft or strong impact and could further be:

Single or multiple nibbles with fixed time break between two successive nibbles Evenly timed successive nibbles Uneven time breaks between nibbles Suspenseful and Tense Situations These nibbles are either of soft or strong impact and could further be:

Single or multiple nibbles with fixed and evenly time breaks between two successive nibbles.

Uneven time breaks between nibbles

Vibrations and nibbles can be intermixed in whatever combination that can achieve the desired results. The classification given above regarding suspenseful situations and tranquil situation is provided only for convenience and there is no need to use elements only in the framework they are presented.

Example I

As a simple example, consider the scene from "Jaws" mentioned above. The functional equivalent sound effect could be composed of:

A base of constant fixed low vibration; and

A fast (or increasing speed of) nibbles, that could also grow from soft to strong impacts.

Example II

Consider the scene from "Mercury Rising" with the autistic child protected from an assassin during a train ride, where a tension moment is indicated by a sound almost paraphrasing nibbles in a particular sequence of "short-sort-SHORT-SHORT-SHORT-short-short-SHORT-SHORT-SHORT, . . . . It is rather easy to replicate such tension created by sound through nibbles as prescribed above.

The Other Hand [The Non-Dominant Hand]

One hand (the dominant hand) has been dealt with and we will now move to discuss the contribution of the other (non-dominant) hand to touch language. When one observes sign language utilized by deaf persons, it is clear that dynamic usage is made by both hands. Likewise, both hands are employed in touch language for added functionality and clearance. However, unlike sign language, touch language makes use of fundamental biophysical evidence to differentiate between how each of the two PalmScreens is utilized. It is accepted that each person has a dominant hand (DH) and a complimentary hand (CH) or non-dominant hand (NDH). Since the majority of the population is right handed, the instant presentation assumes the right hand to be the dominant hand and to have been the center of discussion to this point. In that sense, the left hand has been assumed to be the complementary hand. The apparatus could be the same for both right handed and left handed persons, whereby a flip of a switch enables the device to channel the information to one setting or the other by a relatively simple software procedure.

Figure 12:
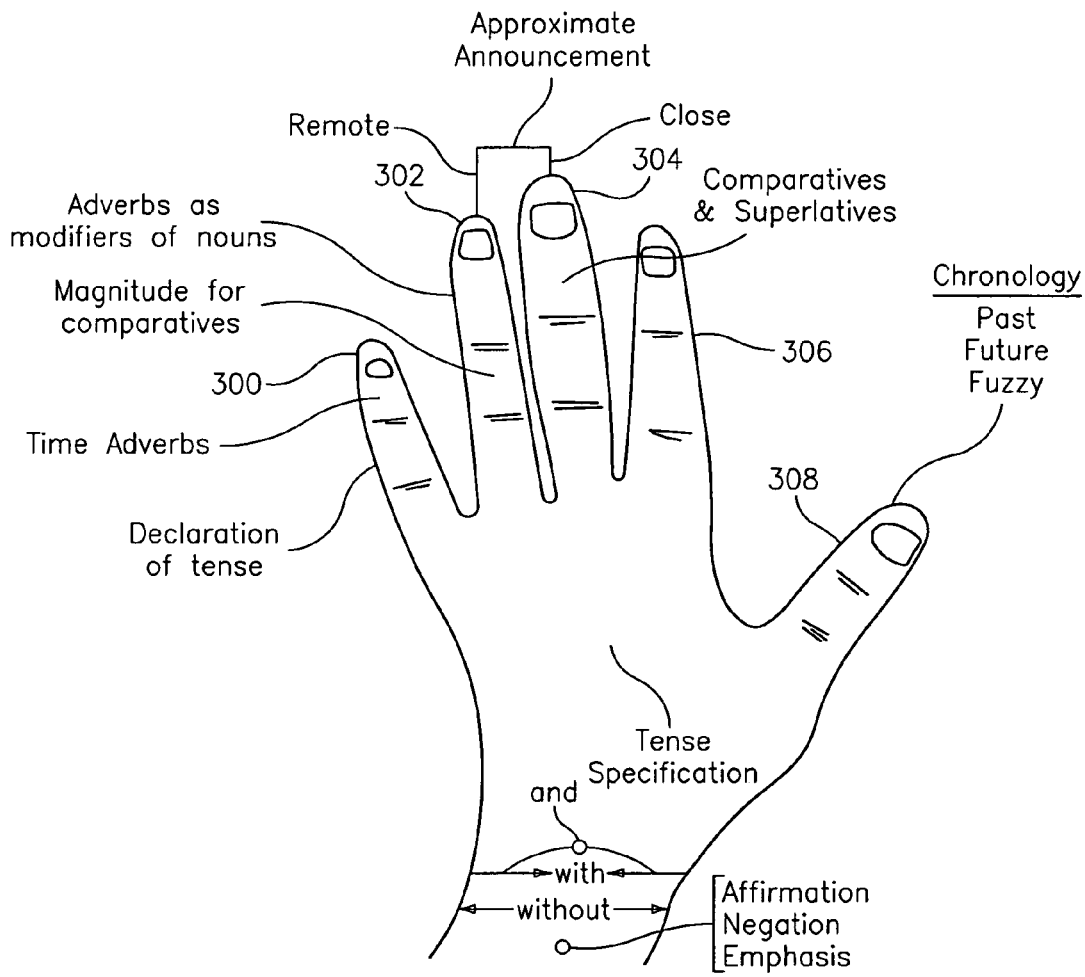
FIG. 12 illustrates how the non-dominant hand may be used as a receptor.

As shown in FIG. 12, the non-dominant hand or left hand with its fingers forms a receptive medium that is similar to the dominant hand. The left PalmScreen equipment operates in the same fashion as the right PalmScreen equipment, though the perceptions are different. When both hands are operational at the same time (though not necessarily simultaneously), a variety of new presentations for perception become available to the viewer.

The left hand pinky 300 has dual functions. It is both the grammatical tense as well as the designator of direction as related both to spatial vector, as well as cause and effect or receipt.

The back of the left hand pinky 300 provides the time line for the functional equivalent past tense and future tense. The functional equivalent of the present tense covers also a general static stance without change, and therefore will be also considered to be the "Purgatory" stance. The distinction among the three is provided by nibbles on the back of the left hand pinky as follows:

| No. of Impacts | Meaning |
|---|---|
| 1 | Past tense |
| 2 | Present tense & Purgatory Stance |
| 3 | Future tense |

The tense announcement is always provided at the beginning of a description.

Direction and Cause/Receipt Designation

The face of the left hand pinky provides us with the origination and direction of effect. The number of impacts on the face of the pinky are provided in the rhythm of Morse Code, where elements signifying "initiation" are marked By "A" in Morse Code (i.e., a single impact followed by rapid two impacts) and elements signifying "end point", or "destination" are marked by "Z" in Morse Code (i.e., two rapid impacts followed by another two rapid impacts and ending by two regular impacts).

| No. of Impacts | Meaning |
|---|---|
| 1 regular, then rapid 2 | From; Initiator or Originator |
| 2 rapid, 2 rapid, 2 reg. | To; Recipient; End point |

Example

A woman in the show remembers that when she was a young and bad child, a nice older man gave her an ice cream. This will appear as follows in touch language:

Begin

Left hand backs of Pinky with one nibble impact [Past]

Right handfourth finger with three nibble impacts [Nice older man]

Leftface of pinky with one then 2 rapid nibble impact [From/originator]

[KeyWord]: ice cream

Right hand third finger with one nibble impact [Bad young girl]

Left face of Pinky with two rapid nibbles followed by two rapid nibbles the two regular nibbles [recipient]

Left hand backs of Pinky with two impacts [Switch back to present tense, memory is over]

End

Under the declared assumption of discussing an apparatus for a right-hand person, one differentiates between the right or dominant hand, that is the "Person" hand and the left or non-dominant hand, that is the "Object" hand. Namely, while the PalmScreen of both hands carry the same meaning of articulation, the dominant hand palm is where the action primarily takes place and as such no differentiation is observed. However, the fingers of each hand designate specific notion of either "person" or "object".

The fingers of the dominant hand describe gender, age, and personal characteristic, such as a pleasant or bad personality, as well as the strength of such character description. Nibble impacts are added to the specified fingers, carrying the information pertinent to particular fingers. Namely, nibble impacts on the gender fingers render the age of the party, while nibble impacts on the characteristics fingers render the strength. In the latter case, a nice person can be just nice, very nice or extremely nice depending on the number of nibble impacts, and likewise for the bad personality.

The non-dominant hand fingers may describe aggression as well as its opposite. However, since one is not dealing here with living entities, a single finger will suffice in each case. The description of the pertinent fingers is in line with the right hand designations. Namely,

| The Finger | Description |
|---|---|
| First | Aggression |
| Second | Neutral; Benign; Intent |
| Third | Pleasant |

The meaning displayed by the left or non-dominant hand fingers is useful. For example, a KeyWord "Car", could describe a car driving peacefully, or a car that is bullet ridden at the time, or aimed at colliding with another car, etc. The degree and level are provided by nibbles. Thus, information provided by the finger describing "aggression" is given below, whereas the KeyWord provides the object identification. The fingers of the non-dominant hand also provide information regarding intent or action of either object or person.

The middle (Benign) finger 304 may provide the notion of intent through the use of a single nibble impact on the back of the finger. Thus, the finger can operate in conjunction with any other finger, both on the non-dominant hand as well as the dominant hand. Action, rather than intent, is signified by a rapid triple impact on the back of the left middle finger. When coupled with a first left hand finger 306, it can further designate whether it has moved from the level of intent to the level of threat. We summarize below the meanings carried by impacts on the left middle finger 304:

| Number of Impacts | Meaning |
|---|---|
| 1 | Intent |
| 2 | Inadvertent |
| 3 | Action |

The left middle finger 304 may also be utilized for other important aspects, which are conveyed via nibbles to the face of that finger. In conjunction with nibble impacts on the back of the left middle finger, one is able to provide modification of the intent or connotation, such as in the example where a bad intent of a person is in actuality also motivated by a psychotic breakdown or a similar onset, where if intended with malice could be homicidal, or when coupled with messianic 'good doer'. We provide below initial such information.

| Number of Impacts | Meaning |
|---|---|
| 1 | Sexual connotation |
| 2 | Living but not human [e.g., animal], allowing to use the "Person" fingers on the right hand for equivalent articulations albeit for animals. |
| 3 | Modifier [e.g., psychotic breakdown, or past with no present, as in a person who is dead] |

The Aggression Group
 Bullet ridden [e.g., person, object like car or house, etc]
 Colliding from the side while driving a vehicle in parallel
 Blocking road intentionally [e.g., by another car]
 Throwing an object [e.g., a Molotov bottle or similar to/into an object]
 Setting up fire
 Hooking up an explosive device to an object
 Spraying [e.g., mace, window cleaner] on a person [e.g., eyes or face] or on an object.
 Pouring liquid [e.g., acid] on the face of a person], or object [e.g., water into the gas tank of a car
 Throwing a hand grenade
 Collision or bumping either objects, or persons, or objects with persons [which may involve additional fingers from both left and right hands.

There are many other object members of the above partial list that is given as an illustration of the aggressive group.

The middle finger 304 of the left or non-dominant hand carries information, either by itself, or in conjunction with other fingers from either or both left and right hand. Some examples are provided below:
 Observing activities in a mirror
 Business meeting
 Buying a hot dog
 Taking a bus, cab, train, etc.
The Non-aggressive Group
 Helicopter [e.g., to help injured by removing them]
 Ambulance
 Fire truck
 Ship or boat
 Caressing either an object or a person
 Kissing [sexual or non-sexual]
 Soothing [e.g., by calm talk, vibrations, bath, etc]

The utility provided to touch language by using both right and left hands extends to scenes where rapid or sudden activity coupled with change of location is manifested. For example, a person that jumps from one rooftop of a house to another, say during a police chase, a person jumping from the rooftop of one car on a moving train to another rooftop of an adjacent car, or a car jumping a lane on the highway. Since both right hand PalmScreen and left hand PalmScreen operate in identical ways, and only the fingers contain specialized local information, we can utilize it for the purpose discussed.

Activities utilizing location exchange make use of both PalmScreens as a simulated functional equivalent activity. For example, jumping activity as described above can occur from the major operational PalmScreen (i.e., the right hand one, for right-handed persons) where the activity start and completed after the jump on the other PalmScreen. Utility can also be made of sequential jumps by going back and forth between the two PalmScreens.

The location exchange concept of utilizing both PalmScreens can also be useful in conveying split screen situations operating on a TV show.

Functional equivalent stereo sound can be obtained by the same method of location exchange, where functional equivalent tones are used as has already been discussed herein utilizing vibrations and nibbles.

Touch language has certain peculiarities mandated by its transliterated connotations and visual elements. Scene elements that portray visually unspoken elements that are meaningful to the viewer have to be accommodated. For example, you and I can be in the scene running away from somebody, or that person is the target of our pursuit. We could provide for your and my presence in the scene by simply symbolizing an additive particle like "and". However, the object of our pursuit is also in the scene, yet a simple additive particle to connect between you and me carries a different connotation when applied to the object of our pursuit as that person is in the scene but not with us and each of us has a different agenda. Thus we recognize that elements in a scene could be both geographically apart, or conceptually distinguishable, which is important for the person who partakes in the TV enjoyment. The approach undertaken below answers the need just encountered.

I. Geographic Localization

A. Scene Inclusion Variable

A scene inclusion variable provides descriptive elements to a scene as follows:

(a) A party or objects that partakes in a like or simultaneous activity in a scene.
(b) A party or object that entered the ongoing scene
(c) A party or object that dropped out of an ongoing scene. This case is divided into two segments:
  [C1] When a party or object drops out for good. For example, a person is killed or an object is blown away.
  [C2] When a party or object drops out temporarily. For example, a person going behind an object such as a car or a pole and is not seen, or an object such as a gun being concealed behind the back.

Only elements essential in their relevance to the scene qualify for a scene inclusion variable. Such could be protagonists in a scene, or even environmental landscape such as heavy rain or hail. However, if the Sun is shining but there is no transliterated value to the scene it does not qualify. The Sun does add transliterated value to the scene if its rays shine back from a piece of metal that carries meaning in the scene.

| Value Indicators of the Variables | | |
|---|---|---|
| The Case above | Body part involved | Number of pecks |
| (a) | Back of non-dominant hand | 4 |
| (b) | Back of non-dominant hand | 2 |
| (c) | Back of non-dominant hand | 1 |
| (C1) | Back of non-dominant hand | 1 followed by a line forming West to East at base of hand near wrist |
| (C2) | Same as in (C1) where the back of the non dominant hand is utilized, except that either a horizontal line moves up or down symbolizing where the party or the object disappeared, or a vertical line moving left to right or right to left symbolizing the direction of disappearance. | |

B. The In-Wait Mode Variables

These variables are utilized when a static or dynamic scene contains a situation with anticipatory elements. Either, when protagonists or objects are anticipated to reach a geographic scene location or an action in the same geographic scene location.

Examples (1) A ticking bomb with time diminishing
  (1a) At the scene locality
  (1b) At a location away from the current scene locality
(2) An ambush of adversaries lying in wait;
(3) Gasoline dripping to floor, that could be ignited into a fireball upon ignition, say by a dropped cigarette. Also a gas line or pipe that could blow up (e.g., a room) when a spark is introduced;
(4) Police cars blocking a road with officers kneeling behind it or behind open doors with weapons drawn.

Value Indicator for Variables

The indicators are in the form of pecking provided either to the face of the first finger 306 or pinky finger 300 of the non-dominant hand (i.e., left hand for right handed persons). The frequency of pecking is low (e.g., 2 to 3 seconds apart between two consecutive pecking impacts) and continues uninterruptedly until the event in-wait comes to a resolution when the event occurs. As the situation for which there exists a wait mode becomes closer, the frequency of the pecking impacts becomes larger and just upon happening the distance between pecking motions is less than one half of a second. The same tool that shows accelerated occurrence of anticipated event is also the tool to induce tension in a functional equivalent musical formation, as is shown in another section herein. Irrespective of change of scenes, the indicator continues to "blink" the in-wait situation, so that even while we are in a different scene we are constantly reminded about the situation in-wait. Here, the deafblind has an advantage over the seeing and hearing TV viewer who needs to keep in memory such visual in-wait scenes that are no longer visually available. He/she may forget about it, while the deafblind has it in active "blinking" memory regardless the scene that is transliterated for his/her benefit. If a visual "in-wait" situation is shown on the TV screen by a split screen, i.e., a second smaller window, touch language foregoes the second window and maintains its own pecking frequencies to transmit such information.

| Variable | Indicator |
|---|---|
| Wait-to-happen situation | Continuous pecking on face of $1^{st}$ Finger |
| Wait-to-happen - geographically disjointed | Continuous pecking on face of Pinky Finger |
| Disjointed scenes of parallel activity of a wait-to-happen | Continuous pecking on face of Pinky Finger |

C. Environmental Scene Variables

Environmental scene elements as we know them in the seeing population relate not only to protagonists and objects in the environment. They also cover landscape as well the elements, such as resulting from atmospheric and local weather conditions. In order to minimize the intake burden of the user of touch language environmental scene variables are divided into two types.

(a) Landscape Only

These are shows dedicated to showing landscape such as in a tour for viewers depicting mountains, lagoons, lakes and the like. In this category, one can concentrate on the descriptive elements utilizing few KeyWords and the rest being described on the PalmScreen via appropriate contours.

(b) Material Landscape

Landscape appearing in a scene as part of a background is only secondary to the plot of the TV's script; otherwise it falls under the category of "Landscape Only". As such, the amount of information provided to the touch language user is minimized. Thus, only essential material to the scene is provided, such as rain, hail, wind, storm, lightning, dangerous slope of a mountain, steep hillside of a mountain, etc.

It should be noticed that some categories of material landscape are commingled with other material, such as In-Wait elements. An example is an In-Wait situation of a severe impeding storm or a hurricane, or an approaching tidal wave. Touch language conveys both landscape only, as well as essential material related to landscape. The face of the second and fourth fingers 306 and 302 respectively of the non-dominant hand are the landscape descriptive fingers. Pecking on them conveys the elements as they relate to landscape, while the dominant hand provides the usual PalmScreen, KeyWords and other elements related to the description. The table below indicates the various elements pertaining to landscape realization.

| State of Landscape Scene | Finger | No. of Pecks | Frequency [1] |
| --- | --- | --- | --- |
| Constant State | 2 | 1 | 4 |
| Increase State (e.g., of slope) | 2 | 1 | 1 |
| Decrease State (e.g., of slope) | 2 | 1 | 0.5 |
| Variable State - UP | 4 | 3 | [2] |
| Variable State - DOWN | 4 | 5 | [2] |
| Variable State - START | 4 | 1 | — |
| Variable State - END | 4 | 2 | — |

[1] The Frequency is the number of seconds between adjacent/subsequent Pecks
[2] The frequency increased with height or downward depth II. Conceptual Localization.

Visually disjointed multiple scenes of common denominator to the plot are recognized as belonging to the same TV presentation, whether they appear to be of either geographic or conceptual localization. Such could be a case where certain activity is in locality A, where a different activity occurs in locality B, yet both activities relate to the story on TV. In essence, one encounters here multiple scene scenarios that for the deafblind would be quite confusing, where disconnected scenes may not have any immediate relevance. To this end, a multiple screen variable is introduced.

It is immaterial to the deafblind if the Multiple Screen Variable is real multiple windows appearing simultaneously on the screen, or facsimile multiple scenes that appear in succession on the screen, where each pertains to a disjointed situation, connected only by the plot. The reason is that real multiple windows with different scenes are a visual engagement of human senses. Therefore, it is irrelevant to the deafblind. Thus, one can provide the deafblind with only one perception that counts for both cases. However, what is much more important is to relate to the deafblind that the two disjointed scenes are related and the connectivity is yet to come. That is, there is no continuity among protagonists, objects and actions in one scene and the protagonists, objects and actions of the other scene. The connectivity is provided conceptually later on. Therefore, the task is to indicate that the scene in progress just changed to another locality, is reverted back to the earlier scene, or that connectivity between the scenes was made.

| Scene Variable | Indication |
| --- | --- |
| Change of scene A to scene B | Double pecking on back of non-dominant hand at mid-East side of it. |
| Revert back from scene B to scene A | Double pecking on back of non-dominant hand at mid-West side of it. |
| Connectivity is made between scene A and B | Double pecking on back of non-dominant hand at BOTH mid-East and mid-West. |

Acceptance of touch language depends on its utility for the deafblind and therefore it is the deafblind whose verdict is the most important for its usability. One needs to teach touch language to the deafblind, have a large number of them from all level of education and society use it and average over their opinions and input. Thus, touch language is incomplete without an educational apparatus to teach the language. Such educational apparatus is significant in the sense that it needs to teach a deafblind to utilize his/her palm and fingers while those are the very own tools the person uses to capture information, as the deafblind cannot see illustrations or hear explanations instrumental in teaching usage of the language. To this end, a sample of a methodology to teach touch language to the deafblind is provided.

The possibilities here are rather limited. One can either use:
Palm fingerspelling, where the cupped palm is the recipient and fingerspelling is the delivering method; or
Braille read from elevated dots on paper or similar substrate, or through a specialized keyboard in computers retrofitted or built for deafblind usage; or
Morse code used either through an eCane or any other suitable delivery system.

The procedure alternates between explanation and hands-on examples of usage, one step at a time, where there is no concurrent or simultaneous explanation and demo due to the limitation imposed on the auditory-visual reception of the deafblind. Therefore, teaching touch language to the deafblind is done one language component at a time, with explanation, then hands-on demonstration and practice. When a few new perceptions have been taught, the training exercises are then built on samples extract from all previous taught concepts. To this end, the student of touch language is first taught the symbol of "end", so that he/she will know when to switch back to the explanation (language) mode.

The concept of touch language goes beyond a mere language and beyond the enabling of special effects, such as functional equivalent suspense music. Certain forms of utilization of the sense of touch can be incorporated into touch language to enable emotional states achieved normally by words, lyrics, music or combinations of them.

As such, the ability exists to provide the deafblind and others with a simulated effect that borders on individual reality testing. Such ability exists due to the fact, that the five of our senses that are universally known, are in fact only part of all the total senses available to us in one degree or another. Specifically, there are body/mind adjustment senses that come about as a result of sensory integration as we discuss next.

Sensory integration employs two powerful senses. The balance and movement sense is controlled by the inner ear (the Vestibular sense) yet relies on our sense of sight as well. Trying to raise a foot with open eyes requires very little dexterity; however done with closed eyes convinces us instantly that resisting gravity and maintaining balance is quite more difficult and serves as a testimonial to sensory integration of the vestibular and sense of sight. Another adaptive response taken by our body relates to the sense of body position as regulated by our joints and muscles (Proprioceptive sense). Trying for example to find the proper location of a sleeve to put our hand in behind our back without seeing the sleeve's entrance may occasionally prove problematic. Once again, the sensory integration of the Proprioceptive and sight senses required to guarantee a successful operation without fail.

Another example is a person descending a staircase while observing the stairs on which each foot is landing where an imperceptible inner calculation enables the person to judge correctly the amount of extension needed before resting each foot on any particular stair. It is enough for anyone to descend such stairs with closed eyes and encounter an uneven spacing between consecutive stairs (a different height of a stair) to realize the uncertainty of stumbling on such a stair and the importance of the adaptive response related to the position of the body. The latter adaptive response of proper measurement of body (foot) poisoning is another example of sensory integration involving both the Proprioceptive as well as the sense of sight.

The deafblind cannot integrate sight to appropriate adaptive response and usage of a cane is quite prevalent where the sense of touch is extended through a cane as a somewhat functional equivalent surrogate to seeing.

What is important for touch language is the realization that both the Vestibular and Proprioceptive senses in their forming adaptive responses generate an emotional sense of security in a person. While such a sense of security may go unnoticed, the lack of intact Vestibular and Proprioceptive sense leads to lack of gravitational security that begets an emotional sense of anxiety. The producer of a TV show creates for the viewer tense moments by utilizing a combination of images and sound. Such tools are not appropriate for the deafblind. However, utilizing the human anxiety resulting from the lack of gravity-security can be utilized for a functionally equivalent tense moments in a TV show.

Any language known is learned in stages as people grow from infancy to maturity. Even hearing and seeing that are taken for granted by most are part of a learning process where the brain learns the meaning of the sounds or sights. Hence, it is not surprising that touch language requires a learning process of intellectualizing the meanings of the various sensations of touch. However, what may come as a surprise is the related learning that emotionally induced effects of touch language are induced and temporary in nature.

TV viewers can divert their eyes from an unpleasant image, a shuddering image or objectionable image. They can mute the sound of the TV or mechanically close their ears to likewise unacceptable sounds. However, the deafblind partaking in a touch TV interaction appears to be a captive recipient of excitations that are designed to produce the same emotional effects. Therefore, it is both called for, befitting and necessary to provide the deafblind with the functional equivalent tools of avoidance. Such tools of avoidance override the emotional effect commands. Simultaneously with such override mechanism the "white sound effect" (the "white effect") is introduced, which is a benign signal present only during the duration of the emotional effect and active only upon activation of its avoidance. Such white effect provides the deafblind person with additional controls during his/her interaction with the TV and guarantees that no emotional displeasure is imposed on the individual partaking in the utilization of touch TV.

The white effect is generated through an unobtrusive constant low-level (not necessarily low frequency) continuous vibration or a set of nibbles applied to the body.

The touch language elements provided below are not only for the purpose of creating suspense and anxiety but could also serve for the purpose of inducing relaxation. Moreover, they could be utilized not only for the purpose of entertainment, e.g., the TV, but also in educational and therapeutic modes, as is briefly mentioned below.

Autistic individuals respond well to external deep touch that brings about relaxation, which is not surprising to the non-autistic population that can identify with a similar sense derived from body massage. What may present a challenge is to provide the deafblind with the functionally equivalent emotional tools needed to induce a state of hypnosis for medical or psychological purposes. Hypnosis is achieved by the simultaneous introduction of a monotone relating and assuring voice coupled with focused sight attention on an object, produced continuously for a period of time. Such sensory integration is not available to the deafblind person, as both of the required ingredients are not available. Touch language enables one to substitute the ingredients with functionally equivalent sensory integrative ingredients. While in hypnosis one of the ingredients (external sight) is relaxed once the first level of hypnosis is achieved and enable the patient to substitute it with imagination and inner reflection or memory, we maintain the vocal segment throughout the hypnotic session. The vocal segment also serves as a communication element between patient and physician or therapist. The lack of the latter when addressing a deafblind person presents the challenge of losing contact with the deafblind subject, who may drift into a sleep state disconnected from the guiding physician. Tools for hypnosis include the sensory integration of vibrations coupled with deep touch as well as the eCane, where the latter utilizes Morse code either through vibrations or nibbles as the bi-directional communicative channel during the hypnotic state.

The touch language elements are of value both to the designer, manufacturer and effect producer of the language, as well as for the direct or indirect user and beneficiary of it, such as the deafblind person. It has been decided from the outset to limit the number of grades available and introduce the two diagrammatically opposed emotional elements only with one additional modifier of a lesser degree for each. Thus, four emotional element states are provided below, one combinatorial element to produce simultaneous sensory integrative effect and one control element for avoidance.

| Emotional States | |
|---|---|
| State | |
| Hypnotic State | TBD |
| Relaxation State | TBD |
| Worry State | TBD |
| Anxiety State | TBD |
| Simultaneous Activation | TBD |
| Avoidance Control (toggle) | TBD |

TBD = To be determined based on future controlled studies with deafblind participants.

The base elements of language symbolism for some of the basic elements of Vestibular and Proprioceptive aspects are provided. It goes without saying that an induced sense of lack of gravity will produce a feeling of anxiety, especially if prolonged beyond a brief instant as much as a lack of balance could produce a state of worry.

The back of the non-dominant hand as a signifier of event control has been encountered before herein. These control signals may be applied to the center of the back of the hand via the apparatus shown in FIG. 8. The utility of the back of the hand can be expanded to provide more refined messages that are not provided by syntax only and are mostly determined by facial features, intonation, or hand gestures. Needless to say, the deafblind needs to become aware of such foregoing elements and the back of the non-dominant hand is selected for such task. In order to eliminate confusion the central hand position for event control is maintained where pecks/vibrations determine the control function and will use the four corners of the back of the hand as recipient of pecks providing the additional information. The only deviation will occur with midpoints.

The back of the non-dominant hand may be divided into a matrix that has a plurality of squares. The upper (closer to the fingers) squares represent positive elements whereas the lower (closer to the wrist) squares represent negative elements. The east side of the back of the non-dominant hand (closer to the thumb) represents emotions, whereas the west side (closer to the pinky) represents the way emotions are expressed, that is are the emotive elements. That is:

North East section represents such emotions as "happiness", "love", "benevolence", etc.
South East section represents such emotions as "fear", "sadness", "anguish", etc.
North West section represents such emotive as "desire",
South West section represents such emotive as "contempt", "despise", "disgust", etc.

The midpoint area of the non-dominant back of hand harbors states that are either in-between or could signify a positive or negative. Thus, the midpoint east side is reserved for such elements as "crying", that could either be of happiness (i.e., belonging to the upper part) or crying out of sadness (i.e., belonging to the lower part). Likewise, we find on the midpoint of the west side, such elements as "dubious" that could be positive incredulity (i.e., belonging to the upper part) or questionable distrust (that belongs to the lower part). However, from a practical point of application, it may be difficult to discern the midpoint of the east or west side of the back of the hand, when the eyes do not follow the motion. This situation does not arise when pecks are applied to the north of the hand as it is almost on the knuckles and can be discerned and is the case with the south section when the pecks are impacting areas close to the wrist. To this end, the mid point is introduced as a three rapid successive impacts that start from the north then the midpoint then the south. If the nibbles call for two or three pecks to the midpoint of the hand side, then the three successive impacts repeat two or three times respectively. When both (west and east) midpoints are impacted simultaneously, the nibbles impact in tandem at the same time on the west and east side, starting from the north and ending at the south of the back of the hand.

Emotive & Emotions on Back of Hand

| Emotive/Emotion | Location | No. of Pecks |
|---|---|---|
| Happy | North East | 2 |
| Love | North East | 1 |
| Appreciation | North East | 3 |
| Relaxation | North East | 4 |
| Sad | South East | 2 |
| Cry/tearful | Right Midpoint | 1 |
| Question | Right Midpoint | 2 |
| Expectation | Left Midpoint | 1 |
| Dubious | Left Midpoint | 2 |
| Contempt | South West | 2 |
| Sarcasm | South West | 1 |
| Disgust | South West | 3 |
| Despise | South West | 4 |
| Fear | South East | 2 |
| Hate | South East | 3 |
| Hypnotic State | North West | 3 |
| Desire | North West | 1 |

Alternatively, if the geographic divisions of the back of the non-dominant hand with its allocated emotions and emotive elements are observed, one has the following description:

| | |
|---|---|
| Desire | Happy/Jubilant |
| Hypnotic state | Admiration |
| | Love |
| | Appreciation |
| | Relaxation |
| Expectation | Cry/Tearing |
| Dubious | Question |
| Revert from Scene B to A | Scene change from A to B |
| Connect Scene A&B | Connect Scene A&B |
| Sarcasm | Fear/Anxiety |
| Disgust | Sad |
| Contempt | Hate |
| Anger | |

There are certain functions that touch language provides the user who has an upper hand as compared with a seeing person who watches a TV show. For example, when watching a show on an analog TV, once a frame has passed it is gone and the user cannot see it again unless watching the show again or recording it on such equipment as a VCR or using such an external device as a Tivo. Utilizing touch TV enables a person to bring out of the system buffer material just aired and stored in touch language variables for perceiving it without interrupting the flow of the show. A similar capability is provided by the "Pause" command, which we study next.

A deafblind person who enjoys a TV airing can leave in the middle of an active showing and put his system on "pause", return and continue to enjoy the showing or catch up with it during a commercial. To this end, we introduce a variable of synchronicity that tells the deafblind user if he or she is current with the broadcast or how far they are from it. The Synchronicity Variable (SV) provides in essence the recent history of a show-in-progress, a show just starting, or that terminated. Such SV is local to a station "watched" at the time and does not pertain to any other station. However, once a user tunes into another station, an SV becomes automatically available and alerts the user to the status of the specific showing on that channel. Furthermore, the SV has an annex in the form of a guide, the Synchronicity Variable Guide (SVG) that follows the show's status report by providing a short description of the show topic. This feature is easily turned off by the "View" command and serves like a station specific TV Guide description. Three comments are in order:

(1) The SVG can run simultaneously with any current scene so as not to loose any TV perception with others in the room partaking in the same showing and thus be as close to their temporal perception as possible.

(2) SVG starts automatically upon release of the "Pause" command and is available for any station upon switching to it, whereas it automatically starts unless shut off by the user.

(3) A channel visited last or within a show time maintains markers of description provided last, so that upon revisiting the user has the option to continue were he/she left off, rather than perceive the then current SVG.

Pause Command

| Active command Body receptor | Passive command Body receptor | Command/ Receptor | Body Part | # of Pecks | Frequency of Pecks |
|---|---|---|---|---|---|
| YES | — | Pause | tbd | tbd | tbd |
| YES | — | Continue | tbd | tbd | tbd |
| YES | — | Guide | tbd | tbd | tbd |
| — | YES | Show Status | tbd | tbd | tbd |

Notice that the first three entries in the table are active body command and cease only if the user deactivates their automatic provision if desired at any stage.

Touch Language Utilized in Communication

We have discussed the mechanism of utilizing touch language in a receptive mode for dynamic TV scenes. Touch language is capable of other utilities and we will discuss next its bi-directional communication aspect.

A deafblind person receives communications either by employing a Braille reader or by fingerspelling utilizing the hand as receptor. Recently, a third form of communication was introduced with the introduction of the eCane that enables deafblind mobile phone or face-to-face communications. However, all three methods depend on deciphering textual material in one form or another. Touch language contains the ability to receive real time information in a new and more comprehensive form that is quite natural (i.e., after learning touch language). A sentence such as "A nice little old lady chases a naughty boy" could be transmitted in touch language by one word, three nibbles on one finger and single nibble on another finger, rather than the laborious fingerspelling of the whole sentence. Such touch language expression was already established before and our task now is to examine whether and how a deafblind person can generate touch language information with the same ease, so that it could be transmitted to others.

The Transmission Mechanism

The transmission mechanism does not require the deafblind to learn any new language components, as the same ones used for reception are also used for transmission. The same meanings of fingers and other parts of the hands are operational. The only difference is that the nibbles are operating in a reversed mode. Namely, the deafblind presses keys that operate as nibbles in the reverse so that instead of providing impacts on certain locations of the fingers and in a specified number. FIG. 1 shows both key types, where 34 provide the impact information to the deafblind and 18, 20 and 22 are likewise utilized for the same information, albeit communicated to the outside. The nibble generating key when pressed sends the information to the recipient. If the recipient is also a deafblind person then there is no need for intermediate transliteration of the meanings implied, since the recipient would also know touch language. Notwithstanding the above, there are few touch language elements that need to be acquired for communication purposes and will be outlined next as communication controls.

Communication Controls

When touch language is utilized for communication, i.e., both for reception and transmission we need to differentiate between Morse code generated by the user when providing verbs and impacts generated by the user that relate to control activities. We will define for ease of presentation the fingers involved and number of impacts as follows:

The thumb of the Non Dominant Hand (NDHT) precedes the number of impacts generated by it. Thus NDHT2 means two impacts by the thumb of the non-dominant hand.

| | |
|---|---|
| Start Transmission mode | NDHT2 |
| Morse Code activity for verbs | DHT |
| Activating Morse code for touch language | NDHT1 |
| Terminating Morse code for touch language | NDHT1 |
| Turn of Transmission mode | NDHT5 |

We note that the NDHT1 serves as an "On/Off" toggle switch to move between activating and terminating the Morse code. That is, keying it when Morse code is used for touch language turns it off, while it activates it when it is not active. This switching is necessary in order to distinguish between verbs that are part of touch language descriptions and Morse code utilized for other words and sentences generated in the communication. We realize that the thumb of the Dominant hand does the keying for the Morse code, while the thumb of the non-dominant hand provides the controls.

The Functional Equivalent Communication Controls for the eCane

Utilizing touch language for communications while operating an eCane is similar, though certain modifications are required due to the fact that the eCane already has built in mechanism for communication. We distinguish between two such operations, one with a touch language glove containing the reception and transmission impact generators and one without such a glove. The touch language glove (TLG) contains passive mechanical elements under its surface that is in contact with the hand and that can impinge on the hand upon command. Likewise the TLG contains extruding elements that can be utilized to key information in a reversed mode to the impinging of the passive mechanical elements.

Communication Between Two Deafblind Persons with Touch Language

Face to face communication when one of the parties is deafblind immediately positions the other person in a likewise delivery and reception position, unless such person uses mechanical and electronic auxiliaries such as the Touch Language Glove (TLG). We will next discuss such face-to-face communication, which we call Direct Touch Language Communication (Direct TLC), where each of the parties utilizes touch language and we'll observe any similarities and differences in TLG communication.

Mechanism of Direct TLC

Dynamic activities are provided by party A articulating them on the PalmScreen of party B.

The fingers of the non-dominant hand (NDH) of party A articulate the dynamic motions onto the PalmScreen of the dominant hand of party B.

If one of the parties is right handed and the other party is left handed then either the transmitting party switches between the dominant hand and NDH or mechanically transmit where one of the parties crosses the hands to enable symmetry between overlapping hands.

The fingers of the NDH of party A provide impact nibbles on the dominant hand of party B.

The fingers of the dominant-hand of party A provide impact nibbles on the NDH of party B.

The rules for finger sensitivity and avoiding reception mistakes are adhered to in transmission utilizing the $2^{nd}$, $3^{rd}$, and $4^{th}$ fingers to provide the needed mechanism.

Morse provided to articulate verbs is either replaced by the dominant-hand fingerspelling the verb, or providing Morse code by party A's thumb to party B's thumb. The choice is left to the communicating users.

If one of the parties is right handed and the other party is left handed then in the case of Morse code the receiving finger is the fifth finger (pinky) rather then the thumb due to obvious asymmetrical issues.

Questions end with vibrations, however, the vibration is provided by the fingers of the asking party grasping and slightly vibrating the fingers of the queried party.

An option exists for party A to make contact with his/her own TLG so that the resulting information is transmitted appropriately. For example, if party A depresses his/her own key 18 of FIG. 1 for a particular finger, it can be transmitted to have key 34 provide an impact on the same respected finger of party B.

Touch Language Grammar

Sentence: There is no sentence in touch language. What we have in touch language is the functional equivalence of a grammatical sentence and a flow of Pragmatics, irrespective of the language in which it appears. The reason lies in the fact that touch language is in effect a hybrid of elements from a spoken or signed language and elements of visual perception that are not translated into spoken language but rather described pictorially on the PalmScreen and topped off with various combinations of pecks/nibbles on designated body parts (i.e., fingers, back of hands). Finally, a functional equivalent touch language sentence comes with its own "special effects" assortment components of timed pecks/nibbles that extend in frequency or spike up in frequency, while modulated at time with low or high pitch vibrations as well as selective utilization of the non-dominant hand for stereo effects of both geographic and temporal facilities.

While the functional equivalent sentence of touch language embodies an assembly of multiple components, it is more intuitive in its perception and thus easier to construe and comprehend. We address the components of touch language below and recognize that some such single components contain multiple components of non-touch language and are in themselves touch language particles. We also provide the simple grammatical rules that bind the components into a cohesive "grammatically" correct touch language. The rest of the rules and/or modifications will occur in the future as influenced by readers and in particular deafblind persons.

Component: [Verb]
Delivery: Morse code delivered to a designated body part
Purpose: To identify the primary action taking place in the scene
Touch Language Component: [Action Particle]
Component: [Direction, Sequence, Position]
Delivery: Pecks/nibbles impacted on the back of the dominant hand.
Purpose: The sequence and directions are necessary to provide order and sequence of events to uniquely delineate the event-taking place
Touch Language Component: [Event Control Particle]
Component: [noun, gender, adjective]
Delivery: An individual finger selected from the four fingers (i.e., without the thumb) of the dominant hand
Purpose: To articulate the human personality with age and temper qualities
Touch Language Component: [Protagonist Particle]
Component: [Adjective]
Delivery: Peck/nibble on the descriptive finger
Purpose: To announce, age bracket, size component (e.g., big, small)
Touch Language Component: [Magnitude Particle]
Component: [ ]
Delivery: Peck/nibble of the face of finger of a non-dominant hand
Purpose: To imply connotations
Touch Language Component: [Connotation Particle]
Component: [Sound]
Delivery: Vibrations and/or pecks of various stationary or dynamically changing frequency of Pecks.
Purpose: Create functional equivalent sound effects, or other tension producing or anticipatory effects.
Touch Language Component: [Special Effects]
Component: [Tense]
Delivery: Pecks/Nibbles on the back of the non-dominant hand and pinky
Purpose: To differentiate between the present, past and future by indicating if the scene belong to say a past occurrence or a future
Touch Language Component: [Tense Particle]
Component: [Imperative]
Delivery: Via the thumb of the dominant hand
Purpose: Alert the user (Passive Alert) or issued by the user (Active Alert), such as summoning the seeing dog.
Touch Language Component: [Alert Particle]
Grammar Binding Rules Touch language grammar consists of touch language particles adhering to simple building rules that will be provided next. The goal is to minimize the number of rules and only those required for clarity are introduced.

The Rules (a) Whenever an Event Particle is associated, an Event Control Particle needs to sort out sequential and protagonist(s) elements.

(b) An Event Control Particle has a vector function and needs to appear when an Action Particle is manifested.

(c) There is no rule as to the position where the Event Control Particle is positioned, as it is language dependent.

(d) Special Effects are not a particle and can appear at any place, between particles, before or after particles or in parallel with any particles.

(e) Special Effects can occur even when no particle is utilized.

(f) Tense Particles can appear before, after or during any particles occurring.

(g) Alert Particles can appear at any time as priority.

When seeing persons learn utilizing text, such as in instruction books, they can revert to any such book any time they need to update their memory, a reference, or reading again a specific instruction or a routine. Invariably, the initial step is to consult the table of contents or the index to quickly find the desired information. Computer users utilize electronic users' guide and product manuals. Furthermore, it is customary to find "Help" menu that by clicking through one can find an appropriate explanation or instructions as needed for a particular situation at the time so needed. We select a somewhat different approach to assist the deafblind user who needs such information while exercising touch language and center it on the request for help. We forego explanation or instructions regarding any question and proceed immediately to an example of use.

The "help" facility is different than what is customary perceived as a "Help" facility in that it is in a reversed direction. Namely, though it is also available, the deafblind user does not ask how to obtain a particular articulation in touch language or what would be a certain procedure. Rather, the help facility is automatic and happens upon a request by the user to explain what was just transmitted in touch language.

There are two different procedural segments in the help facility. The learning mode, where the deafblind user wants to find out about a procedure and learn or master it, and the explanatory mode, where the user requests to know the meaning of a procedure just delivered to him or her. The former is the active mode and the latter is the passive mode.

The user requests help by using the thumb of the dominant hand and follows by delivering a short Morse code to indicate the word describing his or her interest. Thereupon, touch language declares an upcoming example, the example is provided and the cycle is closed with the declaration of termination.

It is assumed that the user activates this mode while being in reception mode of touch language and needs explanation or elaboration on what was just delivered, while needing to ascertain smooth continuity at the end of the explanation and resumption of reception. The help requested by the user in this category occurs when the user requests help by using the thumb of the dominant hand while being in reception mode of a touch language session. The touch language system first institutes a "pause" mode in whatever is being received by the user and collects in a buffer subsequent continuous flow of material as, described herein. A declaration of help facility appears, followed by a very brief Morse explanation of the procedure, followed by a declaration of an example, the example itself followed again by the brief Morse explanation. The whole procedure is repeated again and only then declaration of termination occurs with resumption of where it was left of to request assistance by help facility. Namely, (a) Declaration of help facility
(b) Morse
(c) Declaration of example
(d) Example
(e) Declaration of end of example
(f) Morse
(g) Repeat [(a) through (f)]
(h) Declaration of termination The declaration of the help facility comes as sequential rapid two impact nibbles on the second, third and fourth back of the fingers of the non-dominant hand.

The declaration of the start of an example within the help facility comes as a single sequential impact nibble on the second, third and fourth back of the fingers of the non-dominant hand followed by sequential two impact nibbles on each of the second, third and fourth fingers of the non-dominant hand.

The declaration of the termination of an example within the help facility comes as a single sequential impact nibble on the second, third and fourth back of the fingers of the non-dominant hand followed by sequential two impact nibbles on each of the second, third and fourth fingers of the non-dominant hand and finalized by three rapid impacts on the back of the fourth finger. Namely, Articulation of the Relevant Declarations

| | |
|---|---|
| Declaration of help facility: | 2, 2, 3, 3, 4, 4 |
| Termination of help facility: | 2, 2, 3, 3, 4, 4 |
| Declaration of an example: | 2, 3, 4/t/Rapid 2(on $2^{nd}$), Rapid 2(on $3^{rd}$), Rapid 2(on $4^{th}$) |
| Termination of the example: | 2, 3, 4/t/Rapid 2(on $2^{nd}$), Rapid 2(on $3^{rd}$), Rapid 2(on $4^{th}$)/t/[+Rapid 3] |

Example Table Summary

| | |
|---|---|
| Activation | User or System Activity |
| Declaration | 2, 3, 4/t/Rapid 2(on $2^{nd}$), Rapid 2(on $3^{rd}$), Rapid 2(on $4^{th}$) |
| Example | Impact nibbles in sequence that user repeats after termination |
| Word (Morse) | Search the lookup table for |
| Termination | 2, 3, 4/t/Rapid 2(on $2^{nd}$), Rapid 2(on $3^{rd}$), Rapid 2(on $4^{th}$)/t/[+Rapid 3] |

Note, that the termination of an example is different from any other termination procedure by adding at the tail end of a repeated declaration, three rapid impact nibbles. The purpose in such a deviation from the standard is to signal unmistakably an end to an example and being ready for input.

We have encountered the addition (plus) sign in the mathematical operations and in first intuitive thinking could consider its utilization for describing non mathematical situation where the connectivity of "and" could be used to minimize the introduction of a new touch language variable. However, case such as "a good natured woman AND a good nature child run away from an evil adult male" would become more complex under such hypothetical approach as it would require a first invoke mathematical calculation via a declaration, then utilize the addition sign to be followed by the termination of the mathematical declaration before being able to continue with the description of the event. The net result would have been to add complexity and possible confusion at the receiving end of the deafblind user. Thus, we introduce an independent articulation for the non-mathematical addition by providing a vertical sliding line from the top to the bottom of the face of the fifth, fourth, third and second fingers of the non-dominant hand in the order just presented.

Yes and No receive their own independent touch language signs due to the frequency of their appearance and the critical need for an unmistaken articulation in each case. The articulations are provided in the table below.

Parentheses appear both in mathematical operations as well as in text conveying information related to the material presented and enclosing it for keeping in the context while maintaining a continuity of presentation. Notwithstanding the fact that some learned opinions object to such parentheses altogether, their existence is a fact of reality. We denote the opening (i.e., left) parenthesis by lines going up from bottom to top of the face of the second and then third finger of the non-dominant hand. The closing (i.e., right) parenthesis repeats the same signal where after a brief time delay it is repeated again, however with the reversed direction of top to bottom. A summary is provided in the table below.

| Element | Line Direction & Fingers |
|---|---|
| AND | TB5, TB4, TB3, TB2 |
| Yes | TB2, TB3 |
| No | BT2, BT3, BT2, BT3 |
| ( | BT2, BT3 |
| ) | BT2, BT3/t/TB2, TB3 |

Touch language is useful also for deaf persons who have full vision, as well as to persons with dyslexia watching TV and possibly to other groups as well.

In American Sign Language verbs are not mouthed, however, adjectives and adverbs are mouthed. That means that auxiliaries are needed to express adjectives. The case is different in touch language where the mere choice of a particular finger already implies information regarding adjectives. However, certain groups of adverbs are missing in touch language by design. Namely they are omitted form the structure of the language in order to preserve the universality of the language. Let us divide the adverbs into groups and examine some of them to realize where they exist in touch language and why they survive as a non-threatening language component to the universality of touch language.

Adverbs:

Group A. Adverbs that are modifiers of adjectives belong to this group. For example, the adjective quick is modified to become the adverb quickly by adding the "ly" at the end of the adjective. This is the group that is omitted by design. We forego the adverb and use the adjective instead, much like the way it is done in certain sign languages[1]. The reasoning for it is simply to minimize the overload of information to the user of touch language, who can make sense of the meaning with the adjective alone and without its proper (hearing grammatical) replacement by the adverb.

Group B. Adverbs that are time provides (such as past or future) and are provided by the back of the pinky finger of the non-dominant hand.

Group C Adverbs that are modifiers (descriptors) of nouns belong to this group. For example, the adjective "pretty" describing the noun "flower". Such descriptors are provided by the back of the first and fourth fingers of the non-dominant hand, which automatically also lets us know if the descriptor is positive or negative based on the specific finger selected.

Group D. Adverbs that render quantitative or measure information (such as "very" age bracket, etc.). These descriptors are provided by impacts in touch language where the larger the numbers of impacts means the larger is the quantitative information.

In spoken language we encounter approximations without much attention. Words like "nearly", "almost", "closer", "further" are incorporated almost automatically into sentences. Artificial intelligence that tries to imitate our brain functions in decisions making does indeed take notice of the disparity between the exact and the approximation, to the degree that whereas neural networks are used for exact situations, a totally different system, Fuzzy Logic is utilized for approximation such as "warm", "early" or "later". Touch language is an artificially induced language that is not intuitive, nor automatic. Hence, we need to provide users of the language with the tools to relate approximated situations. We turn next our attention to such definitions and articulations.

The Comparative Group

We group words of approximation together with their potential conditional status. Namely, we do not define separately words like "almost" and "remotely", but rather recognize that they are at the opposite sides of a description and lump them into a conditional status where they emerge as solutions to comparative question. Putting it another way, we induce a comparison where the words "almost" or "remotely" are the answers to an imposed unspoken question in the in the above example.

To this end, we introduce the "compare" notion that does not require the user to do any comparisons, but rather make the user aware of a decision tree selection process where the ensuing actions provide the "answers", i.e., the approximated states.

The back of the third and fourth fingers of the non-dominant hand provide together as a group the role for the "approximate" announcement, and act separately in providing the answer.

Rapid alternate impacts on the comparative fingers (i.e., starting with one, then the other, back to the first and ending with the second) create a sense of unity yet separateness and serves to announce the "comparative state". We chose the finger closer to the thumb as the one relating information of "close" and the finger farther from the thumb to relate "remote". Finally we apply nibbles, to the back of only one of the fingers that implies what our choice is (i.e., close or remote), while fine tuning it by the number of impacts, where more impacts mean either "closer" or "farther". The mechanism just introduced enables us to transmit spoken information described by words such as "almost", "closer" or "farther", in a simple and logical way that could become intuitive after learning and practice. The structure however, is incomplete without a mechanism to announce the termination of the comparative declaration of the adverbs we discussed. To this end we employ again the very same fingers used as a group to announce the comparative situation to now announce that the process has ended. This is achieved by utilizing a rapid employment to the fingers as before, except that instead of the rapid impacts on them in alternate fashion we provide a sense of a sliding object on one finger, then the other and repeat it in the same fashion done before with the impacts. The table below provides a summary.

TABLE

| Start Comparative Structure | Fingers used | Sequence | Number of Nibbles/Lines |
| --- | --- | --- | --- |
| Start comparative Structure | 2, 3 (NDH) | 2, 3, 2, 3 | 1 each time |
| End comparative Structure | 2, 3 (NDH) | 2, 3, 2, 3 | 1 each time |
| Close, Almost, etc. | 2 | | 1 to rapid 6 |
| Remote, Further, etc. | 3 | | 1 to 6 evenly spaced |

NDH stands for Non-Dominant-Hand

Commingled Use of Same Fingers

There are instances where a particular finger is utilized for more than one purpose. The task in front of us is to distinguish unmistakably between the uses, while guarding that we do not overburden the user with memory requirements. The following example will elucidate the point in the context of the adverbs of approximation.

Consider the words "farther" relating to distance and the word "further" relating to more abstract aspects, even if they denote not only ideas and time but also activities. While admittedly this example relates to a specific language, English in this case, it is important nonetheless for laying the ground for further analyses and evolvement of touch language as related to its cross language and culture utility.

Example

Farther and Further

"Farther" will carry a comparative designation and the articulation of magnitude; however, it will also get a locality designation (e.g., by vibrations providing functional equivalence of scene locality as discussed somewhere else in this manuscript). "Further" will also receive a comparative designation with magnitude, except that it will also receive a connotation" designation (i.e., nibble on back of non-dominant middle finger). We observe that in the latter case, the middle finger is used for two different messages. The first message provided is for the comparative condition and the second message for the "connotation" aspect. In reality this should not be confusing at all, as long as the basic rule of order is observed. The rule specifies that it does not matter if the connotation message is provided before or after the comparative message, as long that it does not interrupt the complete sequence of comparative adverb utilization.

Identifying the Speaker

Identifying the speaker visually is obvious as we can see the speaking person. Identifying the speaking person when the material is textual is not direct and certain auxiliaries are utilized. Such auxiliaries are identifying each speaking person by name or starting a new line for each such speaking person. While deafblind can in principle read Braille, relying on new lines is partly visual and could present a problem for the deafblind even when following text. Thus, we are considering the following options for touch language.

(a) The Dialogue box. Braille and textual material can be used in the standard form.

(b) Morse code. Morse code should not be used for the purpose under discussion, as it is reserved for verbs utilized in conjunction with the PalmScreen and could be confusing with an added usage.

(c) Sign Language Implements. In sign language we position the parties in our mind and refer to each in a visual form. That is visual geography.

Taking our cue from sign language we position speaking parties in functional equivalent visual form by using the hand as a touch language apparatus. The mechanism is provided below.

Geographical Placement of Speaking Parties.

We utilize the back of the dominant hand, anywhere in the periphery and almost on the counter of the back of the hand (excluding the fingers) as the territory where we place the imaginary parties in the group. The placement is a mapping of locations where the parties are in reality, except that they are pushed to the periphery of the hand. There is no need to announce the presence of any party unless that party speaks or otherwise communicates by sign or touch language. Only at that point does their presence become known, and even that only by default reasoning as we pronounce their communication when relevant.

Format.

(a) When a particular party speaks, a line is formed on the back of the dominant hand starting from the imaginary position of that party and continues only slightly in the direction of the party who is spoken to or addressed.

(b) If no party is addressed in particular the line stops only briefly, makes a semi-circle (i.e., a "U" turn) and returns half way back to the origination point.

(c) Invariably, the deafblind (i.e., the recipient of touch language) is considered to be in the virtual position of center of the back of the hand.

(d) If the speaker is positioned opposite the addressed party where the deafblind's virtual position is between the two (i.e., in the line of fire so to speak) we provide the following. A line is formed from the speaking party as usual, except that it proceeds almost to the center of the hand, draws a semi-circle around the imaginary position of the deafblind in the center of the hand and then proceed a bit in a straight line towards the addressed party.

In accordance with FIG. 8, sticks 100 are utilized to execute (a) and (b) above and 104, 106, 108, and 110 are also incorporated for cases where (d) above occurs.

Physical Features in Touch Language

The deafblind is the ultimate embodiment of human equalizer. The deafblind cannot hear if the voice of other parties is melodic or shrieking, whether a person is tall or short, good looking or not or shier ugly. Likewise, the deafblind is unaware whether he or she is facing a Caucasian, Afro-American, oriental, Mexican, etc.

The question before us is whether to break this utopian Ethnicity and other physical features equality, or whether it serves the purpose of the language and its users to maintain it. However, even before making this decision, we need to ask if it matters at all since the deafblind has not been aware of the differences before. The answer is actually quite simple. Assuming that the deafblind are integrated in our society to one degree or another, then they are already aware of it mentally or intellectually. Furthermore, not to provide such information would eliminate certain enjoyable features in a TV airing, let alone not being able to miss on some entire shows altogether. As an example we mention the TV airing of the movie "Twines" with the large frame well built Arnold Schwarzenegger and the short stubby and excellent actor Tony De Vito. The humorous and essence of this comedy comes from the fact that these two genetically engineered twins are so different from each other. Not including physical features elements in touch language will deprive the deafblind from such enjoyable airing available to the hearing and seeing population. Thus, physical features are deemed useful being as part of touch language and thus are included to a certain degree as is discussed next. The issue of inclusion of ethnicity as characterized by looks and form of speech is left out at this time based on the discussion below, however is kept open as an option based on future input from the interested public.

Mechanics of Articulating Physical Features

The mechanics is divided into two parts; Characterization and Magnitude. The characterization is divided into two sub segments, one to announce the physical feature delineations and one to specify the category. The magnitude provides the degree as related to the particular case depicted.

Characterization.

(a) Announcement. The announcement is provided by impact(s) on the center of the non-dominant palm.

(b) Specifying Category.

We will briefly discuss potential specific categories and the reasons for keeping some and discarding others.

(1) Height.
(2) Body size
(3) Degree of beauty
(4) Quality of voice
(5) Hair on the head
(6) Glasses The only categories that will be discarded from the list are the degree of beauty and quality of voice, which we argue as follows.

The quality of voice, whether melodic, shrieking or any intermediate degree is foreign and incomprehensible to the deafblind who never heard sounds. It could be argued that the deafblind should not be deprived of creating an imaginary element called sound, which might be different for other deafblind and would be a private, non-realistic figment of the imagination creating a possible added sense of satisfaction. However, with the basic principle in touch language of minimizing unessential information to avoid overload, this is a theoretical clutter of information not needed for the purpose touch language was developed. The degree of beauty is likewise a meaningless element to the deafblind. Unlike other elements to which a deafblind person has never been exposed and a learning curve could familiarize them with the new article, beauty, ugliness, or melodic elements will remain unattainable abstracts and do not justify inclusion in touch language. The category is provided by the appropriate number of nibbles at the center of the non-dominant palm.

| Category | Number of Nibbles |
| --- | --- |
| Height | 1 |
| Body Size | 2 |
| Hair | 3 |
| Glasses | 4 |

Magnitude.

The magnitude is provided by nibbles with a fixed set code that is the same for all cases, except that it adjusts with regards to specific case. There are two levels on each side of the "standard" that is denoted by three nibbles. The levels are "less" (2 nibbles) and "worse" (1 nibble) on one side of the standard and "more" (4 nibbles) or "plenty" (5 nibbles) on its other side. There is also an allowance for the extreme in both the lesser as well as the excess direction. For example, overweight (4 nibbles) and obese (5 nibbles), where the special case of unordinary very fat and heavy has a special designation of 5 nibbles accentuated by another group of five nibbles given in rapid impacts following a brief pause after the fifth nibble. On the other hand an extremely thin person who is anorexic will receive the single nibble for very thin, followed after a brief pause by rapid five successive nibbles. The material below elucidates and provides the code for the various cases. The signal [nibble(s)+Rapid 5 nibbles] is touch language's format for "expansive", "extreme", etc.

|  | Number of Nibbles |
|---|---|
| Height | |
| [Midget] | 1 + [Rapid 5] |
| Very short | 1 |
| Short | 2 |
| Average | 3 |
| Tall | 4 |
| Very tall | 5 |
| [Unusually tall/giant] | 5 + [Rapid 5] |
| Body Size | |
| [Anorexic] | 1 + [Rapid 5] |
| Extremely thin | 1 |
| Thin | 2 |
| Average | 3 |
| Obese | 4 |
| Fat | 5 |
| Unusually Fat | 5 + [Rapid 5] |
| Hair | |
| [Bald] | 1 + [Rapid 5] |
| Extremely short | 1 |
| Short | 2 |
| Average | 3 |
| Long | 4 |
| Very long | 5 |
| Unusually long | 5 + [Rapid 5] |
| Glasses | |
| [Contact lenses] | 1 + [Rapid 5] |
| Lenses without frame | 1 |
| Thin lenses | 2 |
| Average lenses | 3 |
| Thick Lenses | 4 |
| Very thick lenses | 5 |
| [Lenses + external help] | 5 + [Rapid 5] |

Various Grammatical Tense Issues

We revisit grammatical tense below and refine it for multiple event chronology in touch language. We have discussed past and future tense in touch language. We will now advance to the next level of refinement where we recognize that in description of either past or future there is a need for order where multiple occurrences took or will take place. As we will shortly realize we need both an order function as well as a point of reference and there is more than one option for the latter. The present manuscript is written in English and as such, past and future tense will be discussed in that context. However, recognizing that touch language is created as an international and cross culture language tool, we will depart from the exposition when developing the construct that would answer the basic premise of touch language universality.

Multiple Past and Future Tense Occurrences.

English Grammar designates multiple past occurrences by preceding earlier occurred verbs with the word "had". For example, "I had gone to the ticket office and bought a ticket". The example demonstrates both multiple past activities as well as the order in which they occurred, where buying the ticket was subsequent to going to the ticket office. Touch language has its own past designation by assigning tense to a finger (the back of the non-dominant fifth finger) however, an ordering function is required in order to enable time line realization of earlier and subsequent. The back of the thumb of the non-dominant hand provides the ordering function. In that regard, when this thumb is not activated for such purpose then it is a simple past or future situation. However, when a multiple occurrences prevail the ordering function (i.e., the back of the thumb of the non-dominant hand) becomes operational, assisting in refining the situation. In the latter case its function is always subsequent to the tense function declared by the back of the fifth finger of the non-dominant hand. The table below provides a summary of the ordering and chronology function.

| Event Chronology | Hand Involved | Finger | # of Nibbles |
|---|---|---|---|
| Past | NDH | Thumb | N1 |
| Earlier Past | NDH | Thumb | N2 |
| Earlier Than the Earlier Past | NDH | Thumb | N3 |
| Ancient | NDH | Thumb | N3 + [Rapid N5] |
| Future | NDH | Thumb | N1 |
| Further Future | NDH | Thumb | N2 |
| Furthest Than Further Future | NDH | Thumb | N3 |
| Extremely Remote Future | NDH | Thumb | N3 + [Rapid N5] |

Notice that the chronology function has the same values for both past and future and the determination as to which one it is, is provided by the back of the non-dominant fifth finger.

Point of Reference

The point of reference is needed in order to determine whether the nibbles proclaim events in ascending order or descending order. Namely, when we consider multiple past occurrences, should a single nibble be the closest event to the present and three nibbles the furthest event from the present declaring the time arrow pointing and going in the past direction, or should we start with the occurrence way in the past declared by a single nibble and progress to the present with the closest to it declared by three nibbles? Likewise, we need to consider the future direction as well. For the reasons given below, we argue for the time direction to go towards the past and in the future direction to point towards the future as the default case in touch language.

Since single nibbles represent simple past or future tense has been described before, it will be consistent to adhere to the procedure and increase the number of nibbles as we progress further into the future or go back into the past. That is the Present being the point of reference by default. Let us look briefly at the reasons for the default situation that is imposed on the deafblind user of touch language.

Deafblind persons who are aware of Grammar and its structure are more exposed to cultural and other linguistic elements and indeed would come to expect its manifestation also in touch language. These are also the people that possess the sophistication to change the default case as suitable to their own situation if so desired. However, if the deafblind person does not read Braille, is less exposed to linguistic and cultural elements, then the default makes it easier to perceive the situation. Finally and most importantly is the fact that in order to preserve the universality of touch language, the default case holds.

The Dialogue Reduced State (DRS)

Touch language primary object is enabling active and real time participation in a TV broadcast. However, the versatility of touch language enables also utility for communication and transfer of ideas between parties. As will be discussed in the material below, we offer the option of a Dialogue segment for text and conversations, however, touch language enables to forgo the dialogue segment altogether and utilize the rest of the language components to effectively convey the ideas, topic and related material in a rather succinct and short manner. Thus, we strive for an ultimate Dialogue segment that approaches null usage or as we refer to it as the Dialogue Reduced State (DRS). Such aspiration could be achieved by introducing enough touch language elements and parameters to render the need for the dialogue segment minimal or obsolete in certain cases.

Practical Utilization

In DRS we utilize the Morse code for verbs and the rest of the sentence is cast into abbreviated form according to touch language rules transmitted to the user.

Conditional Sentences

Unlike ASL, where conditional sentences are stated in two parts, touch language provides it in a single cohesive manner. In these cases (that appear to be the majority), when conditional statements are futuristic touch language employs the "tense" element discussed somewhere else in this manuscript.

A combination of DRS and the question or question mark in touch language is achieved by coupling the conditional sentence to a person. Touch language has a special notation when no specific person can be incorporated, such as when the notion of "anyone", "anybody", "someone", "somebody" or just understood from the context. Such notion is articulated by invoking a state of "all persons", achieved by impacting rapidly a single nibble in sequence to all the four of the person-fingers, either starting from the second finger and ending with the fourth finger or starting with the fourth finger and ending with the second finger.

Touch Language Structural Concept

An event is transliterated to touch language in the order in which it occurs, much like in ASL. However, unlike ASL the topic is not announced first and in fact is not singled out for announcement at all. The reason is that touch language is contemplated for use in depiction of dynamic events that could change rapidly, simultaneously occurring of multiple events that could also interlock. Multiple simultaneous windows on TV are also possible as we already addressed earlier. Imposing a rule for topic first would go against our philosophy of simplicity and universality of the language. Furthermore, verbs in touch language are transmitted by Morse code, which gives them a unique standing and singles them out for attention and could mostly provide a fairly good event idea.

Question and Question Mark in Touch Language

In ASL there is a pause at the end of a question. We cannot afford such a pause in touch language with its busy dynamic processing, and neither is the functional equivalent question mark in touch language provided by Morse code, but is rather transmitted by other means. This is done for the purpose of simplicity and considering the fact that a query in Morse code requires a total of six impacts (two regular, two rapid and two regular).

In touch language we signify a question (appearing in a short dynamic process) by applying a short vibration to the finger involved in the representation, at the end of impact (nibble) application to the finger. For example, consider a scene where an adult male commands an adult female whose path of walking has just been articulated on the PalmScreen, and the adult female starts to run and asks "why?". The latter part is articulated in touch language by two nibbles on the fifth finger (Pinky) of the dominant hand followed by a short vibration to the fifth finger, followed by the articulation for "why". Note, that the functional equivalent question mark in touch language is not provided after the articulation of "why" but rather before it. This order is not relevant to the word "why" and no rule should be inferred as being imposed for it in touch language. The short vibration symbolizing the functional equivalent question mark in touch language is always coupled to the person who asks it, and is provided at the end of fully identifying such person, i.e., including gender and age bracket. The vibration can be stretched out to be longer if emphasis is required, such as in the case of bewilderment or shock.

Command and the Exclamation Mark in Touch Language

A command in touch language is implied by two rapid successive short vibrations attached to the finger symbolizing the party issuing the command, while articulating the recipient party on the back of the non-dominant hand that points out the recipient in line with a technique discussed earlier. The two successive rapid vibrations are applied to the person finger in the dominant hand followed by articulation of the recipient.

Multiples

In both the question mark and the command we signify the written equivalency of such multiples as "????" or "!!!!" carrying their respective meanings by a time elongated vibration for the question and activating an [0+Rapid 5] nibbles immediately after the vibration in the case of the command.

Appropriated Words

Many languages appropriate words from other languages as a natural process of language evolution attesting to the reality of population mobility and globalization. Touch language is a universal language that cuts across cultures and it would appear from the outset that the notion of appropriated words is irrelevant. However, appropriated words sometimes replace local words and as such could be a source of confusion. Therefore, touch language provides designation that declares a word, notion or another element to be foreign or appropriated. It is important in particular if the word is a verb that carries a distinct connotation. For example, an English description of a person who drags himself or herself by carrying objects utilize the Yiddish verb "Shlapp" utilized as a verb in English. Another example is "rendezvous", the French word for "meeting", used in English as a verb, as is the French word for response in the "RSVP" where the "R" stands for "responde".

Singular and Plural Descriptions

All descriptions in touch language are singular except when identified differently as such. Warranted plurality in descriptions could be one of two types, either a specific numerical description, such as "two children" or "three cars", or non-numeric plurals belonging to the Fuzzy group, such as "many" or "few". We already know that we can attach a numeric factor to a person-finger or an item and know how to provide information about the numeric factor. The question remaining before us pertains to the Fuzzy group. As we discuss somewhere else in this manuscript undetermined person, or persons are designated by providing rapid successive single impact to all the four of the person-fingers. Such articulation of a fuzzy designation provides the recipient with additional information at no additional effort, as it provides also the age group, gender and personality trait. When a total group of persons consists of mixed age group we simply avoid information about the age group, which signal a lack of knowledge or in other words a mixture. When the gender group consists of only males or females we first provide the general group designation of impacting on all the four person-fingers and then proceed to impact in succession the two person-fingers pertaining to the group of interest, i.e., men or women.

Personification

ASL uses agents to personify signs. For example, "buy" plus an agent turns to be "buyer" and "shoot" plus an agent becomes "shooter. Personification in touch language is achieved by adding the person-element to the verb and distinguishing it from the action signified by the verb by a single nibble to the face of the person-finger. Thus, touch language provides more information than ASL because the personification also carries information about the gender, age and personality of the subject. However, in order to alert the touch language recipient that the Morse code describing the verb is utilized for personification, we start with the personification nibble on the face of the person-finger prior to the Morse code. When Morse code is required twice in the same description, such as in describing a "driver ("drive" plus person plus personification) driving the car" we economize on the Morse code, use it only once for the "drive" but provide two nibbles to the face of the person-finger.

Reciprocity

Exchanging articles between parties, such as business cards, or exchanging blows in a face-to-face combat requires elucidation in touch language. Touch language provides the verb in Morse code, defines the two parties via the person-fingers and after a short pause adds a reciprocity component by providing a single nibble at the back of the finger of each of the parties involved and repeating it once more to a total of two non-sequential nibbles per finger. The reciprocity component is provided after the two parties have been identified, including their age bracket. Furthermore, if the exchange is not a singular occurrence, such as in exchanging business cards, but is continuous, such as in exchanging blows between two combatants, then reciprocity components continue to be provided at intervals and could be respective to and in conjunction with the actual blow deliverance by each party. If the parties also roll on the ground during the process, then the PalmScreen conveys such activity. If articulation of the body part receiving the blow is warranted, then the non-dominant hand comes in handy (pun unintended) in providing such information that could also be synchronized with the actual rendering of the action (e.g., a blow in our case). If the recipient avoided the action (e.g., the blow) targeted at him or her, then the "cancel" sign ("X on the PalmScreen) is added rather than using Morse code, which is kept at a minimum.

Spelling in Touch Language

The only spelling we have encountered in touch language relates to verbs that are transmitted to the recipient in Morse code and singles them out for fluency in understanding the dynamic occurrences transmitted. However, there are instances where spelling is warranted and being consistent with our notion of Dialogue Reduced State (DRS) we need to introduce a format that will both satisfy the DRS as well as maintain the uniqueness of the Morse vibrated verb.

Spelling is important when touch language utilizes a person's name, a name of a country, city or street. To this end we do not involve the Morse vibrated verb mechanism, but rather designate a specific area to be known as the spelling segment for cases as those discussed above and that leaves intact both our notion of Morse vibrated verbs as well as the DRS.

The designated area is the face of the thumb in the dominant-hand that is not utilized for any other purpose and will maintain its isolated usage only for spelling by impacts of nibbles that transmit the Morse code of the spelled name or other carefully chosen article that may come about with the evolution of touch language.

Finger Sensitivity and Avoiding Reception Mistakes

We next discuss finger sensitivity and an optional way to avoid mistakes in perception. The latter is especially poignant when a finger is divided into three parts and an impact applied to one part could when mistaken for another mean a completely different interpretation.

Touch language has an optional facility that assists the deafblind recipient in correctly identifying and determining which portion of the finger is being impacted. The singling out facility is based on the principle of elimination. Namely, we first eliminate the other two available options so that when the correct part of the finger is impacted there is no question as to the certainty of it. The elimination procedure operates by impacting rapidly the two finger parts that are not the main target of impact then briefly pause before the designated impact is delivered. There are however, instances when more than one part needs to be impacted. For example delineating the fraction ½ requires an impact on the base of the back of the middle finger (for the numeral "1") followed by the fraction announcement (of "/") by a single impact on the back of the top of the middle finger and finishing with two impacts on the base of the third finger (for the numeral "2"). Obviously, it is imperative that we do not err in the interpretation of the areas of impact, let alone being able to distinguish among them. While the latter may be an individually sensitive dependant, we need a uniform mechanism that is devoid of such personal dependency and is available to all. To this end we introduce the mechanism described below through the examples provided.

We denote the back of a finger in the examples below by the capital letter "B", while denoting the face of the finger by "F". The number following the capital letter denotes the part of the finger and could assume only the numbers "1", "2" or "3", while the number preceding the capital letters denotes the number of impacts. Thus, "2B3" means two impacts on the back third (or top) of the finger, while "1F2" means a single impact on the face of the second (middle) part of the finger and. We also denote by Rapid a rapid sequence of impacts with ½ of a second or less separating between the impacts and by /t/ a pause that is longer than the time separation in the rapid impact sequence.

Example 1

½=1$B$1+1$B$3+2$B$1

With the singling facility shown in square brackets we have:

1$B$1=[1$B$3+Rapid1$B$2]/t/1$B$1

1$B$3=[1$B$1+Rapid1$B$2]/t/1$B$3

2$B$1=[1$B$3+Rapid1$B$2]/t/2$B$1

Example 2

⅔=2$B$1+1$B$3+3$B$1

2$B$1=[1$B$3+Rapid1$B$2]/t/2$B$1

1$B$3=[1$B$1+Rapid1$B$2]/t/1$B$3

3$B$1=[1$B$3+Rapid1$B$2]/t/3$B$1

Example 3

324 = (300) + (20) + (4) = (3$B1$ + 1$F$2) + (2$B1$ + 1$F1$) + (4$B1$)

(3$B$1+1$F$2)=([1$B$3+Rapid1$B$2]/t/3$B$1+[1$F$3+Rapid1$F$1]/t/1$F$2)

(2$B$1+1$F$1)=([1$B$3+Rapid1$B$2]/t/2$B$1+[1$F$3+Rapid1$F$2]/t/1$F$1)

(4$B$1)=[1$B$3+Rapid1$B$2]/t/4$B$1

Example 4

$$3401 = (3000) + (400) + (1) = (3B1 + 1F3) + (4B1 + 1F2) + (1B1)$$

$$(3B1+1F3)=([1B3+\text{Rapid}1B2]/t/3B1+[1F1+\text{Rapid}1F2]/t/1F3)$$

$$(4B1+1F2)=([1B3+\text{Rapid}1B2]/t/4B1+[1F3+\text{Rapid}1F1]/t/1F2)$$

$$(1B1)=[1B3+\text{Rapid}1B2]/t/1B1$$

Remarks

There are two ways to operate the singling facility, top to bottom or bottom to top direction. To impose an ordering rule, such as top to bottom would be to impose an extraneous rule without any seeming validity. Therefore, no ordering rule exists except the requirement that the order be kept consistent at all times. Thus the sequential direction is left to the idiosyncratic choice of the hardware provider.

Inclusion and Connectivity

The word "and" both in text as well as verbally connects between various segments of communication or descriptions. Spoken languages have either a special word for it, such as "and" in English, or "und" in German. Some languages have a single letter attached to the added part, such as the "ve" in Hebrew. Sometimes the "and" that is used to connect between elements is also used for inclusion. The word "with" in English is utilized only for inclusion but not for connecting elements, while the word "and" is used solely for connectivity. So is the case of "avec" in French, "mit" in German or "com" in Portuguese. ASL uses also two different signs for inclusion and connectivity. However, in some spoke languages the verbal or textual addition also doubles up to describe inclusion, such as the "ve". Touch language is not a spoken language, nor a visual one and it would appear economical to group the two notions together. However, we will provide two separate elements in touch language, one for the connectivity word "and" and one for the inclusion word "with". However, for reasons that will soon become apparent we will first present the signs "with" for inclusion and "without" for no-inclusion as is shown below.

With: Two simultaneous movements of starting an elongated impact motion (sticks) from the opposite edges of the base of the back of the non-dominant hand and meting at the center.

Without: The reverse motion of "with", where the impact motion starts from the center of the base of the non-dominant hand and moves symmetrically towards the edges of the hand.

And: To provide the connectivity "and" in touch language we combine the touch language inclusion "with" articulation and follow it with a single nibble impact at the center of the base of the hand where the two approaching segments just met.

Affirmation, Negation and Emphasis

We have positioned the affirmation and negation with the inclusion group due to the locality of information delivery. The designated area is the base of the back of the non-dominant hand, where impact nibbles transmit affirmation, such as the word "yes" or negation, such as the word "no". Furthermore, we denote emphasis utilizing the same area. Textual material and spoken languages provide for emphasis, such as underlining or bold text in the former and intonation in the latter. The former is visual and the latter is auditory, none of which is relevant to the deafblind. The touch language designation for this group is as follows.

Affirmation: A single nibble impact at the center of the base of the non-dominant hand.

Negation: Three nibble impacts at the center of the base of the non-dominant hand.

Emphasis: Five nibble impacts at the center of the base of the non-dominant hand.

Coupled Adverbs and Pronouns

The mixed group of adverbs and pronouns of "when", "where", "who", "what", "why", or "how" are not provided as a group but rather are described within the various relevant functions of touch language. Thus, "when" is part of the time element coupled with the question element, "who" is part of the person-finger group coupled with the question element and "where" is part of the location segment coupled with the question element. As we have already discussed the question element is appropriately coupled by itself and is mechanically transmitted by vibrations. "What", "why" and "how" are unattached and are not coupled to any specifically discussed element. The specific articulation will be determined at a later time.

Religious and Spiritual Articulation

Large segments of our society have a cognitive or emotional connectivity with either religious or spiritual affirmations, which cross borders, languages and cultures. In line with touch language philosophy we allocate a special articulation for such affirmations, leaving blank the specific elements and allowing for users to embed the specific cases relevant to them. Some examples follow as well.

Due to the individual nature of any affirmation, even if utilized in a group, such as a congregation, we allocate the person-fingers of the dominant hand for such articulation. A rapid series of impact nibbles starting with the face of the first finger of the dominant hand, moving to the second, then third and ending with the fourth finger articulates that the ensuing impact nibble specification relates to the affirmation discussed and continue to so be articulated until a repetition of the inception declaration announces the ending of it.

There are five elements provided through the face of the second finger, each articulated by a different number of nibbles. Users can assign their own specifics to them according to the examples provided below. The face of the third (middle) finger of the dominant hand being under the declaration of religion or spirituality is dedicated to the supreme power. In those cases where the belief system of individuals has more than one supreme power, such as the "Father, the Son and the Holey Spirit" one can utilize multiple impact nibbles to designate each of the group mentioned.

Example 1

Christian Affirmation

| Element | Face of Finger | Number of Nibbles |
| --- | --- | --- |
| Church | 2 | 1 |
| Minister | 2 | 2 |
| Pulpit | 2 | 3 |
| Sermon | 2 | 4 |
| Christmas | 2 | 5 |
| God | 3 | 1 |

Example 2

Islamic Persuasion

| Element | Face of Finger | Number of Nibbles |
|---------|----------------|-------------------|
| Mosque  | 2              | 1                 |
| Ramadan | 2              | 5                 |
| Allah   | 3              | 1                 |

.
.
.

The Mechanics of Touch Language Delivery

Close captions have become a standard option available on TV sets, where spoken words are translated to text one could view on the TV screen. The speech to close captions translations are mostly performed by companies creating the products prior to their airing.

Touch language transliteration is an extension of such operation, albeit it's being a fundamentally different form of process. Touch language transliteration captures scenes depicting activities on the screen on one end, and speech components relating to dialogue on the other hand. Touch language then transmits to the "viewer" the dynamic activities on the screen, as well as the speech content in a similar principle of topical translation. Touch language transmittal to its recipients is done independently and notwithstanding of close captions to those desiring or needing it.

Figure 13:
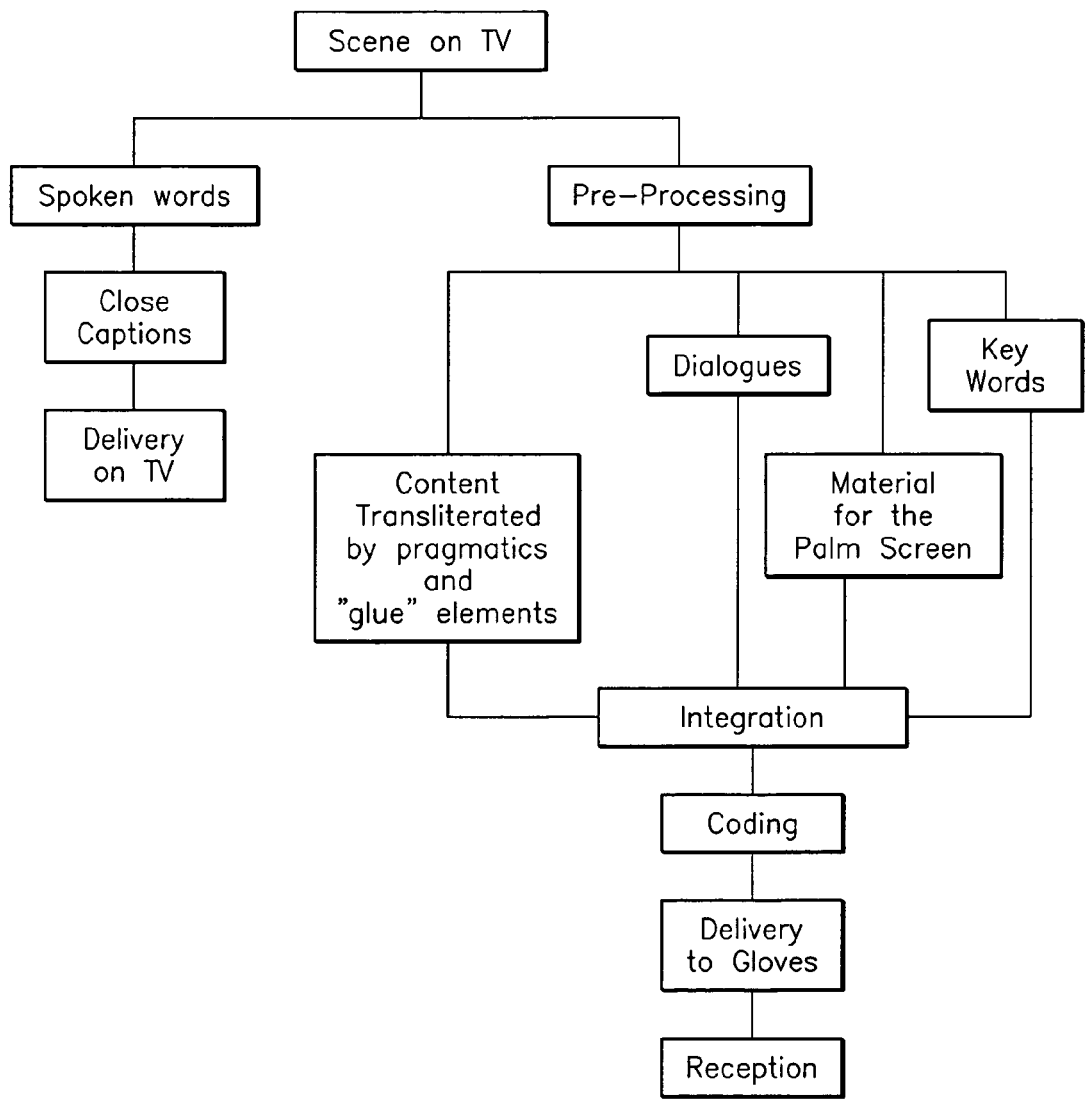
FIG. 13 is a flow chart showing how touch language enables a deafblind, deaf or blind person to enjoy a TV scene.

As shown in FIG. 13, touch language focuses on transferring to its recipients, topics and essentials of the material presented in a fashion enabling functional equivalent participation in TV airing. We discuss below the mechanics of process and hardware essentials to carry proper touch language transliteration from inception to reception. We will address below a rudimentary and prototype articulation of such mechanical device leaving the actual utilizable, user-friendly marketable devices to artisans in the engineering trade.

The complete process from a scene on TV to touch language reception happens in two parallel routes; the language route, or Reduced Dialogue Segment and the descriptive visual route. The two routes come together during integration time where the recipient's brain partakes in the process. Delivery to the gloves could optionally be through the text channel on TV that is also utilized for close captions.

The Reduced Dialogue Segment

Spoken content undergoes a simple transliteration, similar in its concept to sign language, where the content is presented by pragmatics and augmented by connecting elements. Namely, the topics are extracted from the content and tied together by economic introduction of "glue" elements. For example, person A says to person B "let us go to the dance floor and you can teach me to dance". This spoken utterance may appear as: "DANCE FLOOR, GO, TEACH DANCE, ME. We notice the following:
 (a) The economy of presentation
 (b) We said that the "Utterance may appear", namely, there is a built in freedom of topic extraction, order, and integration. Thus, it will allow each language and culture to structure its own form as well as allow for the individual idiosyncrasies of the translators without diminishing the final outcome.

Each Reduced Dialogue Segment receives an ID that enables its integration with the descriptive visual segments appropriate to the specific scene. The ID format is discussed below.

The Descriptive Visual Component

The descriptive visual component starts with preprocessing and progresses to coding and transmission to the mechanical touch language gloves.

Pre Processing

Pre processing includes the following segments.
 Isolating verbs for the "KeyWords" segment
 Isolating the dynamic elements of scenes on the screen for the dynamic segment
 Providing identifiable segment pointers allowing for their later synchronization as well as integration with the Reduced Dialogue Segment
 Dispatching each segment for independent processing Identifiable Segment Pointers [ISP]

Identifiable segment pointers [ISPs] are attached to every segment or portion of it and enable a unique and unmistakable identification of each component for later synchronization at integration time of delivery. Each ISP contains a segment identification, scene identification and temporal identification. An example of a possible ISP structure is given below.
 Segment ID:
 The letter S for "Scene" ID
 The letter K for "KeyWord" ID
 Scene ID:
 A serial number starting with 0001 for segment 1 (with no upper limit)
 Temporal ID:
 A serial number starting with 0001 for segment 1 (with no upper limit)
 Therefore, an ISP would appears in this case as either ISP=[S, #x, #y] or ISP=[K, #x, #y]. For example, ISP=[S, 8, 23] and ISP=[K, 5, 14]

The temporal ID is a relative clock time in preferred units, such as seconds and is relative to the scene where its starting point is arbitrary and utilized as best supporting structure to the individual who transliterates the visuals. Thus, the transliterating individual assigning the IDs can utilize quite a bit of prerogative in an almost automatic fashion with very limited constraints.

The IDs for the Reduced Dialogue Segments follow the same principle, and if we assign the designation "R" for it, it would appear as ISP=[R, #x. #y], where R=S for ease of integration.

Other Parameters

The scene description will require information for proper finger selection and the impacts on them as well as the dynamic articulation on the palm of the hand without the pre-requisite of through knowledge of touch language. We address each of them separately below.

Information for the PalmScreen

The transliterating individual can utilize an auxiliary in the form of a computer monitor on which he/she draws loosely with a mouse the contour of dynamic activity and/or supplies also a word or two in a provided template. For example, the contour of a car in curvature motion will be drawn, while the word "explosion" will be typed in the template area. Optionally, the screen area is filled with a matrix of empty circles and the transliterating person can click on such a figure to describe relative position (on the computer screen as corresponding to the TV screen) and either type a word like "car" in the template or click the word "car" from a drop down menu appearing as soon as the space was clicked on the screen. In that fashion, a person hiding behind such object would merit a second click on an empty circle behind the object and the word "person" or "man", woman", "child", etc. will be either typed or supplied by clicking it from the new drop-down menu. Each screen receives an ID where the "S" value pertains to the same group "B" value (see "Integration" below).

Information for the Back of the Hand

Information for the back of the hand follows the same procedure and utilization of the computer monitor as an auxiliary. The computer screen is divided into two major windows, each with its own template for added word identification and where one of them is dedicated for information flow to the back of the hand. Thus the latter part of the screen already has the empty circles positioned in the possible positions of the parties communicating and the transliterating person only clicks to highlight the parties involved and the arrow of direction for the flow. Namely, three separate clicks, one for each of the parties and one for the direction. The ISP of the screen is the same for both windows if both are involved in a description.

Information for the Fingers

The information for the fingers can be provided in a number of ways. In order to preserve the universality of the operation, no set instructions are given. However, one such way is for the transliterating individual to provide the system with an abbreviated typed narrative, where the content is much the same as is done in sign language. The system code will isolate the needed articles and will code them appropriately. The only requirement that needs to be adhered to is to preserve the proper ISP for the segment in order to maintain subject continuity and rough synchronicity with the activities on the TV screen.

Integration

It all comes together during integration time, where the Pre-Coding assembly of material is matched to groups by their ISP designation. Namely, if ISP components are described by the letters, "A", "B", and "C", then ISP=[A, B, C]. We assemble groups for coding that are lined in the order of time, once the groups have been determined. Thus, all ISP units with the same "B" become a distinct identifiable group and within each group material is ordered by the "C" component where the lower numbers precedes higher numbers. Additionally, each "B" group is divided into two subgroups of "A", where "S" and "K" determine their sub-grouping. Subsequently, the process leads to coding and transmittal to the mechanical touch language gloves.

It is apparent that there has been provided in accordance with the present invention a touch language which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for communicating visual images to a handicapped person, said method comprising the steps of:
providing at least one device for physically transmitting information to said handicapped person;
providing information about said visual images to said handicapped person using said at least one device; and
said information providing step comprising delivering a physical signal representative of a key word describing a portion of a visual image to a first part of a body of said handicapped person using said at least one device and further comprising transmitting at least one physical input describing a dynamic element associated with said key word to a second part of the body of said handicapped person; and
wherein Dividing the fingers of a hand of said handicapped person into a first group consisting of a pointer finger and a middle finger and into a second group consisting of a ring finger and a pinky and said transmitting step comprises transmitting information about a bad character to one of said fingers of said first group and transmitting information about a good character to one of said fingers of said second group.

2. A method according to claim 1, wherein said delivering step comprises delivering said key word signal in Morse code form to said handicapped person via a said first body part.

3. A method according to claim 1, wherein said delivering step comprises delivering said key word signal in Braille form to said first body part of said handicapped person.

4. A method according to claim 1, further comprising transmitting said at least one physical input describing said dynamic element associated with said visual image to a palm of said handicapped person.

5. A method according to claim 4, wherein said transmitting step comprises transmitting a plurality of successive elements describing a motion to said palm of said handicapped person.

6. A method according to claim 5, further comprising a continuance signal to said palm of said handicapped person to indicate continuance of said motion.

7. A method according to claim 6, wherein said continuance signal transmitting step comprises transmitting said signal in the form of at least one vibration or impact on a body part.

8. A method according to claim 1, further comprising delivering information about a musical background associated with said visual image to said handicapped person.

9. A method according to claim 8, wherein said musical background delivering information comprises transmitting at least one of long and short physical impacts to a body part of said handicapped person.

10. A method according to claim 1, further comprising transmitting information about a start of and an end of a commercial advertisement to said handicapped person.

11. A method according to claim 1, further comprising transmitting information about a start of and an end of a test to said handicapped person.

12. A method according to claim 1, further comprising storing information from a written indicia scrolling across a screen containing said visual images for play at another time.

13. A method according to claim 1, further comprising providing said handicapped person with information about a state of reception of a system on which said visual images are displayed.

14. A method according to claim 1, further comprising transmitting information about said visual images to the back of at least one finger of said handicapped person.

15. A method according to claim 14, wherein said transmitting step comprises transmitting information about the character of a person displayed in said visual images through at least one impact to said back of said at least one finger.

16. A method according to claim 15, wherein said transmitting step comprises transmitting information about an age of a character and a personality of said character to said back of said at least one finger.

17. A method according to claim 1, further comprising designating one finger of each of said groups for receiving information about a male character and designating one finger of each of said groups for receiving information about a female character.

18. A method according to claim 1, further comprising transmitting information about said visual images to a front portion of at least one finger.

19. A method according to claim 18, wherein said information transmitting step comprises transmitting information about a particular group.

20. A method according to claim 19, wherein said transmitting step comprises transmitting information about a profession of a character to said front portion of said at least one finger.

21. A method according to claim 18, wherein said information transmitting step comprises transmitting information about lightening to said front portion of said at least one finger.

22. A method according to claim 18, wherein said information transmitting step comprises transmitting information about scenery to said front portion of said at least one finger.

23. A method according to claim 18, wherein said information transmitting step comprises transmitting information about a place to said front portion of said at least one finger.

24. A method according to claim 18, wherein said information transmitting step comprises transmitting information about an activity to said front portion of said at least one finger.

25. A method according to claim 1, further comprising transmitting information about a dialogue associated with said visual image being spoken to said handicapped person.

26. A method according to claim 25, wherein said dialogue transmitting step comprises transmitting said dialogue in at least one of a Braille form to the fingertips of at least one hand of said handicapped person and by impacts describing topics.

27. A method according to claim 1, further comprising using a thumb of said handicapped person to perform control functions.

28. A method according to claim 27, further comprising using said thumb to perform at least one of a call for help, call for at least one person(s), and ask at least one question(s).

29. A method according to claim 27, further comprising using said thumb to receive information about at least one of an at least one safety-alert(s), at least one general alert(s), and general information.

30. A method according to claim 1, further comprising transmitting information about at least one female representation and cross relationships to a front portion of a pinky of said handicapped person.

31. A method according to claim 30, further comprising using said pinky to select a particular television channel.

32. A method according to claim 1, further comprising transmitting information about grammatical tense to at least one finger of at least one hand.

33. A method according to claim 32, further comprising said transmitting step comprises transmitting grammatical tense information to a back of a pinky of said at least one hand.

34. A method according to claim 1, further comprising transmitting information about an emotional state to at least one finger of at least one hand of said handicapped person.

35. A method according to claim 34, wherein said information about said emotional state is transmitted to a finger of a hand.

36. A method according to claim 1, wherein said visual image is part of a television program containing sound and said handicapped person is a deafblind person and wherein said method further comprises transmitting information about dialogue being spoken by characters on said television program to said deafblind person.

37. A method according to claim 36, wherein said information about said dialogue is transmitted by a keypad contacting fingertips of said deafblind person and said key word is delivered to said deafblind person through a plurality of impacts on a palm of a hand of said deafblind person.

38. A method according to claim 37, further comprising transmitting information about motion of at least one of a said visual images and in said visual images to said deafblind person through a plurality of impacts on said palm.

39. A method according to claim 1, wherein said transmitting step comprises transmitting said at least one physical input describing said dynamic element to a second part of the body which is different from said first part of the body.

40. A method according to claim 1, comprising a conceptual language construct for communicating by at least one of a receiving and transmitting at least one of a at least one physical touch(s), at least one simulated physical touch(s), at least one tap(s), at least one simulated tap(s), at least one vibration(s), and at least one simulated vibration(s) on at least one of a at least one device(s), at least one body part(s), and at least one simulated body part(s), of at least one person(s) who is at least one of a handicapped and a non-handicapped.

41. A system for communicating visual images to a handicapped person, said system comprising:
at least one device for physically transmitting information about said visual images to said handicapped person; and
said at least one device including means for delivering a physical signal representative of a key word associated with said visual images to a first part of a body of said handicapped person, wherein said at least one device further comprises means for delivering at least one physical input describing a dynamic element associated with said key word to a palm of said handicapped person; and
wherein Dividing the fingers of a hand of said handicapped person into a first group consisting of a pointer finger and a middle finger and into a second group consisting of a ring finger and a pinky and said transmitting step comprises transmitting information about a bad character to one of said fingers of said first group and transmitting information about a good character to one of said fingers of said second group.

42. A system according to claim 41, wherein said delivering means comprises means for creating at least one impact on a palm of said handicapped person.

43. A system according to claim 42, wherein said at least one device includes means for transmitting a continuance signal to said palm to indicate continuance of a motion.

44. A system according to claim 43, wherein said transmitting means comprises means for transmitting said continuance signal by imparting at least one of an at least one vibration(s) and at least one impact(s) to said palm.

45. A system according to claim 41, wherein said delivering means comprises means for delivering said key word to a body part in Morse code form.

46. A system according to claim 41, wherein said at least one device comprises means for delivering information about a musical background associated with said visual images to said handicapped person.

47. A system according to claim 46, wherein said means for transmitting information about said musical background comprises means for transmitting at least one of a long and short physical impacts to a body part of said handicapped person.

48. A system according to claim 41, wherein said at least one device includes means for transmitting information about a start of and an end of a commercial to said handicapped person.

49. A system according to claim 41, wherein said at least one device includes means for transmitting information about a state of reception of a device on which said visual images are being displayed.

50. A system according to claim 41, wherein said at least one device includes means for transmitting information about said visual images to the back of at least one finger of said handicapped person.

51. A system according to claim 41, wherein said at least one device comprises means for transmitting information about said visual images to the back of at least one finger of said handicapped person.

52. A system according to claim 51, wherein said at least one device comprises means for transmitting information about a character of a person displayed in said visual images via at least one impact applied to said back of said at least one finger.

53. A system according to claim 51, wherein said at least one device comprises means for transmitting different pieces of information about said visual images to a front portion of each finger of at least one hand of said handicapped person.

54. A system according to claim 41, wherein said at least one device comprises means for transmitting information about said visual images to a front portion of at least one finger.

55. A system according to claim 41, further comprising said at least one device including means for transmitting information about a dialogue being spoken associated with said visual images to said handicapped person.

56. A system according to claim 55, wherein said dialogue transmitting means comprises means for transmitting said dialogue in at least one of a Braille form, and by impacts to the fingertips of at least one hand of said handicapped person.

57. A system according to claim 41, further comprising a means for allowing said handicapped person to use a thumb to perform control functions.

58. A system according to claim 57, wherein said allowing means comprises a thumb cradle.

59. A system according to claim 57, wherein said allowing means comprises a thumb sleeve.

60. A system according to claim 41, further comprising means for transmitting information about at least one of a female representation and cross relationships to a front portion of a pinky of said handicapped person.

61. A system according to claim 60, wherein said information transmitting means comprises a pinky cradle.

62. A system according to claim 60, wherein said information transmitting means also comprise means for allowing a handicapped person to select a particular television channel using said pinky.

63. A system according to claim 41, further comprising means for transmitting information about grammatical tense to at least one finger of at least one hand.

64. A system according to claim 63, wherein said grammatical tense transmitting means comprises means for transmitting information about said grammatical tense to a back of a pinky of said at least one hand.

65. A system according to claim 41, wherein said at least one device further comprises means for transmitting information about at least one of an aggression group, a neutral group, and a pleasant group to at least one finger of at least one hand of said handicapped person.

66. A system according to claim 65, wherein said information about said aggression group is transmitted to a first finger of a hand.

67. A system according to claim 65, wherein said information about said neutral group is transmitted to a middle finger of a hand.

68. A system according to claim 65, wherein said information about said pleasant group is transmitted to a fourth finger of a hand.

69. A system according to claim 41, wherein said delivering means delivers said physical signal to at least one of a fingertips of a hand that does not include said palm, and fingers that are part of the hand which has said palm.

* * * * *